(12) United States Patent
Freda

(10) Patent No.: US 10,408,189 B2
(45) Date of Patent: Sep. 10, 2019

(54) EFFICIENT SYSTEMS AND METHODS FOR CONSTRUCTION AND OPERATION OF MOBILE WIND POWER PLATFORMS

(71) Applicant: V Squared Wind, Inc., West Roxbury, MA (US)

(72) Inventor: Robert M. Freda, West Roxbury, MA (US)

(73) Assignee: V Squared Wind, Inc., West Roxbury, MA (US)

( * ) Notice: Subject to any disclaimer, the term of this patent is extended or adjusted under 35 U.S.C. 154(b) by 135 days.

(21) Appl. No.: 15/651,661

(22) Filed: Jul. 17, 2017

(65) Prior Publication Data
US 2018/0128240 A1 May 10, 2018

Related U.S. Application Data

(63) Continuation of application No. 14/521,658, filed on Oct. 23, 2014, now Pat. No. 9,709,028, which is a
(Continued)

(51) Int. Cl.
*F03D 1/04* (2006.01)
*F03D 13/20* (2016.01)
(Continued)

(52) U.S. Cl.
CPC ............ *F03D 1/04* (2013.01); *F03D 1/025* (2013.01); *F03D 9/11* (2016.05); *F03D 9/25* (2016.05);
(Continued)

(58) Field of Classification Search
CPC ... F03D 1/025; F03D 1/04; F03D 9/11; F03D 9/25; F03D 80/70; F03D 13/20; F05B 2220/706; F05B 2240/133; F05B 2240/30; F05B 2240/40; F05B 2240/914; F05B 2240/98; F05B 2250/132; Y02B 10/70;
(Continued)

(56) References Cited

U.S. PATENT DOCUMENTS 2,169,165 A 8/1939 Reedy
3,883,750 A 5/1975 Uzzell
(Continued)

FOREIGN PATENT DOCUMENTS

AU 2009100441 6/2009
DE 19645415 5/1998
(Continued)

OTHER PUBLICATIONS

SIPO, "Chinese Application No. 201380029881.3 Second Office Action dated Jul. 18, 2017", 10 pages.
(Continued)

*Primary Examiner* — Igor Kershteyn
(74) *Attorney, Agent, or Firm* — Strategic Patents, P.C.

(57) ABSTRACT

In embodiments of the present invention improved capabilities are described for a mobile wind power support structure, comprising a superstructure with mobile platform support structures, and a plurality of deployable rotating wind power structures, wherein the plurality of deployable rotating wind power structures are positioned in the superstructure through a wind orientation facility.

20 Claims, 75 Drawing Sheets

Related U.S. Application Data continuation of application No. 13/912,966, filed on Jun. 7, 2013, now Pat. No. 8,937,399, which is a continuation-in-part of application No. 12/635,464, filed on Dec. 10, 2009, now Pat. No. 8,482,146, which is a continuation-in-part of application No. 12/332,313, filed on Dec. 10, 2008, now Pat. No. 7,804,186.

(60) Provisional application No. 61/656,816, filed on Jun. 7, 2012, provisional application No. 61/012,759, filed on Dec. 10, 2007.

(51) Int. Cl.
  *F03D 80/70* (2016.01)
  *F03D 9/11* (2016.01)
  *F03D 9/25* (2016.01)
  *F03D 1/02* (2006.01)

(52) U.S. Cl.
  CPC ............ *F03D 13/20* (2016.05); *F03D 80/70* (2016.05); *F05B 2220/706* (2013.01); *F05B 2240/133* (2013.01); *F05B 2240/30* (2013.01); *F05B 2240/40* (2013.01); *F05B 2240/914* (2013.01); *F05B 2240/98* (2013.01); *F05B 2250/132* (2013.01); *Y02B 10/30* (2013.01); *Y02B 10/70* (2013.01); *Y02E 10/721* (2013.01); *Y02E 10/725* (2013.01); *Y02E 10/728* (2013.01)

(58) Field of Classification Search
  CPC ..... Y02B 10/30; Y02B 10/728; Y02E 10/721; Y02E 10/725; Y02E 10/728
  See application file for complete search history.

(56) References Cited

U.S. PATENT DOCUMENTS

| | | | |
|---|---|---|---|
| 4,021,135 A | 5/1977 | Pedersen et al. | |
| 4,110,631 A | 8/1978 | Salter | |
| 4,140,433 A | 2/1979 | Eckel | |
| 4,204,799 A * | 5/1980 | de Geus | F03D 1/04 415/4.5 |
| 4,220,870 A | 9/1980 | Kelly | |
| 4,320,304 A | 3/1982 | Karlsson et al. | |
| 4,411,588 A | 10/1983 | Currah et al. | |
| 4,516,907 A | 5/1985 | Edwards | |
| 4,550,259 A | 10/1985 | Bertels et al. | |
| 4,600,360 A | 7/1986 | Quarterman | |
| 4,720,640 A | 1/1988 | Anderson et al. | |
| 4,945,693 A | 8/1990 | Cooley | |
| 5,146,096 A | 9/1992 | McConachy | |
| 5,457,346 A | 10/1995 | Blumberg et al. | |
| 5,623,790 A | 4/1997 | Lalvani | |
| 5,982,046 A | 11/1999 | Minh | |
| 6,100,600 A | 8/2000 | Pflanz | |
| 6,382,904 B1 | 5/2002 | Orlov et al. | |
| 6,749,399 B2 | 6/2004 | Heronemus | |
| 6,932,561 B2 | 8/2005 | Yoo | |
| 2,005,023 A1 | 10/2005 | Hopkins | |
| 7,075,189 B2 | 7/2006 | Heronemus et al. | |
| 2,007,013 A1 | 6/2007 | Reidy et al. | |
| 7,293,960 B2 | 11/2007 | Yamamoto et al. | |
| 2,008,015 A1 | 6/2008 | Wobben | |
| 2,008,021 A1 | 9/2008 | Boone et al. | |
| 2,008,025 A1 | 10/2008 | Wilson et al. | |
| 7,528,498 B2 | 5/2009 | Yeh | |
| 2,009,014 A1 | 6/2009 | Freda | |
| 7,595,565 B2 | 9/2009 | Chen et al. | |
| 7,640,897 B2 | 1/2010 | Gandrud et al. | |
| 7,663,262 B2 | 2/2010 | Roskey | |
| 7,728,455 B2 | 6/2010 | Branco | |
| 7,758,300 B2 | 7/2010 | Friesth | |
| 7,777,363 B2 | 8/2010 | Wang et al. | |
| 7,804,186 B2 | 9/2010 | Freda | |
| 7,843,077 B2 | 11/2010 | Arduini et al. | |
| 7,845,899 B2 | 12/2010 | Johnson et al. | |
| 8,072,091 B2 | 12/2011 | Wilson et al. | |
| 8,080,896 B2 | 12/2011 | Roskey | |
| 8,089,173 B2 | 1/2012 | Freda | |
| 8,120,197 B2 | 2/2012 | Branco | |
| 8,178,990 B2 | 5/2012 | Freda | |
| 8,257,019 B2 | 9/2012 | Cironi et al. | |
| 8,395,276 B2 | 3/2013 | Freda | |
| 8,482,146 B2 | 7/2013 | Freda | |
| 8,482,150 B2 | 7/2013 | Smith | |
| 8,598,730 B2 | 12/2013 | Freda | |
| 8,668,433 B2 | 3/2014 | Friesth et al. | |
| 2003/0168864 A1 | 9/2003 | Heronemus et al. | |
| 2005/0074324 A1 | 4/2005 | Yoo | |
| 2006/0138782 A1 | 6/2006 | Friesth | |
| 2007/0009348 A1 | 1/2007 | Chen | |
| 2009/0127862 A1 | 5/2009 | Sankrithi | |
| 2010/0032955 A1 | 2/2010 | Chen | |
| 2010/0080683 A1 | 4/2010 | Presz, Jr. et al. | |
| 2010/0090473 A1 | 4/2010 | Glass | |
| 2010/0150718 A1 | 6/2010 | Freda | |
| 2011/0049904 A1 | 3/2011 | Freda | |
| 2011/0081243 A1 | 4/2011 | Sullivan | |
| 2012/0057974 A1 | 3/2012 | Freda | |
| 2012/0193923 A1 | 8/2012 | Freda | |
| 2013/0214539 A1 | 8/2013 | Freda | |
| 2013/0334824 A1 | 12/2013 | Freda | |
| 2015/0110599 A1 | 4/2015 | Freda | |

FOREIGN PATENT DOCUMENTS

| | | |
|---|---|---|
| DE | 20010668 | 4/2001 |
| DE | 102004036263 | 2/2006 |
| DE | 202009006590 | 7/2009 |
| FR | 2488337 A1 | 2/1982 |
| JP | 0397415 | 4/2003 |
| JP | 200397416 A | 4/2003 |
| WO | WO-2004085928 | 10/2004 |
| WO | WO-2009/076479 A2 | 6/2009 |
| WO | WO-2009/076479 A3 | 6/2009 |
| WO | WO-2010028340 | 3/2010 |
| WO | WO-2010/045441 A2 | 4/2010 |
| WO | WO-2010068780 A1 | 6/2010 |
| WO | WO-2010141715 | 12/2010 |
| WO | WO-2011069808 | 6/2011 |
| WO | WO-2013185057 | 12/2013 |

OTHER PUBLICATIONS

IP India, "IN Application No. 2156/KOLNP/2010 First Examination Report dated Dec. 13, 2017", 7 pages.
EPO, "EP Application No. 08860724.7 Supplemental European Search Report dated Sep. 26, 2012", 9 pages.
SIPO, "Chinese Application No. 200880126507.4 First Office Action dated Jul. 10, 2012", CPME1042629P—English Translation, pp. 1-15.
SIPO, "Chinese Application No. 200880126507.4 First Office Action dated Jul. 10, 2012", Chinese Translation, pp. 1-6.
EPO, "EP Application No. 08860724.7 EP Search Report dated Jul. 10, 2012", 3 pages.
USPTO, "U.S. Appl. No. 12/635,464, Non-Final Office Action dated Nov. 15, 2012", 18 pages.
USPTO, "U.S. Appl. No. 12/861,263, Non-Final Office Action dated Jan. 26, 2013", 9 Pages.
USPTO, "U.S. Appl. No. 13/448,802, Non-Final Office Action dated Sep. 7, 2012", 12 pages.
USPTO, "U.S. Appl. No. 10/985,834, Notice of Allowance dated Jun. 3, 2010", 10 pages.
USPTO, "U.S. Appl. No. 12/635,464, Notice of Allowance dated Mar. 12, 2013", 9 pages.
USPTO, ".S. Appl. No. 12/861,263, Notice of Allowance dated Jul. 9, 2011", 6 Pages.

(56) References Cited

OTHER PUBLICATIONS

USPTO, "U.S. Appl. No. 13/448,802, Notice of Allowance dated Nov. 15, 2012", 7 pages.
USPTO, "U.S. Appl. No. 13/762,496, Notice of Allowance dated Aug. 1, 2013", 15 pages.
USPTO, "U.S. Appl. No. 13/912,966, Notice of Allowance dated Jul. 25, 2014", 27 pages.
USPTO, "U.S. Appl. No. 14/521,658, Non-Final Office Action dated Nov. 16, 2016", 12 pages.
USPTO, "U.S. Appl. No. 13/292,786, Notice of Allowance dated Feb. 10, 2012", 11 pages.
USPTO, "U.S. Appl. No. 14/521,658, Notice of Allowance dated Mar. 15, 2017", 7 pages.
CPO, "CA Application No. 2,708,362 Office Action dated Sep. 16, 2015", 3 pages.
Canadian Patent Office, "Canadian Application Serial No. 2,708,362, First Office Action dated Feb. 17, 2015", 4 pages.
Chinese Patent Office, "Chinese Application No. 200880126507.4, Fourth Office Action dated Jan. 7, 2015", English and Chinese Translations, 16 Pages.
SIPO, "Chinese Application No. 201380029881.3 First Office Action dated Nov. 2, 2016", English and Chinese, 6 pages.
Chinese Patent Office, "Chinese Application Serial No. 200880126507.4, Fifth Office Action dated Jun. 16, 2015", English and Chinese Translations, 8 Pages.
SIPO, "Chinese Application Serial No. 200880126507.4, Second Office Action dated Aug. 19, 2013", Chinese Translations, 7 pages.
SIPO, "Chinese Application Serial No. 200880126507.4, Second Office Action dated Aug. 19, 2013", English Translations, 9 Pages.
SIPO, "Chinese Application Serial No. 200880126507.4, Third Office Action dated May 1, 2014", English and Chinese translations, 13 pages.
SIPO, "Chinese Application Serial No. 200980156506.9, First Office Action dated Jul. 1, 2013", Chinese and English Translations, 7 pages.
SIPO, "Chinese Application Serial No. 200980156506.9, Second Office Action dated Apr. 14, 2014", Chinese and English translations. 6 pages.
SIPO, "Chinese Application Serial No. 200980156506.9, Third Office Action dated Dec. 12, 2014", Chinese and English Translations, 6 Pages.
EPO, "EP Application Serial No. 08860724.7, European Office Action dated Jul. 11, 2014", 4 pages.
European Patent Office, "EP Application Serial No. 09832552.5, European Office Action dated Jul. 17, 2015", 5 pages.
EPO, "EP Application Serial No. 09832552.5, European Office Action dated Oct. 17, 2014", 4 pages.
EPO, "EP Application Serial No. 09832552.5, European Search Report dated Jul. 4, 2013", 5 pages.
EPO, "EP Application Serial No. 13800281.1, EP Supplemental Search Report dated Dec. 10, 2015", 6 pages.
ISA, "International Application Serial No. PCT/US08/86295, PCT Search Report and PCT Written Opinion dated Aug. 21, 2009", 13 Pages.
WIPO, "International Application Serial No. PCT/US13/044752, Preliminary Report on Patenability dated Dec. 18, 2014", 8 pages.
ISA, "International Application Serial No. PCT/US13/44752, Search Report and Written Opinion dated Nov. 13, 2013", 9 pages.
ISA, "International Application Serial No. PCT/US2009/67535, Search Report and Written Opinion dated Mar. 23, 2010", 13 Pages.

* cited by examiner

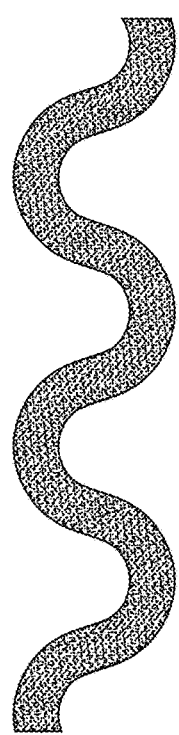
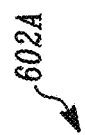
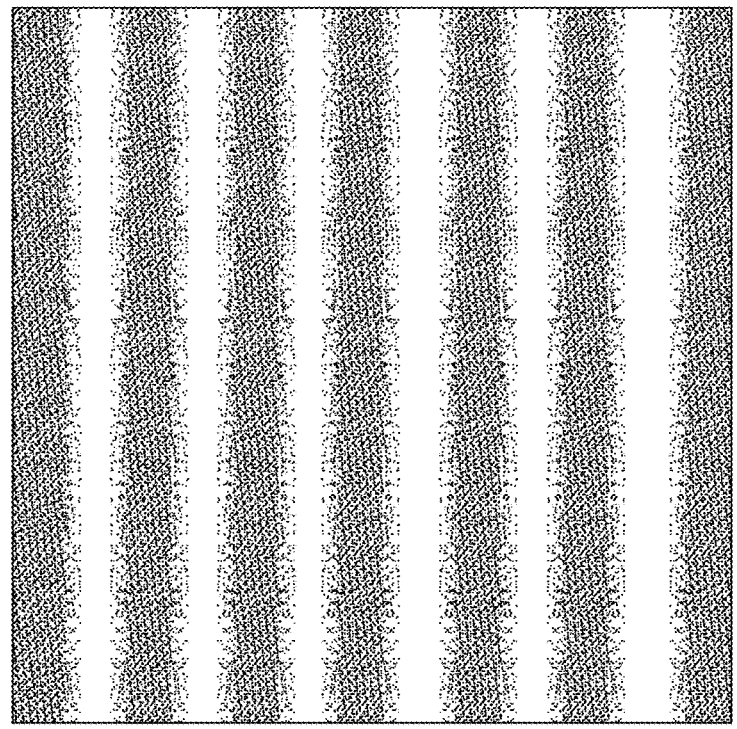
FIG. 6B
FIG. 6A

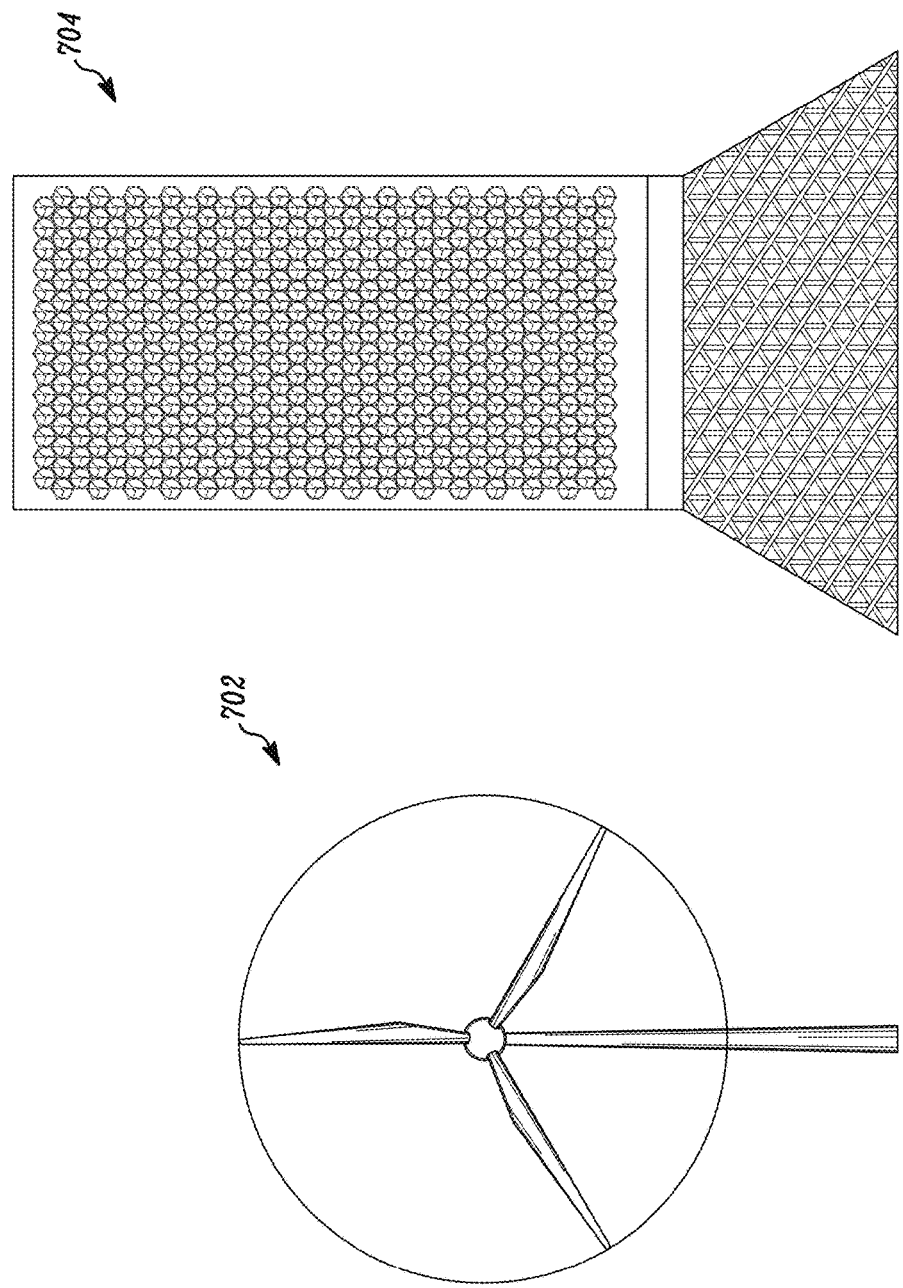

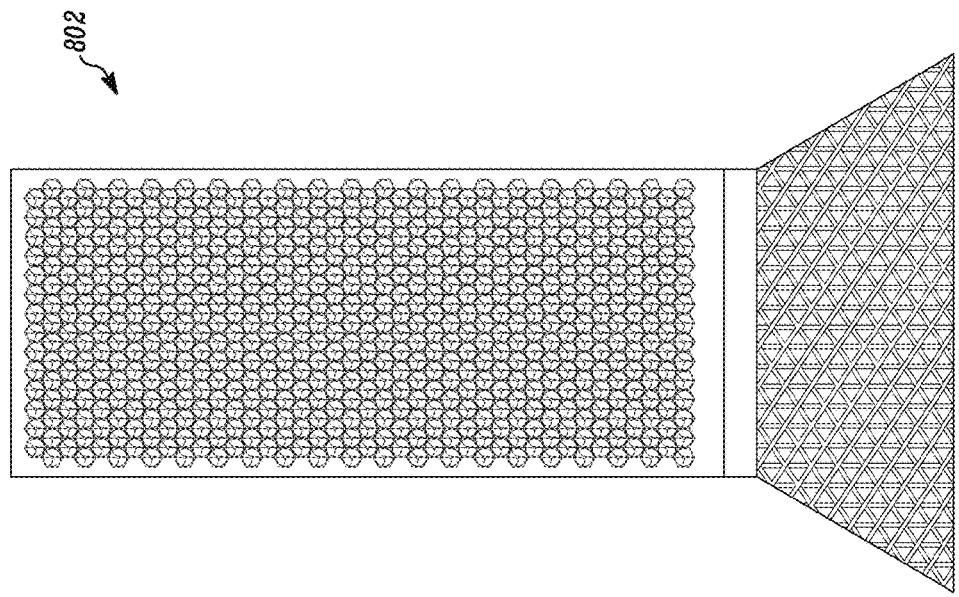
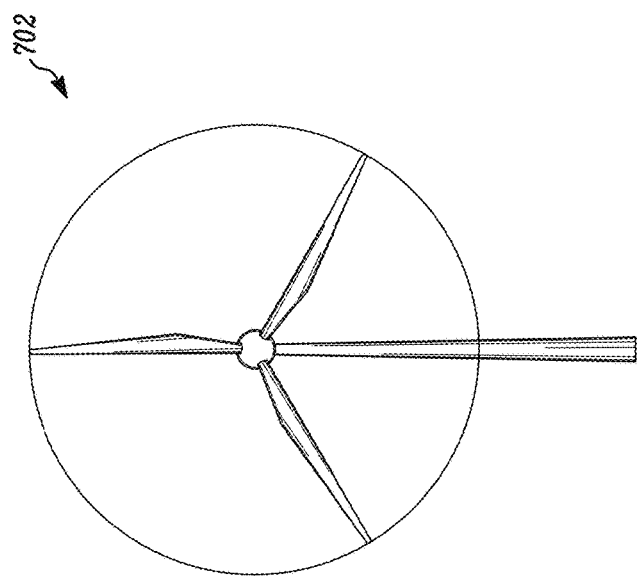
FIG. 8

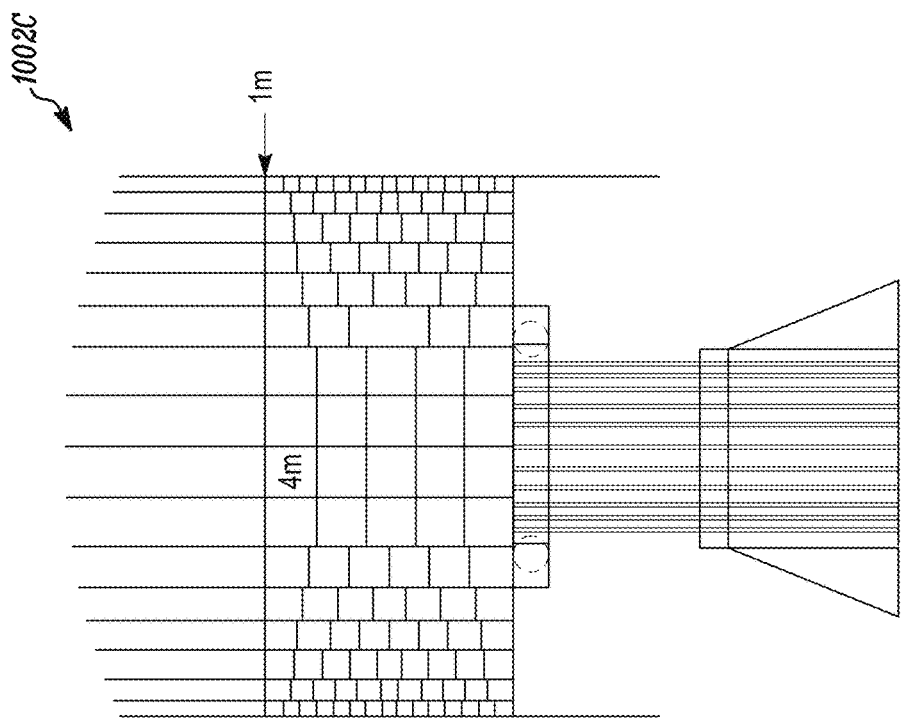
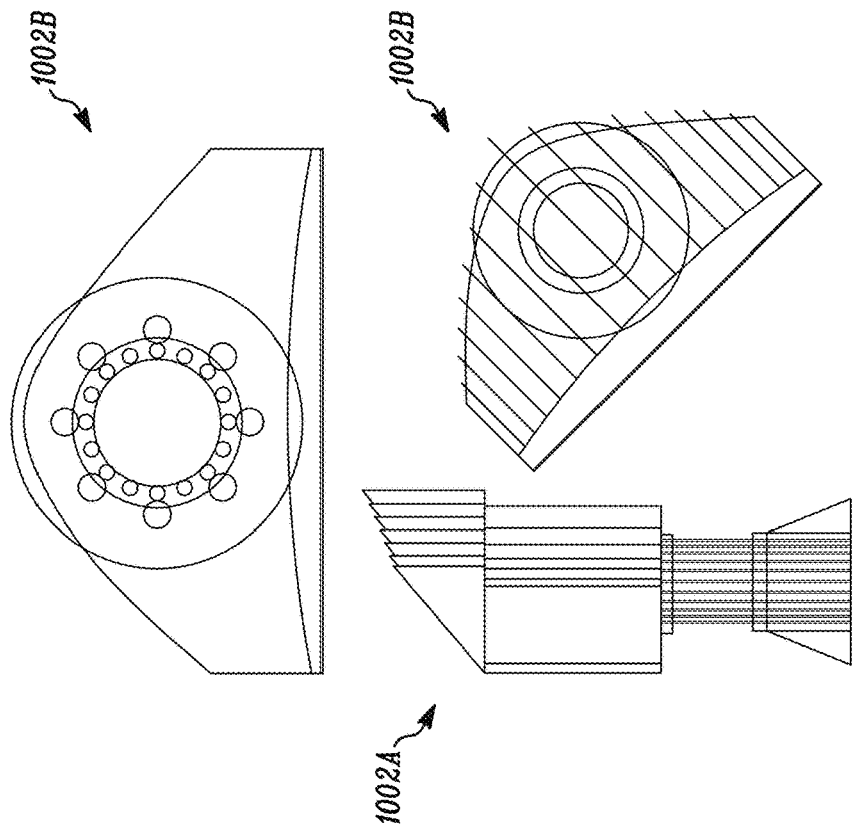
FIG. 10

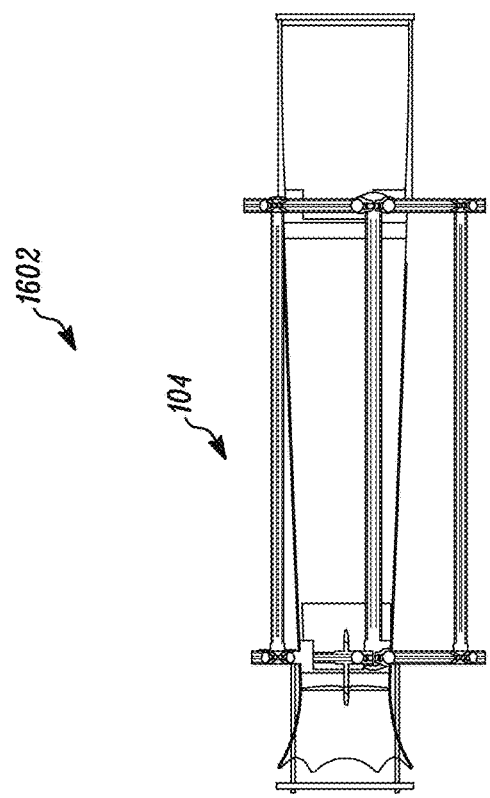
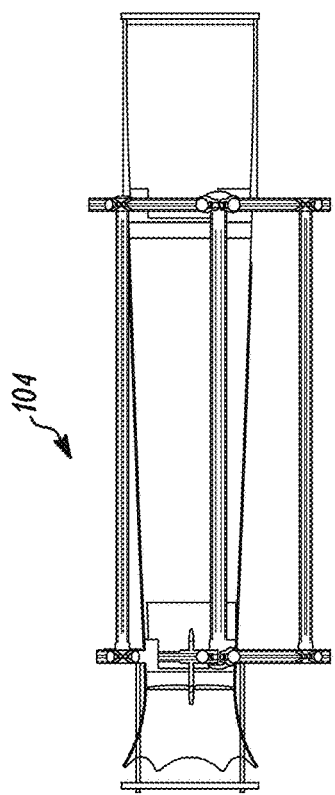
FIG. 16

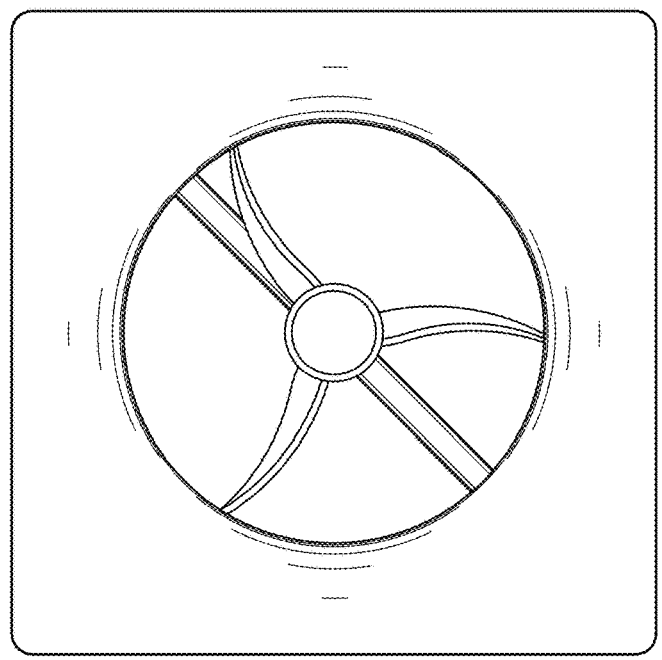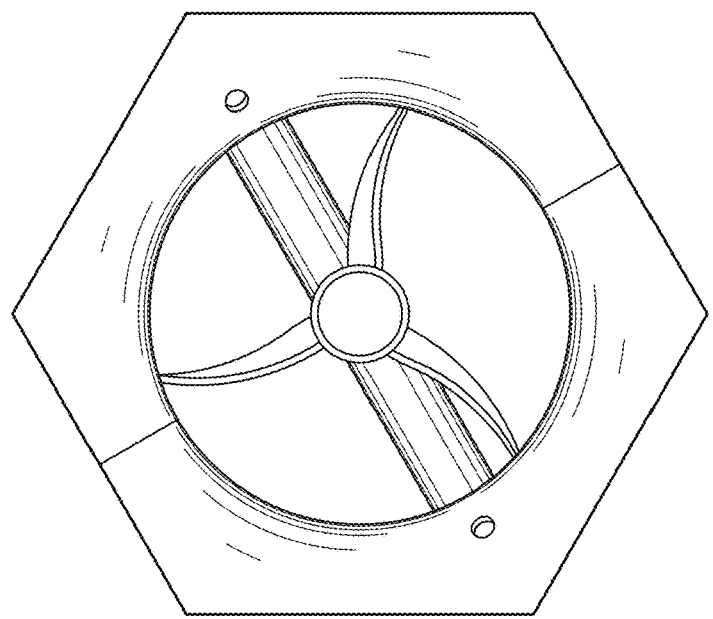
FIG. 24

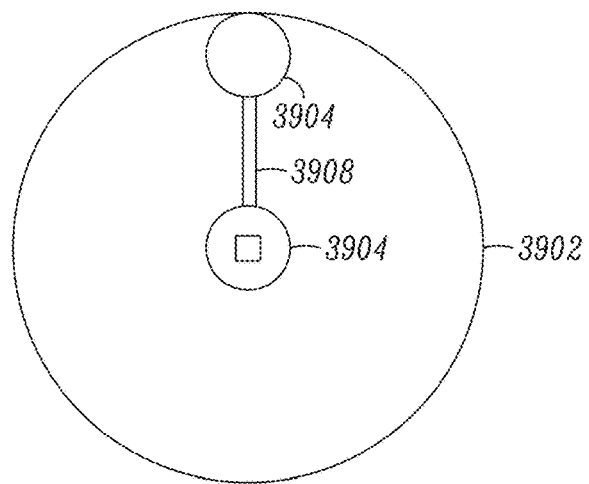
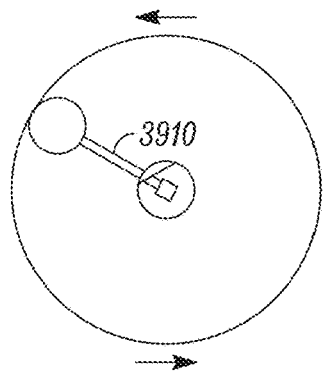
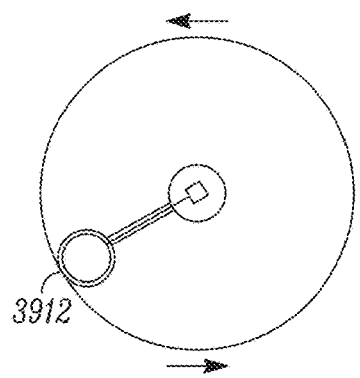
FIG. 39

SIDE ELEVATION

FRONT ELEVATION

EXTERIOR STRUCTURE - POLYGONAL VARIATION OF CROSS SECTION

FIG. 62

EFFICIENT SYSTEMS AND METHODS FOR CONSTRUCTION AND OPERATION OF MOBILE WIND POWER PLATFORMS

CROSS-REFERENCE TO RELATED APPLICATIONS

This application is a continuation of U.S. patent application Ser. No. 14/521,658 filed Oct. 23, 2014, which is hereby incorporated by reference in its entirety.

Application Ser. No. 14/521,658 is a continuation of U.S. patent application Ser. No. 13/912,966 filed Jun. 7, 2013 (now U.S. Pat. No. 8,937,399 issued Jan. 20, 2015), which claims the benefit of U.S. Provisional Patent Application No. 61/656,816 filed Jun. 7, 2012, each of which is hereby incorporated by reference in its entirety.

Application Ser. No. 13/912,966 is a continuation-in-part of the following U.S. patent application, which is hereby incorporated by reference in its entirety: U.S. patent application Ser. No. 12/635,464 filed Dec. 10, 2009 (now U.S. Pat. No. 8,482,146 issued Jul. 9, 2013).

The application Ser. No. 12/635,464 is a continuation-in-part of the following U.S. patent application, which is hereby incorporated by reference in its entirety: U.S. patent application Ser. No. 12/332,313 filed Dec. 10, 2008 (now U.S. Pat. No. 7,804,186 issued Sep. 28, 2010).

The application Ser. No. 12/332,313 claims the benefit of the following provisional application, which is hereby incorporated by reference in its entirety: U.S. Patent Application No. 61/012,759 filed Dec. 10, 2007.

FIELD OF INVENTION

The present invention is related to energy conversion, and in certain preferred embodiments to the energy conversion from a fluid flow, such as wind, to another type of energy, such as electrical energy.

BACKGROUND

The conversion of energy from a fluid flow, such as from the wind, to electrical energy has been typically implemented in the past with large singular horizontal axis turbines. The energy conversion efficiency for such a configuration may be limited. As alternate energy sources such as wind energy are increasingly utilized to counter the rising energy costs of fossil fuels, it becomes more vital that energy efficiencies associated with these alternate energy sources be maximized.

Current renewable systems that produce any meaningful level of power are typically large, complex, fixed installation systems, such as geothermal plants, solar arrays, large wind turbines, dams that include large water turbines, and the like. For such systems site parameters are often inflexible, as it is difficult to find adequate space in locations that are well suited to produce energy but that do not raise objections, such as for aesthetic reasons. Site location, approval, and preparation costs often represent a significant portion of the cost of producing energy. In such large systems installation costs also typically represent a substantial portion of the final cost of energy. In wind systems initial costs typically include obtaining site approvals (which are often opposed for aesthetic reasons), site preparation, construction of large foundations, transportation costs, costs of assembly of large, complex systems (including necessity for cranes and similar large, expensive equipment), and elevation mechanisms. A need exists for improved methods and systems for converting energy from a fluid flow to electrical energy, especially in the domain of portable wind power platforms.

SUMMARY

In embodiments of the present invention improved capabilities are described for a mobile wind power support structure, comprising a superstructure with mobile platform support structures, and a plurality of deployable rotating wind power structures, wherein the plurality of deployable rotating wind power structures are positioned in the superstructure through a wind orientation facility.

In embodiments, a system may comprise a plurality of interconnected collapsible wind energy conversion modules, at least one of the plurality of wind energy conversion modules comprising a nozzle intake that captures and accelerates a flow of air incident on an entrance of the nozzle intake to a nozzle throat, a rotor positioned in the nozzle throat to receive the flow of air from the nozzle intake to convert the flow of air into a rotational energy, a generator coupled to the rotor that converts the rotational energy of the rotor into an electrical energy, and a diffuser to receive and direct the flow of air from the throat and to an exit of the diffuser, wherein the diameter of the nozzle entrance and the diffuser exit are greater than the diameter of the throat; a collapsible support structure; and a bearing facility connected to the collapsible support structure and supporting the plurality of interconnected collapsible wind energy conversion modules in a manner that permits a rotation of the interconnected collapsible wind energy conversion modules toward the flow of air. The system may also comprise an energy storage facility to store the electrical energy generated by the generator. The system may include an interface for electrical connection to another energy producing facility, a power grid, an energy-using device, and the like. The system may be provided in a portable kit, the portable kit including an adaptor for allowing an electrical interface with another device that is powered by the system and another device, such as a weapon, a sensor system, a medical device, a robotic device, a defense system, a camera, a rechargeable military device, and the like. The wind energy conversion module may comprise a fabric material to facilitate collapsibility. The collapsible support structure may be inflatable. A collapsible interconnection support structure may interconnect the plurality of interconnected collapsible wind energy conversion modules, such as where the collapsible interconnection support structure is inflatable. A leveling system may be provided to level the plurality of interconnected collapsible wind energy conversion modules. The collapsible portion of the wind energy conversion module may be the diffuser, the nozzle intake, and the like. A ratio of the diffuser length to the nozzle intake length may be greater than 5 to 1. The ratio of an area of the entrance of the nozzle intake to an area of the throat may be greater than 2 to 1. Each of the plurality of interconnected collapsible wind energy conversion modules may include an aerodynamic feature that enhances the throughput of the flow of air, where the aerodynamic feature may be a vortex-forming aerodynamic shape, such as on the nozzle intake, the throat, the diffuser, and the like to impart a swirling motion on the flow of air. The aerodynamic feature may be a blade feature on the rotor. A heating element in the wind energy conversion module may heat the air in the air flow to create a pressure differential to increase the throughput of air through the wind energy conversion module.

In embodiments, a method for deploying a portable wind energy facility may comprise providing an array of interconnected collapsible wind energy conversion modules mounted on a collapsible support structure through a bearing facility, wherein each wind energy conversion module comprises a nozzle intake that captures and accelerates a flow of air incident on an entrance of the nozzle intake to a nozzle throat, a rotor positioned in the nozzle throat to receive the flow of air from the nozzle intake to convert the flow of air into a rotational energy, a generator coupled to the rotor that converts the rotational energy of the rotor into an electrical energy, and a diffuser to receive and direct the flow of air from the throat and to an exit of the diffuser, wherein the diameter of the nozzle entrance and the diffuser exit are greater than the diameter of the throat; the integrated bearing facility is connected to the collapsible support structure and supports the array of interconnected collapsible wind energy conversion modules in a manner that permits a rotation of the array toward the flow of air; and the array of interconnected collapsible wind energy conversion modules and the collapsible support structure stowable a shipping container, and deployable from the shipping container as a complete system.

In embodiments, a system may comprise a plurality of interconnected collapsible wind energy conversion modules; a collapsible support structure; and a bearing facility connected to the collapsible support structure and supporting the plurality of interconnected collapsible wind energy conversion modules in a manner that permits a rotation of the interconnected collapsible wind energy conversion modules toward the flow of air, wherein at least a portion of a wind energy conversion module is constructed of a flexible fabric and wherein at least a portion of the support structure is inflatable. At least one of the plurality of wind energy conversion modules may include a nozzle intake that captures and accelerates a flow of air incident on an entrance of the nozzle intake to a nozzle throat, a rotor positioned in the nozzle throat to receive the flow of air from the nozzle intake to convert the flow of air into a rotational energy, a generator coupled to the rotor that converts the rotational energy of the rotor into an electrical energy, and a diffuser to receive and direct the flow of air from the throat and to an exit of the diffuser, wherein the diameter of the nozzle entrance and the diffuser exit are greater than the diameter of the throat. An energy storage facility may store the electrical energy generated by the generator. The system may include an interface for electrical connection to at least one of another energy producing facility, such as a power grid, an energy-using device, and the like. The system may be provided in a portable kit, the portable kit including an adaptor for allowing an electrical interface with another device that is powered by the system and another device, such as a weapon, a sensor system, a medical device, a robotic device, a defense system, a camera, and a rechargeable military device.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 6A and 6B depict linear scalloping on a surface and in profile.
FIG. 7 depicts an 85 m×51 m uniform array compared with the same area of a 75 m horizontal axis wind turbine.
FIG. 8 depicts a 100 m×44 m uniform array compared with the same area of a 75 m horizontal axis wind turbine.
FIG. 10 depicts non-uniform array with orientation tails.
FIG. 16 depicts two nozzles in a serial arrangement.
FIG. 24 depicts examples of nozzle polygon entrances.
FIG. 39 depicts a rotor consisting of a rotatable body with a central mass reservoir.

Figure 62:
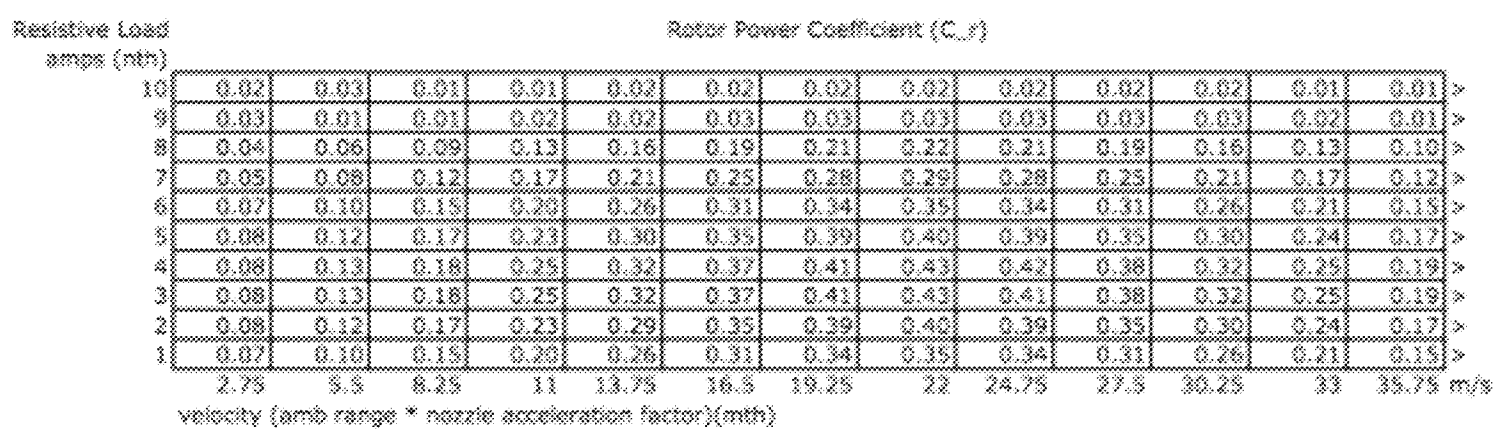

FIG. 62 depicts an embodiment of a conversion matrix.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The present invention may be comprised of an n×m modular array having a plurality of energy producing modules (in certain preferred embodiments, wind turbines) arranged in the array and oriented with respect to a fluid flow, with a plurality of modular energy conversion units optimally placed in a given array configuration to maximize energy output.

Figure 1:
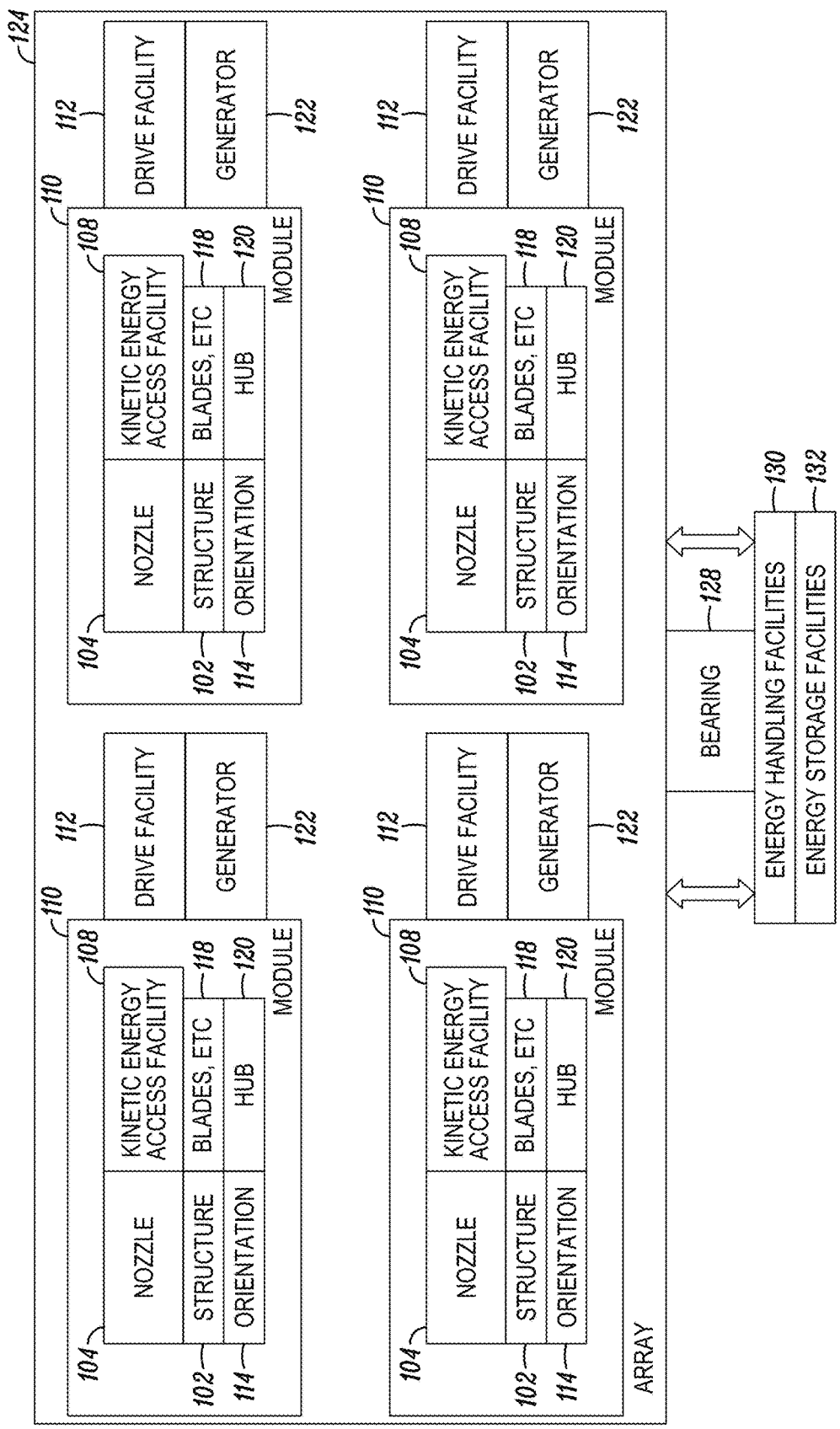
FIG. 1 depicts a kinetic access facility.

In embodiments, the fluid flow toward which the array is oriented may be preferably a natural or artificial generated differential flow, such as wind, solar chimney, a differential tunnel flow, and the like in the natural case, or in the artificial case, but may also be a "wake" flow or its inverse that is generated by a motive force, such a tide, rotation, fluid, gas displacement, and the like. FIG. 1 depicts an embodiment of the invention, showing components of four representative modules 110 in an array 124 with superstructure and electrical infrastructure, including a nozzle facility 104 (which in turn may have structural characteristics and an orientation facility), a kinetic energy access facility 108 (which may include a rotor, such as with blades and a hub), a drive facility 112 (such as a transmission drive facility), a generator 122, structure 102, orientation facility 114, blades 118, hub 120, and the like. In embodiments, the array 124 of modules 110 may be associated with an integrated or non-integrated superstructure and electrical infrastructure that may interface with energy handling facilities 130 and energy storage facilities 132. It should be understood that any number of modules 110 might be provided in an array 124, with optimal arrays 124 possibly including far more than four modules 110.

As depicted in FIG. 1, a bearing 128, such as a ball roller bearing, and the like, or such as a material property bearing, such as a Teflon bearing or the like, or a fluid bearing, magnetic bearing, monolithic bearing such as a cone/ball bearing, and the like, or some combination bearing having all or a portion of the properties of these bearings may be used to support an array of modules, such as to allow the array to rotate about a vertical axis, allowing the array to be oriented (or to self-orient, as described below in certain preferred embodiments) with respect to a direction of fluid flow. In the case where a magnetic bearing or similar bearing structure is used, the bearing structure may generate additional energy either for immediate use or for temporary storage. The drive facility and generator may be associated with an electrical infrastructure including a conducting medium such as conductive metals, conductive fluids, and the like, such as magnetorhetological fluids, ferrofluid, superconductors, and the like, or a conducting gas, which may be integrated or associated with the superstructure of the array, so that energy from the modules may be passed to an external energy handling facility, and optionally to a local or global energy storage facility, such as a flywheel, compressed air, gravitational storage (pumping fluid, gas or solids up a height differential), battery, plurality of batteries, and the like to an energy conversion facility, such as an electrolysis hydrogen and oxygen production facility, or some combination of transport, end-use, storage, facilities, and the like. In embodiments, the magnetic properties associated with electrical distribution or transmission system may be utilized to help orient the array, such as in generator rotor (e.g. use the magnetic properties of the electrical flow to excite a stator that contains the transportation facility).

Figure 2:
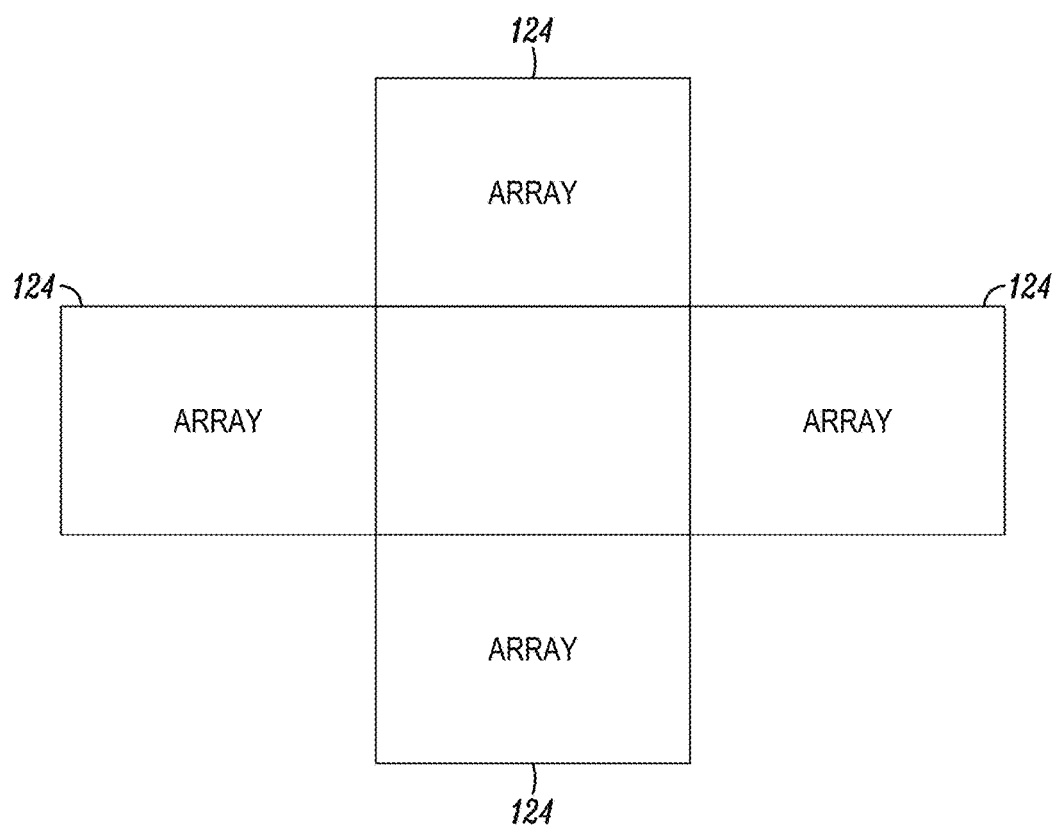
FIG. 2 depicts a kinetic access facility array.

Referring to FIG. 2, arrays 124 such as those described in connection with FIG. 1, each containing a plurality of modules 110, may in turn be configured into a plurality of arrays 124, arranged with respect to each other and oriented with respect to a direction of fluid flow. FIG. 2 shows one possible view of four arrays 124 configured in a checkerboard pattern, which is one preferred embodiment of a grouping of arrays 124. In embodiments, arrays 124 may be arranged in a number of combinations, such as the checkerboard described herein, which may use a matrix to divide a given site. One option may be a diamond pattern with spacing ranging from the 1×1 checkerboard implementation to an n×m implementation where the 1-n may refer to the number of cells by which the diamond is formed. Another option may be a curved arrangement wherein the rate of curvature can range from 0 to 1 with the spacing structure ranging from 1 to n. Alternatively the matrix may be filled completely dependent on the particular properties of the arrays deployed in the formation. Additionally the arrays may be co-mounted on singular substructures in any of the distributions of machines described herein. In embodiments, the present invention may provide an array of nozzles adapted to generate electrical power from the flow of air. The array may be configured with arrays located in a matrix arrangement with a plurality of similar arrays, such as embodied in a checkerboard pattern, a diamond pattern, a regular pattern, an irregular pattern, a curved pattern, filled pattern, and the like.

Figure 3:
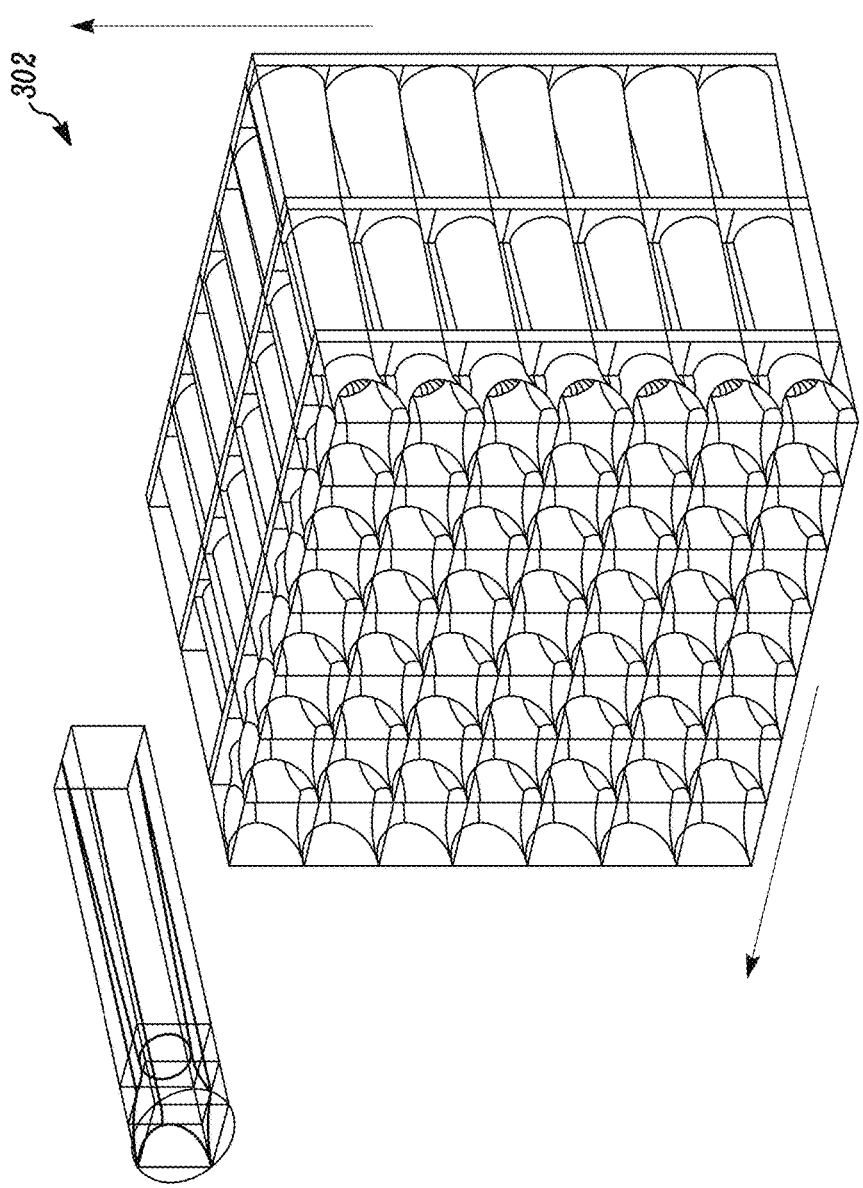
FIG. 3 depicts a square polygon expansion exit, module, and array.

As shown in FIG. 3, the n×m modular array 302 may be comprised of a scalable modular networked superstructure providing both support for at least one module and the facility for power control, management, and collection of power from individual modules, and conversion and transfer of said power to either a plurality of storage units, a grid, or a combination thereof. In embodiments, the present invention may provide an array of nozzles adapted to generate electrical power from the flow of air, where the array may be supported by a scalable modular superstructure. The superstructure may be a modular assembly employing a shape such as a space frame type, geodesic, orthogonal, and the like. The superstructure may be of a nozzle-structural integrated type, such as a flexible pressure based integrated structure, a rigid cell integrated structure, and the like. The superstructure elements may be connected by a connection facility such as a weld, a glue, a contact fusing facility, a locking mechanism, and the like. In embodiments, the superstructure may include structural components and connectors which can be assembled on-site. The superstructure and its elements may have a complex local and global 3 dimensional topography, such as to maximize load bearing properties, minimize material use, minimize material weight, and the like. Structural members of the superstructure may have a uniform circular profile, polygonal profile, elliptical profile, square profile, triangular profile, n-pointed star profile, and the like. Structural members of the superstructure may have a variable profile, such as with linear scalloping, radial curvature variability, elliptical curvature variability, square variability, and the like. The members of the superstructure may be an isotruss type variable solidity structure. The elements of the superstructure may include at least one of a polymer, composite, metallic foam, composite foam, alloy, and the like.

Figure 4:
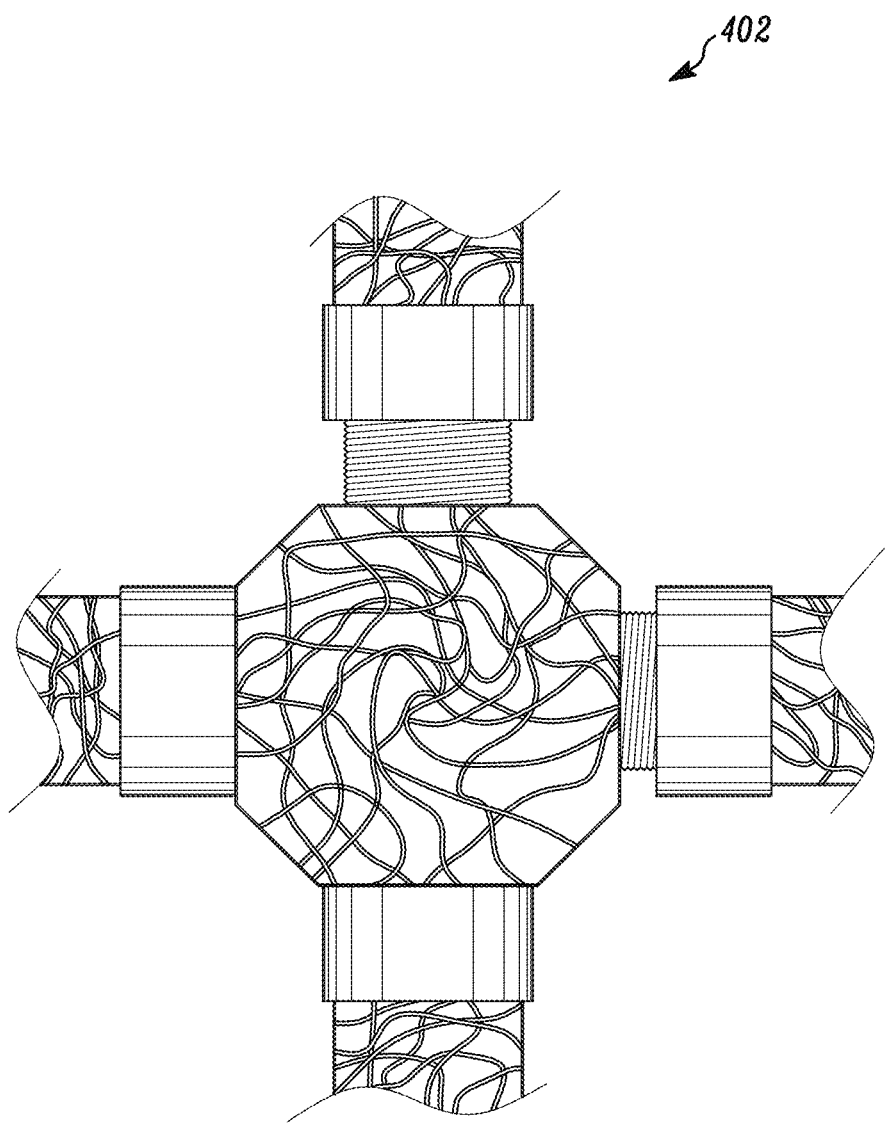
FIG. 4 depicts a complex topography connector and members.

FIG. 4 shows an embodiment of a complex topography connector and members 402. In embodiments, this may provide an example of complex mold topography intended to reduce material use and maximize structural properties, and take the form of surface structures, profiles, variable solidity structures, and the like.

Figure 5A:
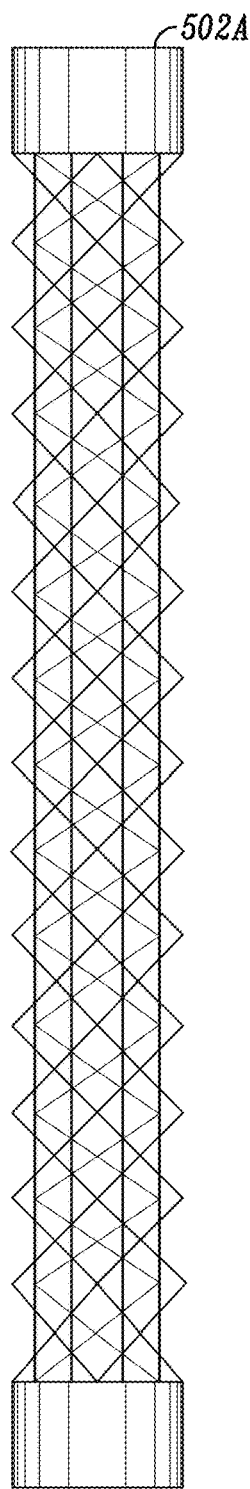
FIGS. 5A and 5B depict examples of structural members of variable density and profile.
Figure 5B:
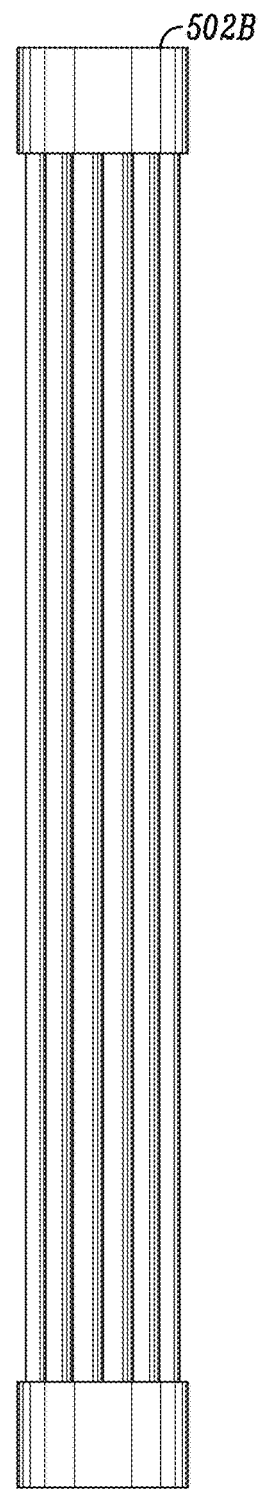

FIGS. 5A and 5B show embodiments of structural members 502A and 502B. These examples may be of structural members of variable density and profile. These may represent a subset of possible complex topography members. For example, the member 502A one on the left may be made by filament winding, and the member 502B to the right may be extruded or molded fiber reinforced plastic.

FIGS. 6A and 6B show an embodiment of linear scalloping, such as for a wall nozzle, structural member, and the like. This may provide a complex wall for the nozzle, structural member, and the like. The depiction of linear scalloping 602A to the left represents a scalloping surface orientation, and the depiction of linear scalloping 602B to the right represents the scalloping in a profile view.

The superstructures, may be self-orienting (such as due to the shape of the nozzle) and may include methods or systems to mechanically (as described herein) or otherwise control the orientation of the array, or of a module within the array, with regard to the direction of the fluid flow in a fixed implementation. Methods of mechanical orientation may include yaw motors, stored energy flywheels, and the like, or other methods known in the art. Alternately, they may be mounted onto a mobile platform to seek out optimal flow conditions. In embodiments, the present invention may provide an array of nozzles adapted to generate electrical power from the flow of air. The array may include self-orienting nozzles, self-orienting nozzles configured with a non-mechanized element that uses airflow to orient the nozzles, self-orienting nozzles with independent orientation at different locations in the array, and the like. The array may include a nozzle capable of orientation to a vertical component of airflow. In embodiments, the present invention may provide a nozzle adapted for use in a wind power generating turbine. The nozzle may be configured to be capable of orientation to a vertical component of the wind. In addition, the nozzle may be self-orienting relative to the direction of the wind, such as when there is a tail on the nozzle.

The superstructure may be supported by a number of methods and systems depending on the nature of the flow, such as floatation suspension, tower/towers, building integration, cable suspension, and the like. Additionally arrays may be fabricated of materials that enable a lighter than air implementation. In embodiments, the present invention may provide an array of nozzles adapted to generate electrical power from the flow of air, where the array may be supported by a scalable modular superstructure. The superstructure may be a suspension type of superstructure, supported by a lighter-than-air mechanism, and the like. In embodiments, the present invention may be mounted on land or at sea, attached to existing structures such as a building, bridge, tower, and the like, or stand alone as a dedicated structure.

The superstructure may be executed as a separate modular support structure inclusive of the method of load bearing and power distribution. The superstructure elements may also be integrated into the nozzle structure such that the module becomes a wholly contained element. In this case the preferred superstructure may provide a columnar method of plugging the integrated module into the power system. In embodiments, the present invention may provide an array of nozzles adapted to generate electrical power from the flow of air, where the array may be supported by a scalable modular superstructure. The superstructure may be of a variable type, such as with regard to load bearing properties, structural properties, and the like. The elements of the superstructure may be of a uniform type with regard to load bearing properties, structural properties, and the like. The elements of the superstructure may be variably adapted to the lowest cost solution for local load bearing parameters within the array. In embodiments, the superstructure may be rigid, may have global flexing mechanisms to accommodate live loading, may have local flexing mechanisms to accommodate live loading, and the like.

As shown in FIG. 7 and FIG. 8, the array implementation may provide various advantages. First it may allow the modules to cover any given area without being subject to the inefficiency introduced by the length of an efficient divergent component. Secondly the implementation need not be uniform as in a horizontal-axis wind turbine (HAWT). By housing the n×m modular array in such a superstructure, the structural upper limit of flow area or plane a system can cover and gather energy from may be substantially increased. By covering, say, a rectangular area, the upper rows of an array may be producing energy, if wind is the medium, potentially at a substantially faster mean velocity than lower modules (because the wind is greater at the top of the array than it is closer to the ground). This means that in addition to the increases engendered by the modules, the array structure itself may engender an increase. In this regard, if the medium is wind, a structure wherein the height is greater than the width may be the most efficient use of the plane for energy production with the multiple of power production increasing as the height value increases from a baseline wherein the height value is less than the width value. For example, both FIG. 7 and FIG. 8 depict a HAWT 702 that has a 75 meter diameter circular sweep area of approximately 4400 sq. m., and with a hub height of 50 m with a wind speed of 6 m/s. In FIG. 7 the array implementation 704 has an equivalent swept area provided with a 50 meter wide array area with the lowest row at 30 meters and wind speed of 5.4 m/s, and an upper row at 117 meters with a wind speed of 7.6 m/s. In FIG. 8, the same swept area is accommodated with an array implementation 802 of the same lower height and wind speed, but this time with a narrowing 44 m width and higher upper row, now with an elevated wind speed f 8.1 m/s. In embodiments, the present invention may provide an array of nozzles adapted to generate electrical power from the flow of air. The array may be of variable width at different heights. The depth of the array may be less than or equal to the width of the array, such as greater than or equal to the width of the array, more than about 1.25 times the width of the array, more than about 2 times the width of the array, and the like.

In this system the dynamic pressure acting on the structure may be distributed equally through the structure as opposed to being focused on a propeller root or tower as in most horizontal axis machines thereby expanding the overall swept area that can be covered per linear foot of machine width. Additionally, nozzle efficiency may reduce dynamic pressure on the structure. The determination of the number of modules in a given array implementation may be predicated on the necessary nozzle length ratio, structural loading, and desired energy output.

Figure 9:
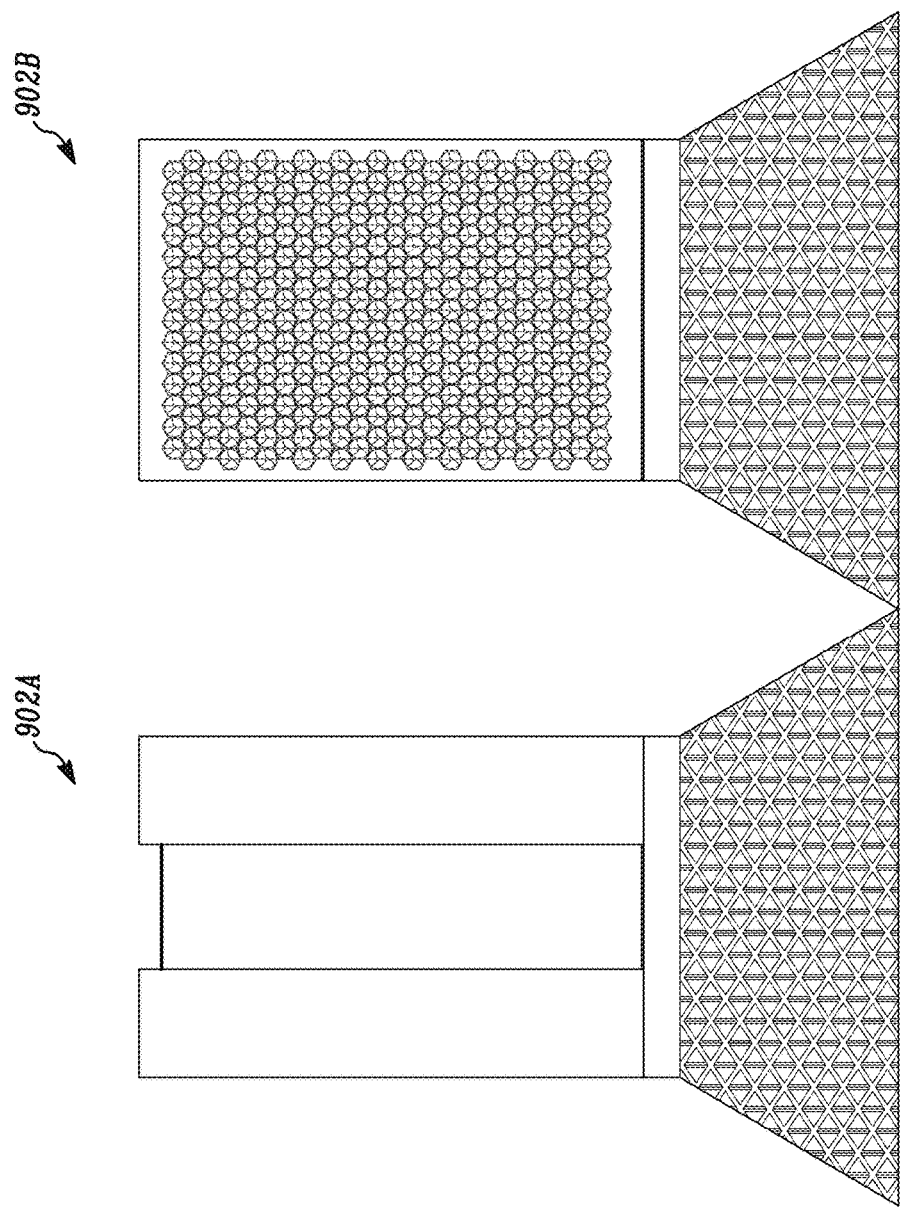
FIGS. 9A and 9B depict a series of arrays side and front elevations.

Some array geometries, such as rectangular/square, triangular, trapezoidal, or a combination or inversion thereof (e.g. and inverted trapezoid or a hexagon), in the x,y dimensions may maximize wind plane usage relative to cost. Note that a non-uniform x,y implementation would also fall within the scope of the present invention. Structure in the z dimension may be implemented as a uniform or non-uniform plane, with curvature either of equal or variable depth, or the like. An array of dimensions wherein said wind facing plane is equal to or greater than the depth may provide improved performance in terms of area utilization. In embodiments a configuration wherein the flow-facing width of the machine is greater than depth may provide similar plane coverage as freestanding rotor systems. FIG. 9 depicts a series of arrays side and front elevations 902A and 902B. In addition, superstructures may be mounted to a platform singly or in series in the z dimension.

Modules mounted in the superstructure may be comprised of a nozzle configuration, a single or plurality of energy capture device/s, a single or plurality of flow enhancement surface structures, and the like. The modules and modular elements of the superstructure may be "plug and play" devices allowing maintenance or refitting of the array components to be performed on- or offsite.

Module nozzle geometry may be optimized, based on unique intake-to-throat geometry, exit geometry, volumetric ratios, and a revised theory of fluid dynamic forces, to maximize plane usage, minimize forward and inlet overpressure, entrain and accelerate high percentage flows with at least one optimized fascia to maximize flow establishment, and the like. The nozzle may further be of variable geometry to adapt velocity conditions in the nozzle configuration relative to ambient velocity conditions and help stabilize said velocity within a desired operating range. The variable intake geometry and nozzle configuration geometry may be executed as a single fascia or with a plurality of dependent and independent fascia depending on module size and/or the properties of a given fluid. In embodiments, the present invention may provide an array of nozzles adapted to generate electrical power from the flow of air. The array may include nozzles of variable size, nozzles of variable type, and the like. For instance, variation may relate to constriction rates of the nozzles and or the power generation characteristics of the nozzles. The array may include nozzles of a shape represented by truncation of a catenoid and the nozzles shaped to facilitate air flow at the entrance of the nozzles. The array may be a packed array of nozzles of variable intake shapes, such as hexagonal intake shapes, triangular intake shapes, square intake shapes, octagonal intake shapes, and the like.

Nozzles additionally may be implemented in either single or multistage configurations inclusive of reaccelerating or pressurizing a fluid flow within or exterior to the module for additional use in energy production. Both uniform and non-uniform execution of the array with regard to nozzle geometry and constriction fall within the scope of the invention. In embodiments, the present invention may provide an array of nozzles adapted to generate electrical power from the flow of air. The array may include nozzles configured in series relative to the direction of airflow, configured in a nested series, and the like.

Module energy conversion may be comprised of a plurality of kinetic energy conversion devices, such as single or multi-blade rotors, or other facility for kinetic energy conversion, coupled with a facility for producing a usable form of power such as a generator, a transmission and a generator, multiple generators and a usable form of power electronics, and the like, to control the loading parameters under which the conversion facility operates and to convert or condition the power produced into a usable form by whatever end-use facility may be intended, such as a local grid, national grid, storage, or the like. In embodiments, the conversion may be devices adapted specifically to the optimized and variable properties of the nozzle configuration and module design, wherein the KE conversion and energy producing devices may be integrated to the particular parameters of an embodiment to optimize use of the flow.

To maximize energy production relative to cost across a broad range of wind velocities, a variable blade number rotor may be used as the method of kinetic energy (KE) conversion. In the case of a variable blade number rotor, a self- or mechanically folding blade design may be used, wherein the number of blades is reduced by slotting a divisible number of blades into the preceding blades in the series. Rotors with different numbers of blades and different profiles may have performance profiles that closely fit a given flow velocity range. Since it is desirable to optimize the power output of a flow driven power device, a rotor that adapts the disc solidity presented to the flow may be more efficient at gathering power in the lower speed regimens, and/or under high load conditions, than a fixed solidity rotor. A variable solidity rotor may have a plurality of prime number rotors sets, for example 2, 3, 5, and the like. Rotor sets may be mounted to a series of dual position slip rings wherein when the dynamic force on a given set is exceeded the ring may be released and dynamic force on the blades may shift it to a closed position on the following set of blades. In embodiments, a mechanism may be slotted on closure such that when the dynamic force on the closed blade sets indicates a drop in velocity the blade set is released to open position. In embodiments, the present invention may provide an array of nozzles adapted to generate electrical power from the flow of air. In embodiments, a rotor may be configured to operate within a wind power generating turbine, where the rotor is configured to present a variable number of blades. In embodiments, the number of blades on rotors of nozzles of the array may vary from one nozzle to other nozzle.

Additionally an "inertial" rotor is described wherein the rotational momentum of the blades may be manipulated to alter the inertia of rotor.

Additionally the rotor generator relationship may be executed as in a HAWT wind turbine, with the generator or generators receiving their motive force from a central shaft either directly or through a geared design, as a fully integrated implementation, as an integrated component, and the like.

In a fully integrated implementation the nozzle itself may constitute the generator, wherein the rotor blades may be manufactured as induced, excited, permanent magnet rotors, or with a magnetic fluid such as magneto-rheological fluids and the stator is integrated into the nozzle mold, and the like. An alternative implementation may be one wherein the rotor is attached to a magnetic bearing of the same diameter as the throat to generate power. Another may be the rotor attached to a bearing of the same diameter as throat that is geared on the outward face to drive a plurality of generators surrounding the throat area.

Pressure gradient (PG) enhancement devices/techniques may be used throughout modules and the superstructure to perform the task of both local and global gradient enhancement with respect to flow through the modules and superstructure. PG enhancement may be performed by utilizing properties of thermo and fluid dynamics to create regions of additional fluid sparsity thereby engendering enhanced local and global gradient differentials and allowing the establishment of higher percentage flows through a given module configuration. In addition, a method of achieving directional suction pressure may also be used to enhance the rate of system flow.

Due to the wake profile of the nozzles they may be placed in a wind-farm array in a series of more efficient patterns than is possible with current generation technology, as described herein. For instance, a filled or binary checkerboard pattern may maximize cost to benefit and land use. Additionally, a method of efficient energy storage and integration of buildings and arrays is disclosed herein.

Figure 11:
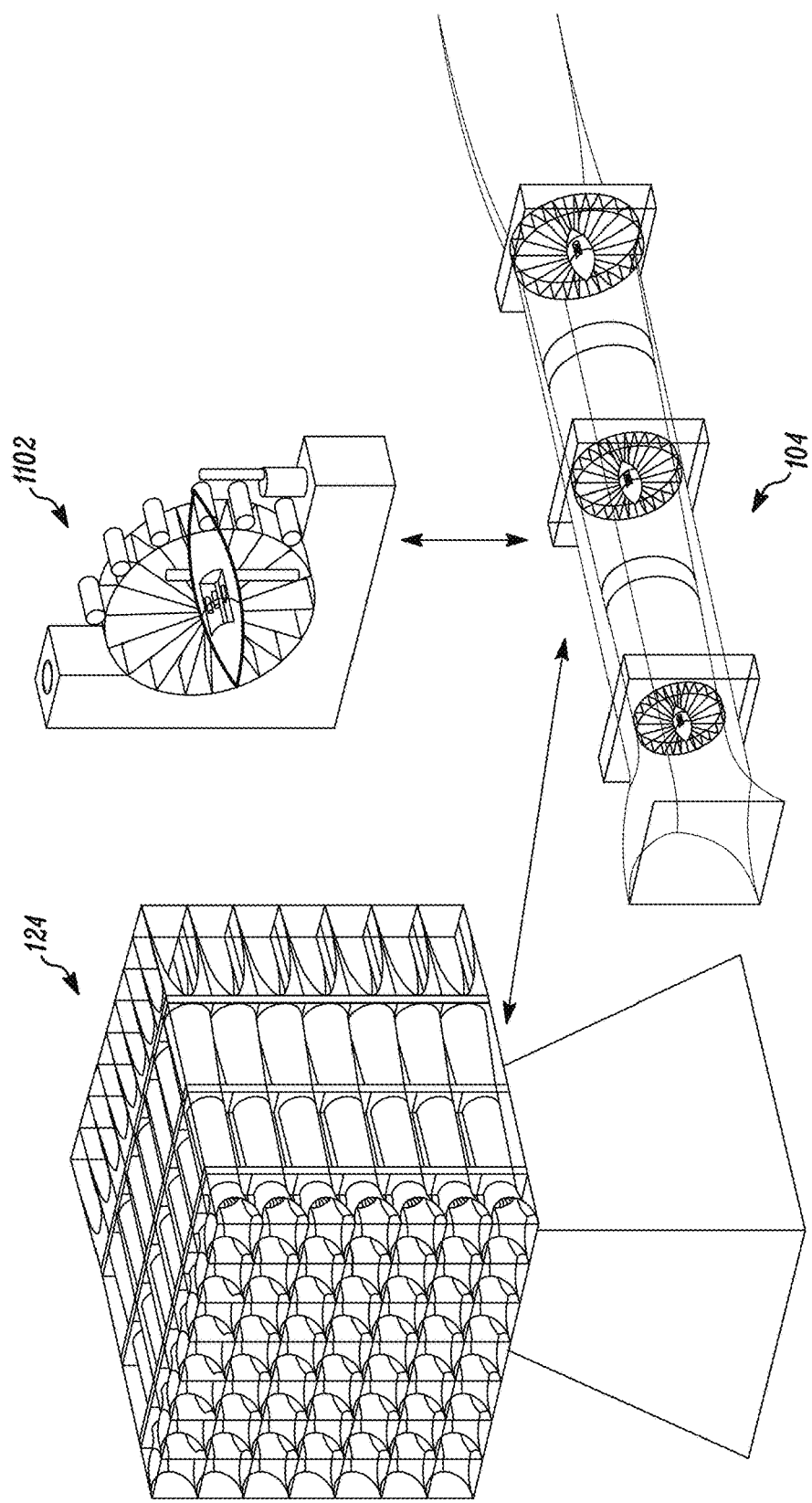
FIG. 11 depicts an array with three integrated generators.
Figure 12:
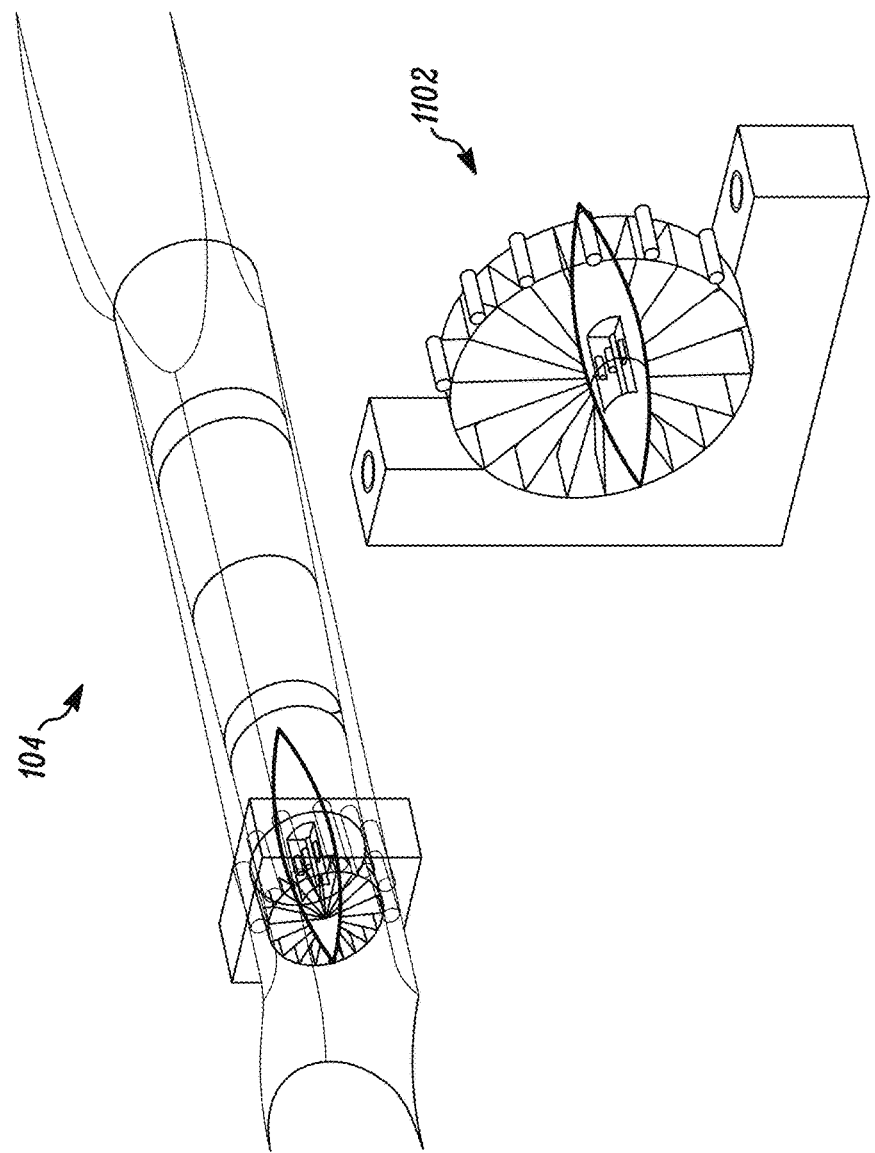
FIG. 12 depicts an integrated generator-module example.
Figure 13:
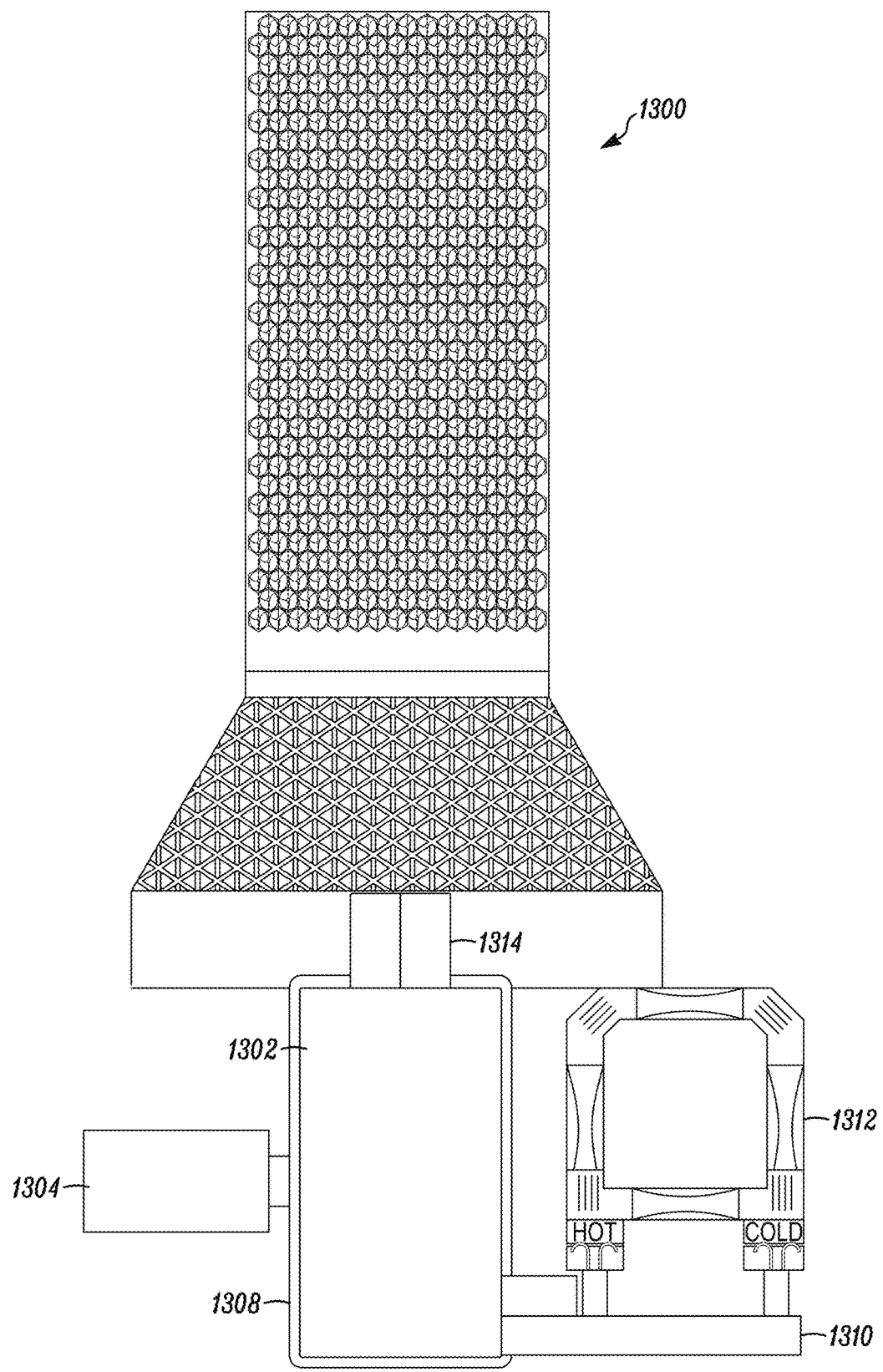
FIG. 13 depicts an array with storage.
Figure 14:
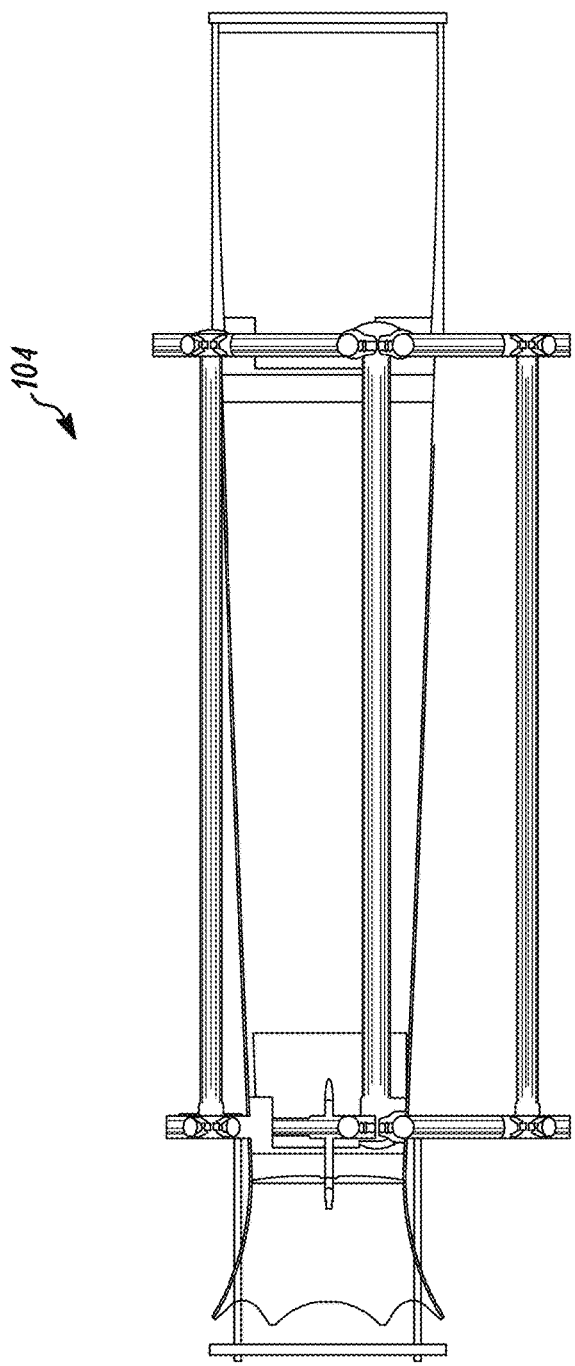
FIG. 14 depicts a module in a triangular superstructure.
Figure 15:
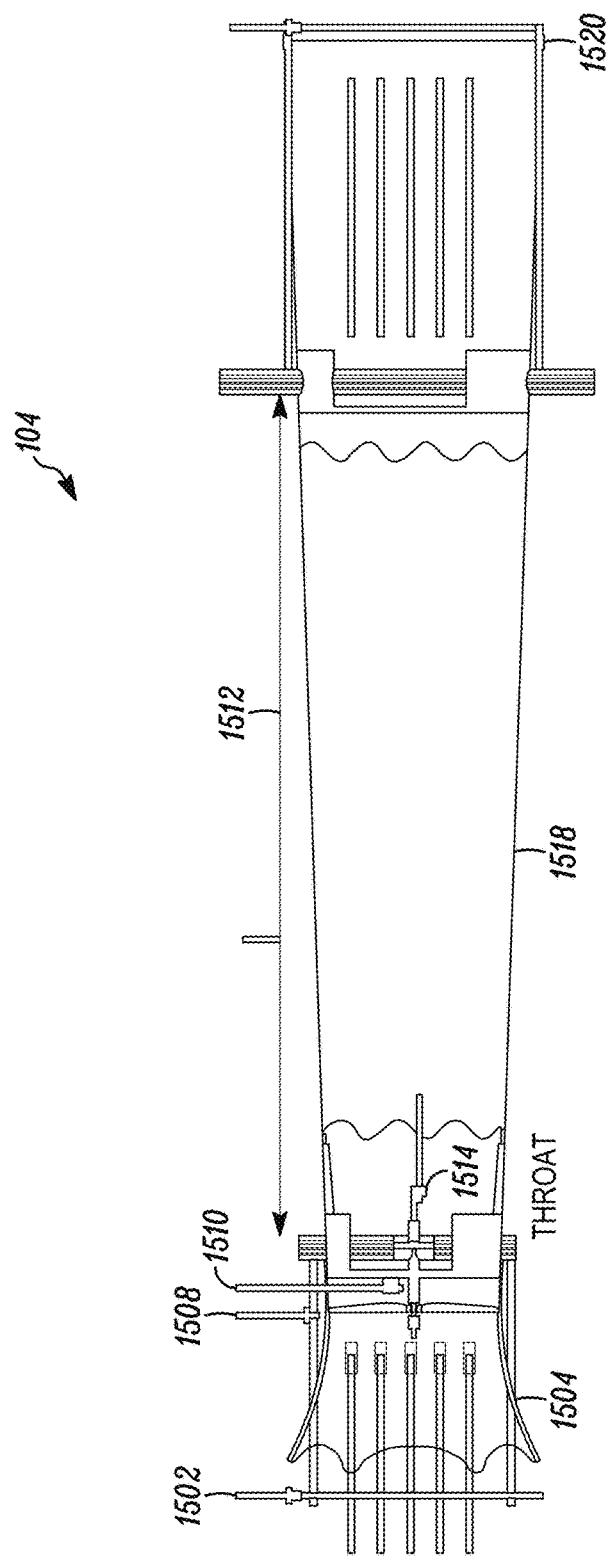
FIG. 15 depicts components of a nozzle.
Figure 17:
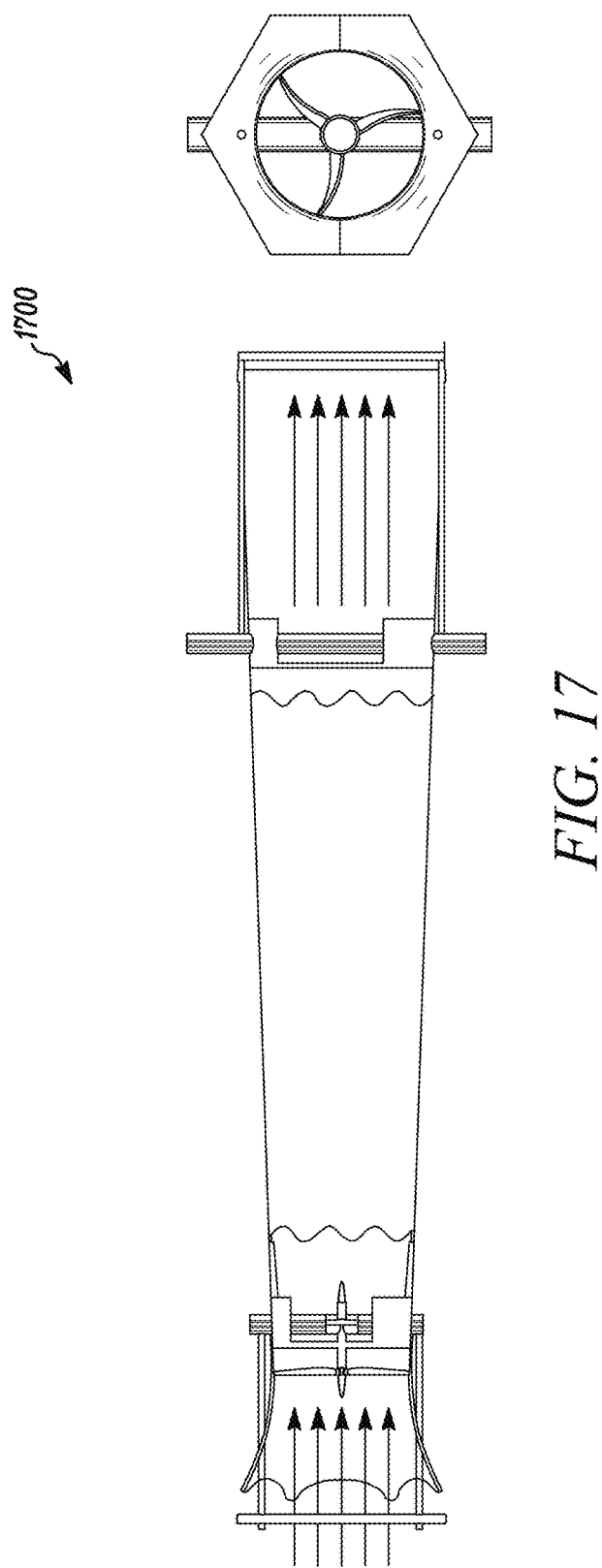
FIG. 17 depicts a side elevation of a hexagonal nozzle.
Figure 18:
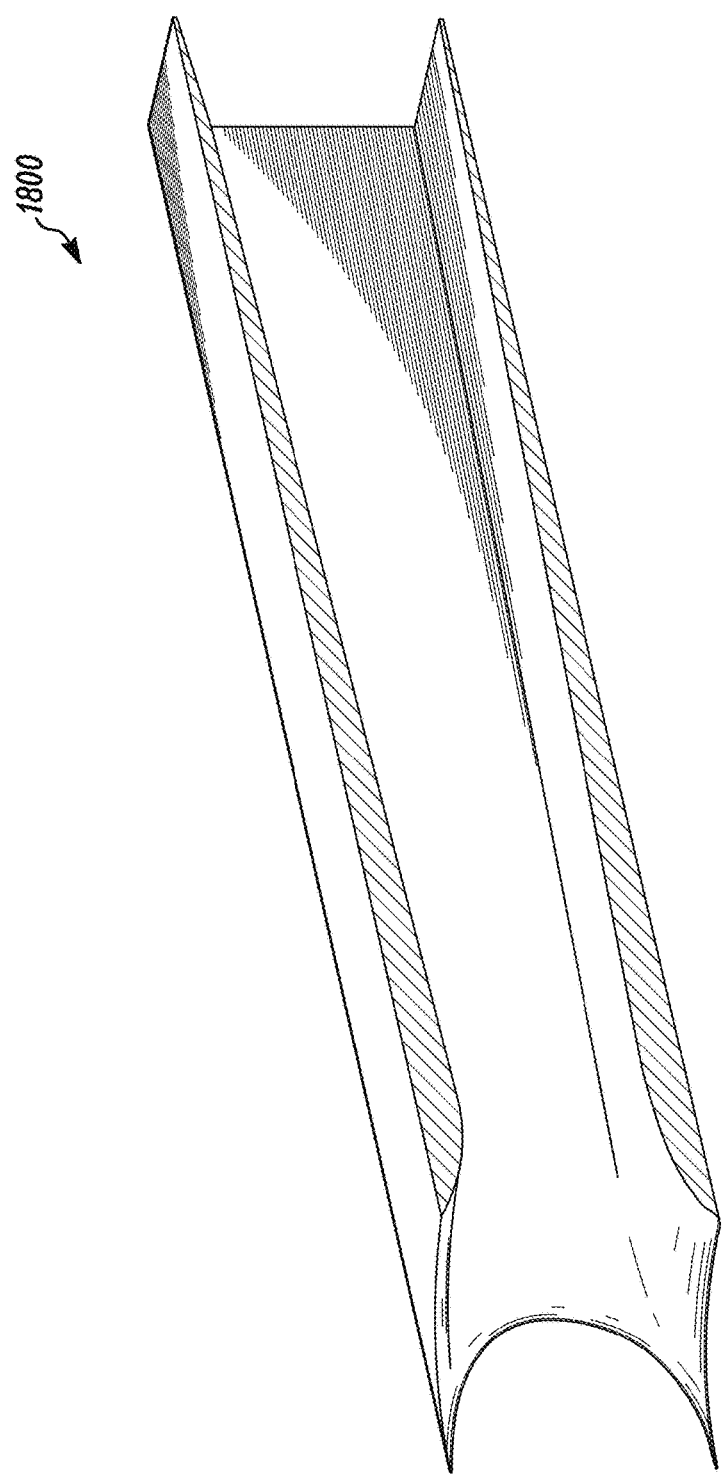
FIG. 18 depicts a nozzle with a circular throat and polygonal exit.
Figure 19:
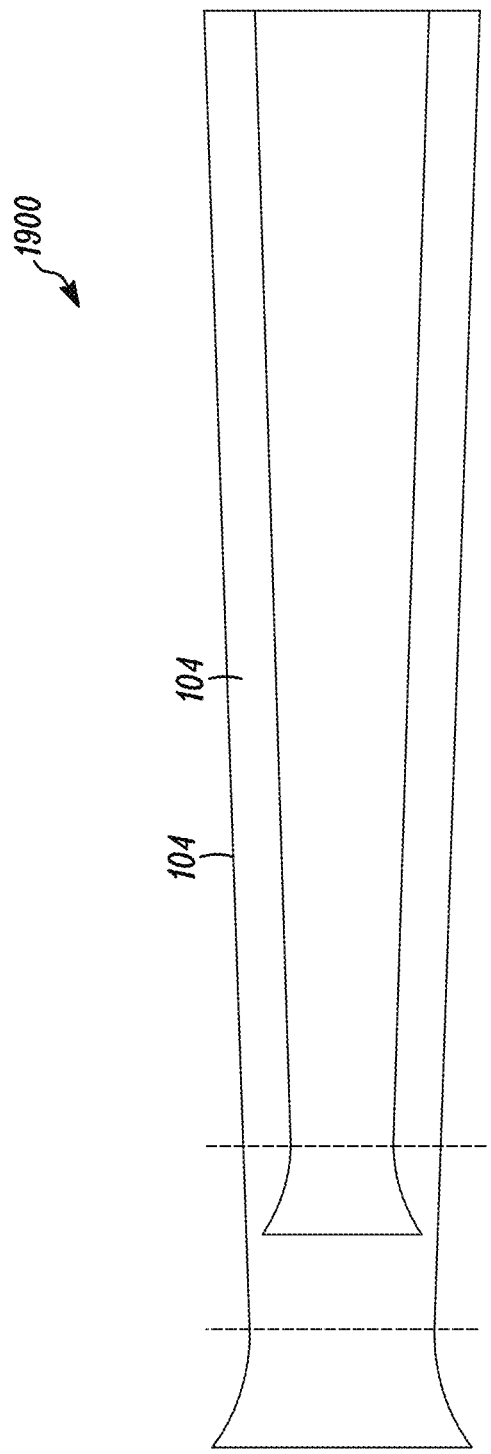
FIG. 19 depicts two nested nozzles.
Figure 20:
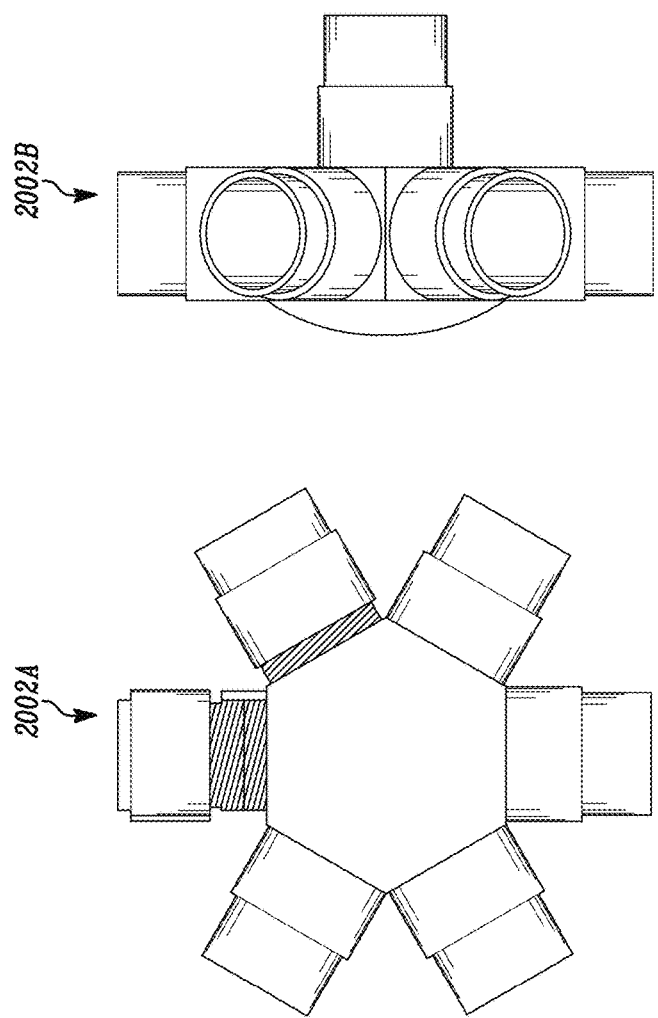
FIG. 20 depicts a superstructure connector.
Figure 21:
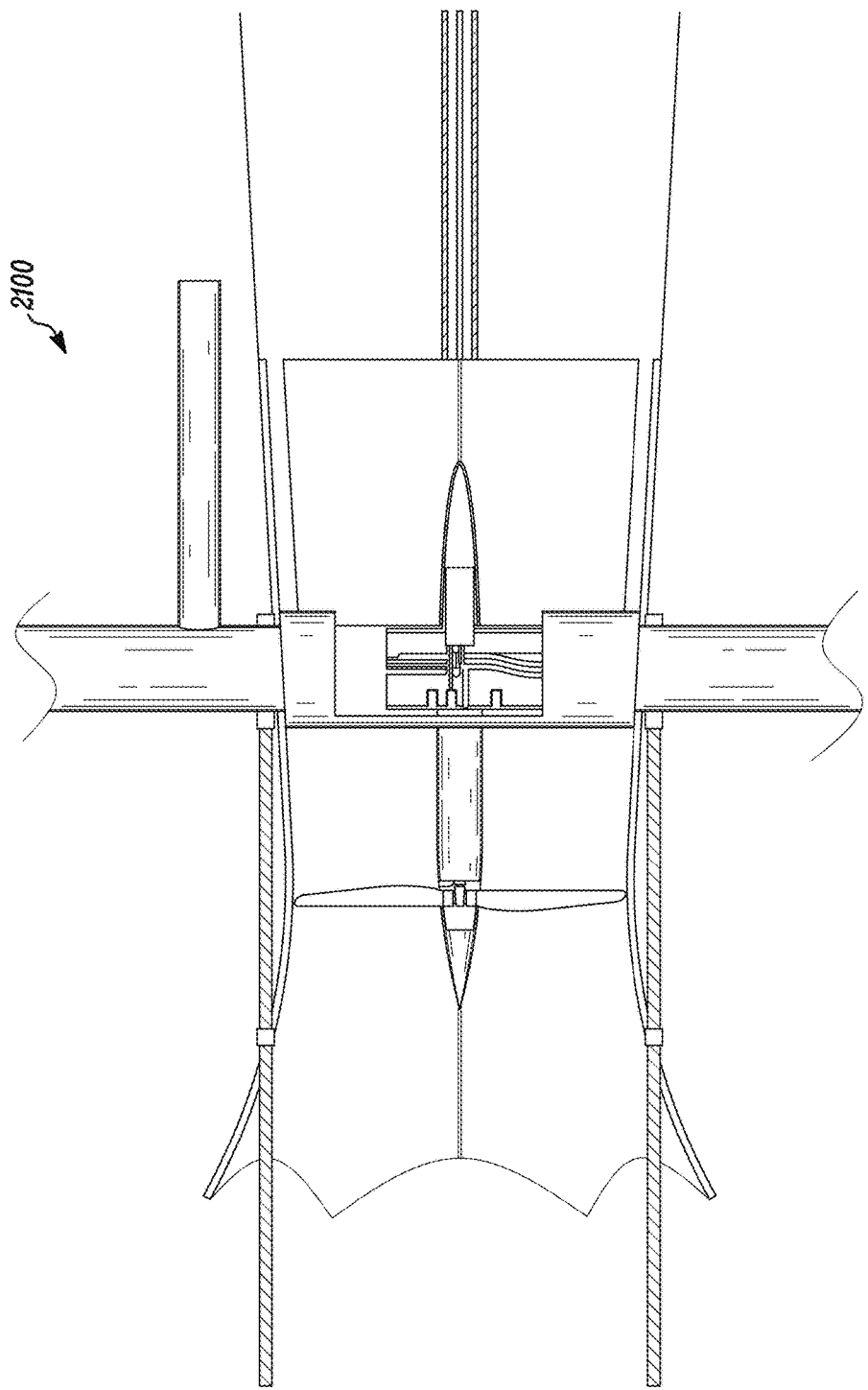
FIG. 21 depicts a horizontal axis wind turbine generator arrangement.
Figure 22:
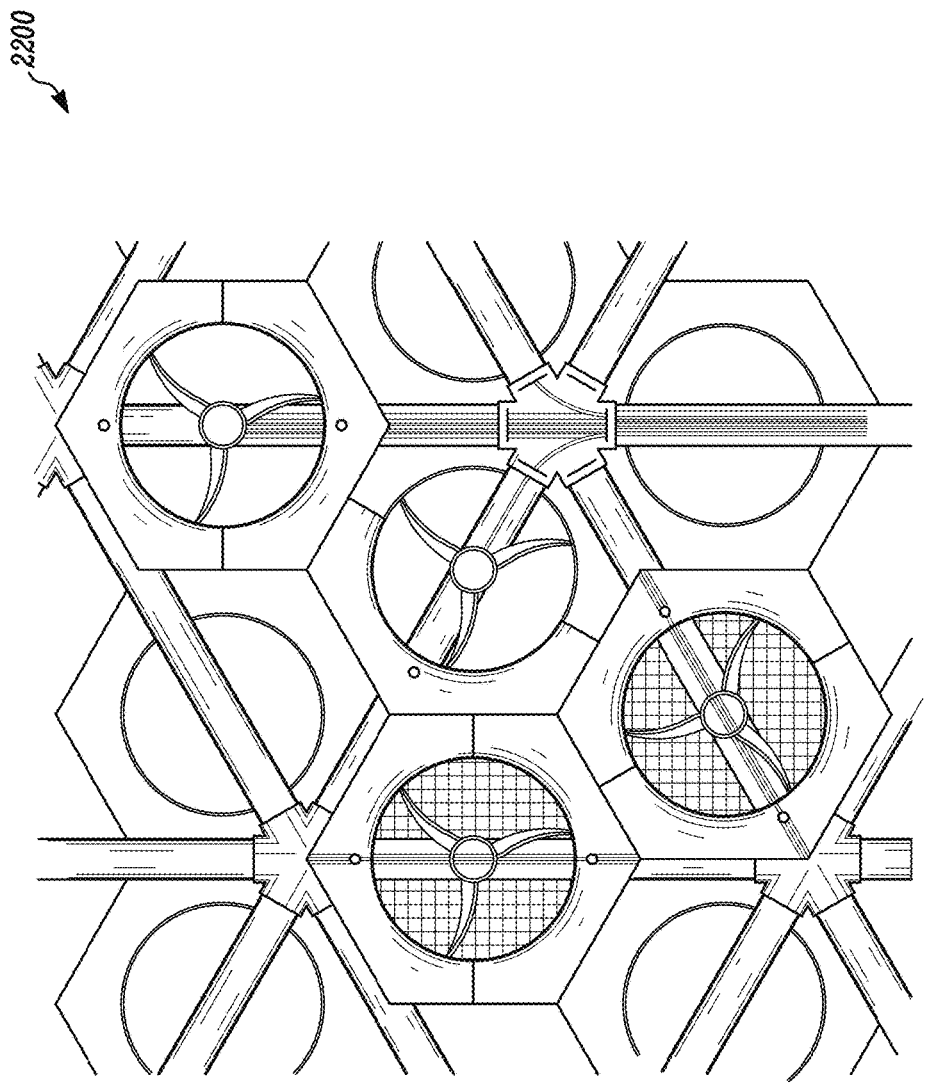
FIG. 22 depicts a superstructure and module arrangement for hexagonal modules.

FIGS. 9-22 depict various aspects of the invention. FIGS. 9A and 9B depict a series of arrays side and front elevations 902A and 902B. FIG. 10 depicts non-uniform array with orientation tails in side elevation 1002A, top view 1002B, and front elevation 1002C. FIG. 11 depicts an array 124 with nozzles 104 including three integrated generators 1102. FIG. 12 depicts an integrated generator 1102—module 104 example, where the nozzle may include PM turbine blades/rotor and exterior stator. FIG. 13 depicts an array with storage 1300, including a pressure vessel 1302, fluid turbine 1304, fluid containment 1308, vortex tube 1310, flow chamber 1312, and turbine compressors 1314. FIG. 14 depicts a module in a triangular superstructure 104. FIG. 15 shows details the major components of an example nozzle 104, including the inlet screen 1502, inlet 1504, rotor 1508, transmission/generator 1510, supports 1512, control and management 1514, diffuser 1518, and exit screen 1520. FIG. 16 shows two nozzles 104 in a serial arrangement 1602. FIG. 17 depicts an embodiment of a front and side elevation of a hexagonal nozzle 1700. FIG. 18 shows an example of a nozzle with circular throat and polygonal exit 1800. In this example, a nozzle with a circular throat may interpolate from 1/r curvature at the throat to 0 curvature at the polygonal exit. In embodiments, intervening slice polygons may be Reuleaux polygons. FIG. 19 shows and example of two nozzles 104 nested together 1900, where splitting the rate of constriction between the two nozzles and nesting the smaller nozzle into the larger may increase the acceleration. FIG. 20 depicts a front view of a superstructure connector 2002A and a side view of a superstructure connector 2002B. FIG. 21 depicts a horizontal axis wind turbine generator arrangement 2100 with module protection screen mounts. FIG. 22 depicts a superstructure and module arrangement 2200 for hexagonal modules.

The module may be an important aspect of the invention, where a module may be an integrated element that is inserted into the array as a plug and play component. The module may be comprised of structural components, nozzle fascia, rotor, generator, transmission, power management components, and the like. A module may be assembled as elements that fit separately onto a given superstructure cell. The module may have at least one automated locking/unlocking mechanism that may attach said module to both the superstructure and its neighbor modules. This may allow single modules to be removed and replaced at need without effecting the operation or structural integrity of the array.

In embodiments, the module may have at least one structural component that provides support for the main nozzle surface, including support and protection for the power components. The structural components may constitute the main load- and pressure-bearing components of the array. Additionally they may include bundled power management and transfer components that connect into the main power conduit array.

In embodiments, an inertial rotor may manipulate rotational momentum to provide variable rotational inertia by way of a variable radius weighting system, where the rotor blades and hub may be comprised of a single or plurality of staged chambers. In addition, a weighted material may be allowed to move based on centripetal motion toward the outer radius. This may be executed with a weighted material that may be controlled in its balance under rotation. In the case of a fluid, the fluid may be allowed to cycle through a series of chambers thereby creating a more stable inertial rotation and energy output. This inertial rotor may also be executed by way of weights and flexible structures, such as springs, memory plastic, and the like, where the flexible structure and weight may be slotted into a single internal chamber in the rotor blades. As rotation and centripetal force increase the weight may extend the flexible structure to the tip of the rotor and thereby change the inertia of the rotor to a more optimal profile for the rotor's use. Weights or fluids may also be controlled by way of actuators. In embodiments, the weighted material may be maintained at an extended position during certain conditions, such as when fluid forces are falling off, when fluid forces are leveled off, when fluid forces are at a maximum, and the like, where the extended position may be a maximal rotation position. In embodiments, the present invention may provide an array of nozzles adapted to generate electrical power from the flow of air. A rotor may be configured to operate within a wind power generating turbine, where the rotor may be configured to have varying amounts of inertia, such as the rotor including a blade on a spring to provide varying inertia at different rotation speeds, the rotor including a fluid component internal to a blade to provide variable inertia, and the like.

In embodiments, the nozzle portion of the module may be important in power production. Nozzle types for manipulating the fluid flow may include solid body w/ single fascia, solid body w/ plurality of fascia, partially open body geometry, and the like. There may be differentiating characteristics to the underlying geometry of the nozzle. To optimize plane use a quadric surface geometry may be utilized where the inlet of the nozzle is formed by the truncation of a radial or radial/elliptical function at a polygonal boundary. This may allow the nozzle to cover a polygonal intake area with variable intake curvature while having an effective momentum focusing circular structure and expanding to a closely similar polygonal outlet area. The ability to cover a non-circular, for example a square inlet area, may yield a more efficient use of the fluid plane, and the quadric geometry may maximize fascia separation and minimize overpressure relative to the throat. Additionally, the complexity of the surface geometry may be extended by application of quadric or radial structures to the underlying geometry.

A second characteristic may be the radial function used to determine the curvature of the constrictive region conforms. The optimal curvature in the prior art for a radial nozzle may be an arc section from a circle, such as between 1.8 to 2 d, where d is the diameter of the throat. Such curvature may engender the loss of a large portion of the mass available at the intake area.

In embodiments, different types of single arc and multi-arc curvatures may be used depending on the level of nozzle constriction, such as a single arc radial or elliptical curvature used for exclusively low constriction rates, a single arc intersection of two radial functions used at low or medium rates, a single arc execution based on an arc proportion determined by the vector interpolation of momentum distribution described in the method section of this invention, multi arc and single-body or multi-body fascia for higher constriction rates, and the like. This curvature may also vary depending on its angular position relative to bounding polygon and the center of the throat.

In embodiments, the divergent geometry in configurations of the current invention may be predicated on a ratio of rate of constriction to intake to divergent section that results in a volumetric ratio function of the convergent volume to the divergent volume wherein the volumetric ratio increases with the rate of constriction. As an example, a 2× constriction may require a volumetric ratio in excess of 1:7, which given the parameters described in above with regard to constriction may result in a less than 4 degree divergent angle. Additionally a variable nozzle may provide a constriction rate of the nozzle dynamically adjusted to the flow velocity to maintain velocity within the module at a given rated speed. This may allow the reduction of variability in the wind resource and allow the array to output at a given rating consistently.

In embodiments, the array superstructure and array installation may be provided, where the array superstructure may be comprised of power transfer and management and control components, module structural support elements, the array support structure, and the like. Power transfer components may be bundled into the modular structural support columnar elements extending from the top to the base of the array and allowing the module power systems to transfer power with a minimum number of connections and resistance. The superstructure may be either centralized, such as with a mast and boom structure, or distributed, such as with multiple columnar supports.

Figure 23:
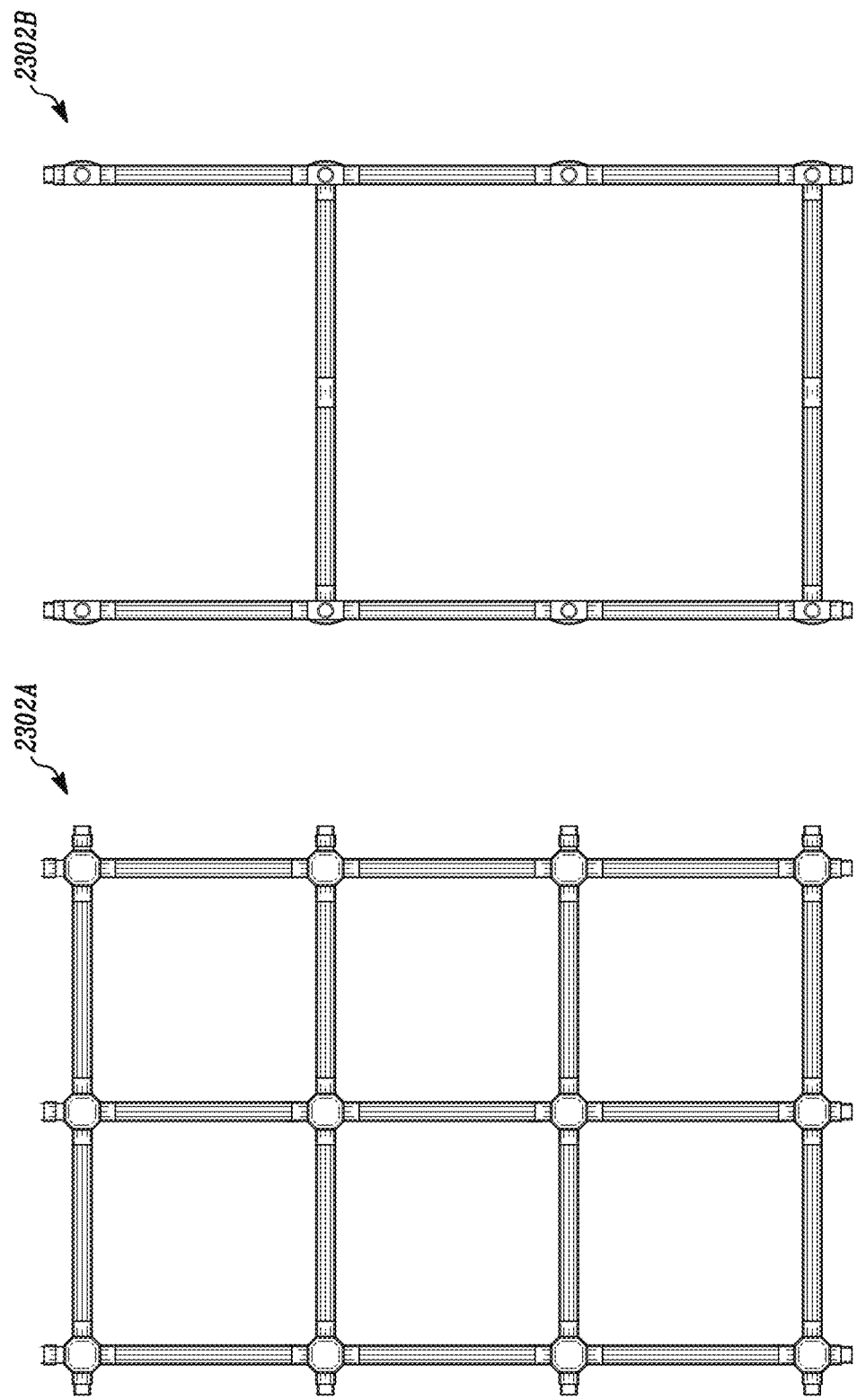
FIG. 23 depicts a space frame for a square array.
Figure 25:
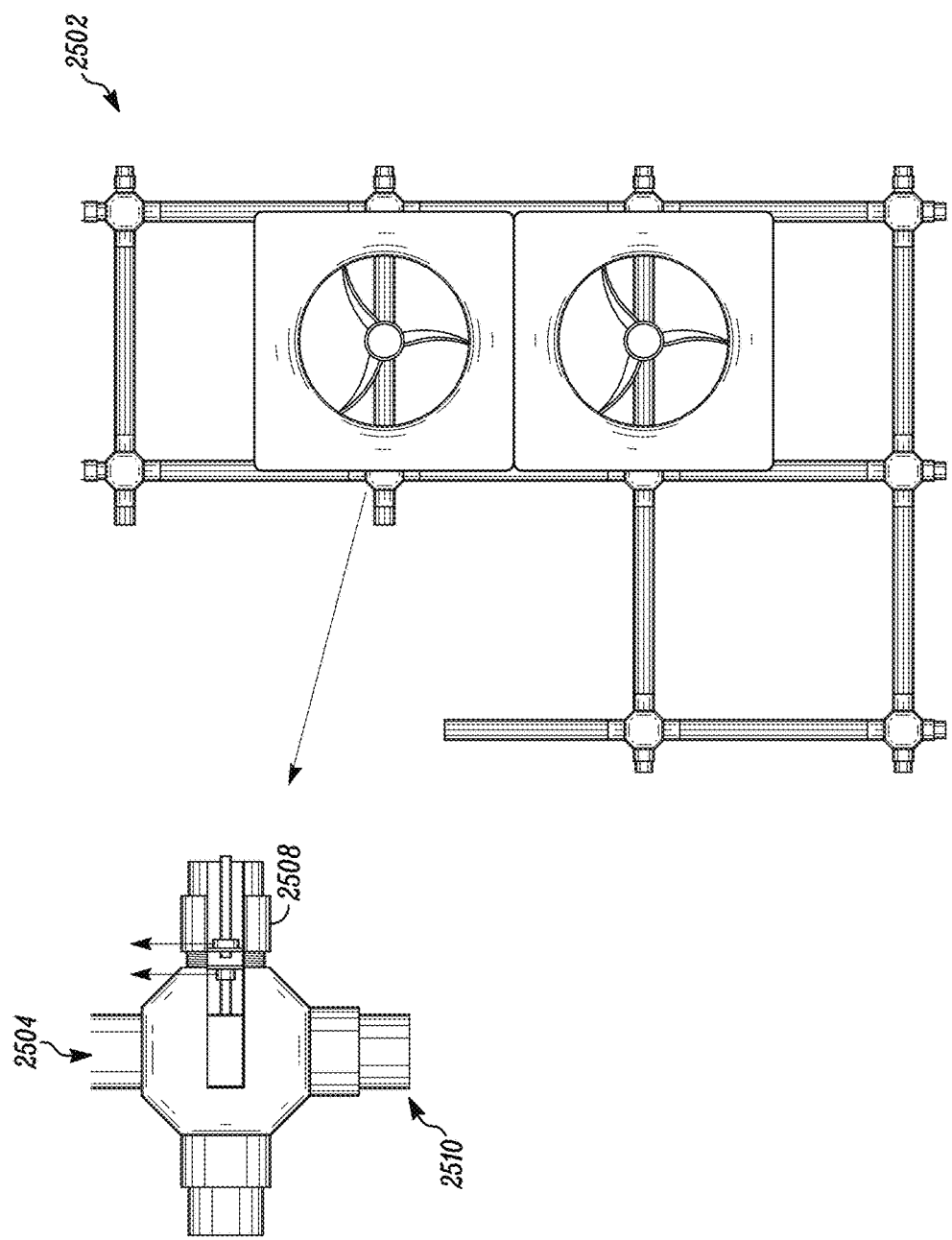
FIG. 25 depicts an example of power transfer in a square array.

In embodiments, the present invention may provide a nozzle adapted for use in a wind power generating turbine, where the nozzle may include networked or distributed power control and transfer. The power control may optimize the power production within a plurality of nozzles and may monitor power production for performance, maintenance, replacement, and the like. The power control may dynamically manage load requirements for a plurality of nozzles, such as when the management is local, global, and the like. The power control may optimize performance through use of neural networks, genetic algorithms, fuzzy algorithms, probabilistic predictive-corrective feedback loops, and the like, to maximize output and minimize losses. The power control may use a dedicated communications system, routing system, distributed communications system, and the like, to control individual elements within a plurality of nozzles. The power control may utilize digital electronics, analog electronics, an electronics chip, electronics logic gates, centralized processing, parallel processing, distributed processing, be hard-wired, wireless, and the like. The power transfer may be integrated into structural components, external to structural components, and the like. The power transfer may include topography that may minimize resistance losses, such as with a branch-trunk network structure, a direct generator-main trunk connection structure, and the like. FIG. 23 depicts a space frame for a square array in two different configurations 2302A and 2302B. FIG. 24 depicts nozzle polygons with different entrance shapes with embedded structural members 2402A and 2402B, where the view to the left shows a larger structural member embedded, and the view to the right shows a smaller structural member embedded. FIG. 25 shows a power transfer arrangement 2502 in a square array showing the power transfer structure with nozzles in place. This may depict an example of a modular implementation where the horizontal structural member is embedded in the module and then locks into the columnar component to form the space frame. Other embodiments of this may include a clamshell approach, direct assembly, and the like. FIG. 25 also shows a transfer joint with 35 kV main columnar cable 2504 connection, 25 kV generator cable connection 2508, and connector plates 2510.

In embodiments, the superstructure configuration may be based on a particular array implementation. Array implementation may follow any number of geometries based on module geometry, such as hexagonal, rectangular, triangular, trapezoidal, and the like, where array geometry may not be dependent on module geometry. Array rows may additionally be mounted individually to allow individual row response to wind direction. These rows may be mounted on individual bearings, or the like, of the types described herein, or may be mounted centrally to a column where the outer fascia of the column and the inner fascia of the row may be made up of the materials as described herein with reference to a material properties bearing. In such cases each row may be fitted with mechanical or flow based orientation mechanisms. Each array layer may additionally be executed with power management suited to the conditions at array height, to increase overall output, to stabilize said output based on variation of power curve and dynamic loading as a function of increased velocity w/increased height, and the like. In addition, the support structure may be executed as either a central column or a series of columns. In the case of a series of columns, a number of machine placement configurations may be used to maximize land use vs. installation output. For instance, a checkerboard or filled matrix configuration may be preferred wherein the foundation pilings are shared between arrays at each intersection of the grid to optimize the yield to installation cost ratio.

In association with the installation, energy storage may be provided. Due to the variability of the resource it may be desirable to have a cost-effective method of energy storage for a wind energy machine. Compressed air or pumped hydro storage or batteries or other facilities for storage as are known in the art may be a cost effective way to store wind-produced energy wherein the energy produced by the array may be used to compress air or pump water up a gravity gradient. The stored energy may then be used to power a turbine that produces energy based upon grid demand not wind variability. A major problem with some storage solutions is efficiency relative to cost. In the case of hydro the energy storage requires a large facility and availability of water to affect storage. For this reason compressed air may present a more generally applicable solution with fewer requirements in terms of space and construction. For instance, compressed air and vortex tubes may be used to create a density based closed loop flow system from which energy can be gathered, where vortex tubes can be used to separate flows into the energetic and non-energetic components with an input of compressed air. Depending on the pressure of compressed air, temperature outputs between the hot and cold outputs of the vortex tube can be substantial, on the order of 100 C or more. As in a basic engine schematic, these outputs may be used in a closed loop system to create a hot and cold sink wherein the rate of flow may be determined by the temperature differential between the sinks. While the energy contained in the raw flow is still inefficient with regard to amount of energy used to compress the source gas, the introduction of optimized convergent/divergent (C/D) nozzles may provide a way to artificially increase the amount of kinetic energy present at the point of conversion in the closed loop flow and thereby the amount of power recovered from the storage process.

In its simplest form, the storage/recovery device may include methods of pressurizing the preferred medium, a pressure vessel for storage of the compressed medium, a secondary external pressure vessel to recapture thermal energy released by compression with a method of controlling the flow to the turbine, a controlled valve to release the pressurized medium in the primary vessel based upon grid demand, at least one vortex tube, a flow chamber, a facility to channel or transfer thermal properties of the hot and cold streams into the flow chamber, a plurality of embedded nozzles within the flow chamber to increase proportion of kinetic energy in the flow, a facility to control and manage the power derived from both pressure systems, a facility to gather all resultant KE and transfer the power to the grid, and the like. The baseline KE and thermal energy that drives the system may be captured through use of additional turbines such as a steam turbine deriving steam pressure and flow from heat given off by the pressure vessel during the air compression phase or KE turbine capture of the energy of the fluid flow used to drive the closed loop system.

In embodiments, the present invention may include a plurality of process and functional components, such as orienting the array, a nozzle for accelerating the air into the array element, a rotor motor that converts the kinetic fluid energy into mechanical energy, a gear box for translating the mechanical energy into usable rates or controlling the load applied to a facility for KE conversion allowing the energy conversion process to operate at in an optimal range, a generator to convert the mechanical energy into electrical energy, energy storage, a facility for converting or conditioning the energy produced into a desired form, a substation and grid interface, fuel cell loading, and the like. In embodiments, storage of energy may be taken from after the generator in the form of electrical energy, or before the generator in the form of mechanical energy such as described herein. The array may be used in a direct energy transfer system, such as for pumping water, milling, pumping oil, pressurization, gas pressurization, hydrogen separation, fuel cell loading, and the like. Mechanically, the present invention may include a plurality of components, such as the modules themselves, arrays of modules, arrays and arrangement of arrays, the superstructure, bearings, and the like.

In embodiments, the module or array may be provided with a way to orient itself relative to the fluid flow. For instance, a tail may be provided to self orient the structure, such as a tail placed on a rotating support axis that spins the module or array to the wind's direction, or the structure of the nozzle or the array may be constructed in such a way to engender more orienting properties. There may also be other configuration features that contribute to orientation, such as through side cladding shape, providing different orientations at different levels, allowing different levels or modules or array segments to orient independently, and the like.

In embodiments, the nozzle's configuration may provide an important element of the invention, such as a 2.75 constriction nozzle producing a 6 to 7.5× power increase, and the like. Mass flow rate may be affected by a number of parameters, such as rate of constriction, including intake geometry and diffuser geometries being very sensitive to rate of constriction—as you move from 2 to 2.75, effects may become much more sensitive to things like the intake angle; past simple geometries, second order equations—may become very complex, where more complex geometries and surfacing may become an effect; and the like. In embodiments, a rate of constriction of 2.75 may be a good value, where the relationship of rate of constriction, curvature, length of diffuser, intake, etc. may be sufficient to achieve a large power increase without relying on a complex geometry. With a constriction rate below 2 times the realized power increases might not be sufficient to provide an advantage against HAWT systems with regard to a comparison of swept area used by the whole machine and the relationship between cost and yield. Variable throat constriction may be a factor, with the ability to vary the throat. Temperature may be a factor, where heating the air or other methods of creating additional sparsity rearward of the nozzle may create an improved flow, and may also be effective in a storage system.

In embodiments, the present invention may provide a nozzle adapted for use in a wind power generating turbine, where the nozzle may include a constriction. For instance, the nozzle may include a constriction ratio of the diameter of the throat to the diameter of the intake of about 2 and where the length of the diffuser is more than five times the length of the intake, and where the ratio of the diffuser length to the intake length may be about 7:1. In embodiments, the constriction ratio of the diameter of the throat to the diameter of the intake may be more than 2 and where the nozzle is used in an array of nozzles, or as an individual nozzle. In another instance, the nozzle may include a constriction ratio of the diameter of the throat to the diameter of the intake of about 2.5 and where the length of the diffuser is more than five times the length of the intake, and where the ratio of the diffuser length to the intake length may be about 9:1. In another instance, the nozzle may include a constriction ratio of the diameter of the throat to the diameter of the intake of about 2.75 and where the length of the diffuser is more than five times the length of the intake, and where the ratio of the diffuser length to the intake length may be about 11:1. In another instance, the nozzle may include a constriction ratio of the diameter of the throat to the diameter of the intake of more than about 1.5 and where the length of the diffuser is more than five times the length of the intake. In embodiments, the nozzle may include a converging intake and a diverging diffuser, where the length of the diffuser may be longer than the intake, such as more than five times the length of the intake. In embodiments, a nozzle may be adapted for use in a turbine for generation of power from ambient movement of air, where the nozzle may include an intake and a diffuser and where the length of the diffuser is longer than the intake, such as more than five times the length of the intake.

Nozzle intake geometry may also play a key role in the present invention, such as in the leading edge geometry, curvature, length of intake, exit geometry, and the like. The curvature of the intake may be important, such as when the average angle is greater than 45 degrees in a two times constrictor, then you might get a power loss. Once you go up to a 2.5 rate of constriction, then you may become much more sensitive to curvature and length of intake. Length of the intake may be important, such as in the time that the gradient has to act on the flow. If intake length exceeds the throat by a significant factor, there may be loss. Once intake length is less than the throat length, then suddenly you may see the actual predicted velocities at the throat. Note that if elastic collisions are assumed, momentum may deflect from the leading edge. It may not conform to that, nor to a classic boundary layer problem. The effect of momentum deflection may be greater than anticipated by a momentum diffusion layer analysis. There may be some kinetic energy exchange with the wall that slowly turns with the intake. Looking at sparsity and density of molecules and delta of momentum based on probabilistic movement of molecules in the sparse direction may be provided. The lower rate of constriction, the shorter the intake length may have to be. With an initial sparse gradient, if there is a proper intake angle that allows momentum to be directed toward the throat, a density increase may be experienced in the region of the intake. When there is an incorrect intake geometry at a higher rate of constriction, a toroidal bleed-over on the leading edge may result in mass loss to the exterior of the nozzle.

In embodiments, the present invention may provide a nozzle adapted for use in a wind power generating turbine, such as optimized for leading edge geometry, for curvature, and the like. The leading edge of the nozzle may be optimized based on the angle of incidence to the direction of the flow, where momentum vectors derived from the leading edge may generally clear the throat of the nozzle. In embodiments, the intake leading edge may have an angle of incidence of no more than $1.1*0.5*\theta$, where $\tan \theta = (0.5 (D_I - D_t) + D_t)/I_1$, and where $D_I$ is the nozzle diameter at the intake, $D_t$ is the diameter of the throat, and $I_1$ is the intake length. In embodiments, the present invention may provide a nozzle adapted for use in a wind power generating turbine, wherein the nozzle is optimized based on intake length, leading edge shape, diffuser length, and the like. In an example, for a nozzle where the area at the throat is ½ the area of the intake and the intake length is ½ the diameter of the throat, the maximum incidence angle at the leading edge may be 47 degrees. In embodiments, the optimal range may fall between 41 and 37 degrees for 2 times constriction for this set of parameters. The intake may conform to an elliptical, radial arc, a combination of the two, a combination of a plurality of elliptical or radial arcs from the leading edge to the throat, and the like. In embodiments, the nozzle may be optimized based on an intake length to divergent length ratio where the intake length may be equal to or less than the diameter of the throat.

Figure 26:
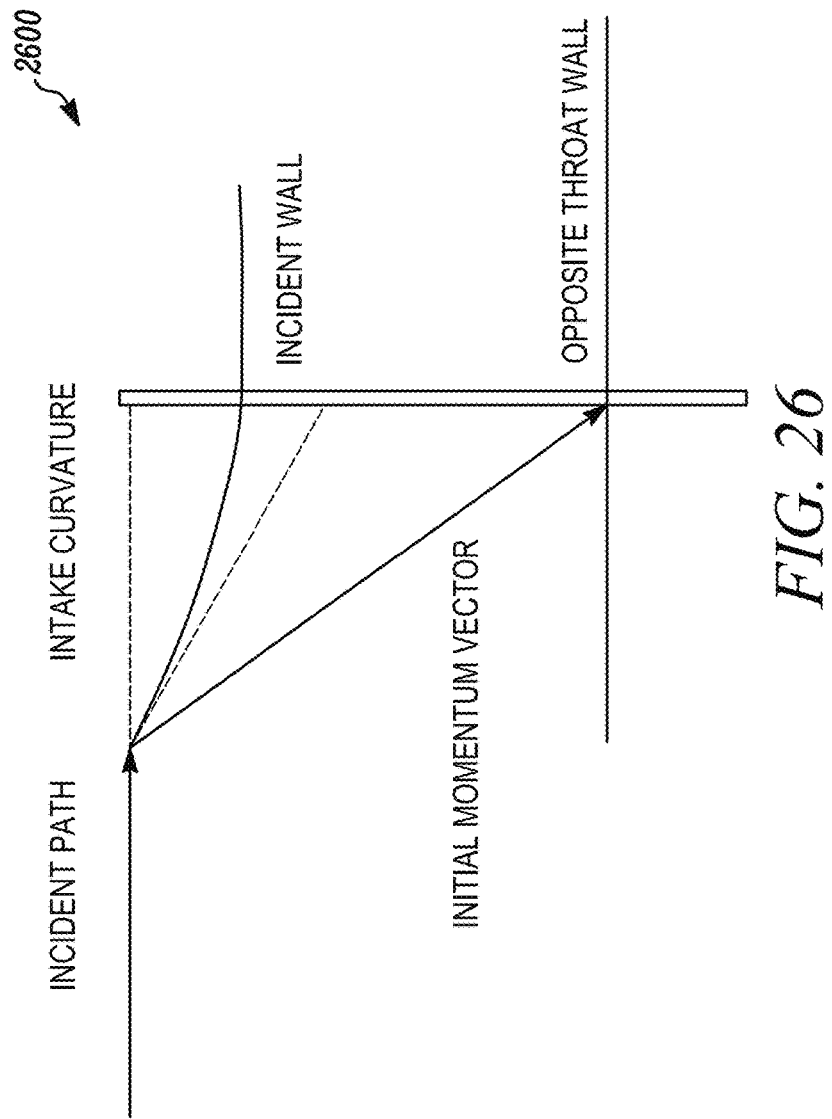
FIG. 26. depicts a diagram of an initial intake momentum vector.

In embodiments, the initial intake momentum vector may be depicted graphically. FIG. 26 shows an diagram depicting an initial intake momentum vector 2600, which may be related to the formula for deriving the minimum leading edge angle. In the diagram, the incident path and incident momentum vector are shown relative to the intake curvature, the incident wall, and the opposite throat wall.

In embodiments, the design of the intake geometry may result in a non-perfect angle with relatively short diffuser. A 4× power increase may result with a 45 degree intake angle, as long as there is curvature, where curvature spreads the force acting against the flow. A basic non-symmetric catenoid (rotated hyperbolic function) may be used. To achieve an array you may artificially truncate the catenoid (taking a funnel/catenoid) and truncating with a hexagon, square, triangle, or other polygon. In using a hexagon, there may be more exterior angular latitude, but straight corners may have to be more curved. Surfacing may be a factor, where there may be small vortex generators on leading edges or over the entire nozzle surface, such as square vortex generators, golf ball dimples, or any surface that creates a thicker displacement layer, but relates to the boundary layer better. In embodiments, the present invention may provide a nozzle adapted for use in a wind power generating turbine. The nozzle may include a diffuser, the cross-section of which may have substantially linear sides from throat to exit. In embodiments, the exit angle of the diffuser may be less than about four degrees. The nozzle may have a facility to generate a vorticity or swirl effect proximal to the exit of the diffuser, such as where the diffuser includes a vane to facilitate the effect. In embodiments, the nozzle may have a diffuser, such as a diffuser with a polygonal exit shape, a square exit shape, having symmetric polygonal walls, having symmetric polygonal walls that are truncated, and the like.

In embodiments, low cost materials for nozzles may be a factor, where if there's an efficient pass through, the whole thing orients itself (acts like a big tail on a kite). Once you break into arrays and optimize, you may not need materials such as carbon fiber, eGlass, and the like, but very low-cost, lightweight materials may be used, especially at the top of the superstructure/array, such as a polycarbonate thermofoam, and the like. A combination of inexpensive and expensive materials may also be used wherein the mechanical properties of a fiber in combination with a closed or open cell foam may result in an overall cost reduction. In embodiments, the present invention may provide an array of nozzles adapted to generate electrical power from the flow of air. The array may include nozzles made with polycarbonate thermofoam, polymer, a fiber/resin composite, a syntactic foam, a closed cell foam, an open cell foam, with gelcoat, and the like. In embodiments, the present invention may provide a nozzle adapted for use in a wind power generating turbine. The nozzle may include at least one of a plurality of mass produced components. The components may be manufactured through rotomolding, injection molding, scrimp molding, thermoforming, lay-up, vacuum molding, filament winding, and the like. The materials used in manufacturing the components may include acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), polyimides, polyethylene,polypropylene, polystyrene, polyvinyl chloride, polymethyl methacrylate, polyethylene terephthalate, and the like. The materials used in manufacturing the components may include at least one of acrylic, aramid, twaron, Kevlar, technora, nomex, carbon, tenax, microfiber, nylon, olefin, polyester, polyethylene, dyneema, spectra, rayon, tencel, vinalon, zylon, asbestos, basalt, mineral wool, glass wool, syntatic foams, carbon foam, polyurethane foams, polystyrene foams, metal foams, and the like. The components may be designed to enhance the structural properties of the nozzle to provide reduced cost of material, reduced weight of material used, minimized assembly time, minimized transport costs, and the like.

In embodiments, drill-throughs may be a factor, where a drill may go through from the outside to increase the flow from an ambient outside air, or perform vaning with drill-through to introduce the ambient air and change swirl. In embodiments, the present invention may provide a nozzle adapted for use in a wind power generating turbine, where the nozzle may include a through-hole to facilitate air flow.

In embodiments, more complex intake geometries may be a factor, such as combinations of geometries, truncating a catenoid with a polygonal shape, taking a quadric function and applying it on an ellipse to the surface creating aerodynamic shapes that channel well (e.g., shark scales, single or multi-layer scalloping, whale fin, and the like), extending quadric truncation onto the surface of the nozzle spreading the momentum from off of the leading edges and bringing in the intake stream into a less oppositional mode, a series of linearly or orthogonally concave curvatures onto a convex shape, applying to the walls at a larger scale, vortex generators within the nozzle itself (e.g., squares, dimples, vortex film, and the like), forward wedging to channel the flow toward the throat, concave and convex curvature, split diffuser in half rearward of the throat, and the like.

In embodiments, the present invention may provide a nozzle adapted for use in a wind power generating turbine. The nozzle may have a leading edge and an intake curvature between the leading edge and a throat of the nozzle, where the leading edge and intake curvature of the nozzle may be adapted to focus momentum vectors of air particles in the intake region to facilitate air flow within the nozzle. In embodiments, the nozzle may have a leading edge and an intake surface with an intake curvature between the leading edge and a throat of the nozzle where the leading edge and intake curvature of the nozzle are optimized based on the predicted gradient of air particles within the nozzle, the predicted energy transfer of air particles in interaction with the intake surface of the nozzle, the predicted focus of momentum vectors of air particles within the nozzle, and the like. The nozzle may have a leading edge and an intake length between the leading edge and a throat of the nozzle, where the intake length of the nozzle may be less than the diameter of the throat of the nozzle, such as by two times. In embodiments, the intake length may be less than the diameter of the throat, between one-half and about equal to the diameter of the throat, and the like. The geometry of the nozzle may be adapted based on calculation of the probability of movement of air molecules from dense to sparse regions within the nozzle. The surface of the nozzle may include a vortex generator. The nozzle may be configured with surface shaping to optimize flow from the leading edge, such as based on quadric truncation of an ellipse, multiple quadric functions similar to an n-iteration fractal, shark scale shape, scallop scale shape, whale fin shape, and the like.

In embodiments, nozzles may be in series, such as nesting nozzles rearward of the throat, where the one in the throat may come very close to a theoretical level of increase, and the outside one may get 90% of its theoretical level of increase. In embodiments, the nozzle module may be integrated as one piece, such as making the blades of the rotor of the turbine an integrated component. Other less optimal forms may also be used and combined into an array such as super-venturi's, wide-angle diffusers, two dimensional nozzles, flat wall nozzles, and the like.

In embodiments, the present invention may provide a nozzle adapted for use in a wind power generating turbine. The nozzle may have an intake geometry configured to optimize airflow based on momentum vectors in the intake region, where the momentum vectors may derive from interaction with the angle of the leading edge of the nozzle, the nozzle may be configured to generate momentum vectors that are directed to clear the throat of the nozzle after interaction with the leading edge of the nozzle, and the like. The nozzle may be arranged in series with at least one other nozzle. The nozzle may be formed with a constriction ratio between the intake diameter of the nozzle and the throat diameter of the nozzle, such as about 2.75, between 2 and 4, between 2.5 and 3.5, and the like. In embodiments, the nozzle may include a constriction ratio of the diameter of the throat to the diameter of the intake of about 2 and where the length of the diffuser may be about seven times the length of the intake. In embodiments, the nozzle may include a constriction ratio of the diameter of the throat to the diameter of the intake of about 2.5 and wherein the length of the diffuser is about nine times the length of the intake. The nozzle may be configured with the capability to vary the diameter of the throat. In embodiments, a facility may be provided for modifying air temperature or density in the environment of a nozzle to increase flow through the nozzle, such as modifying air temperature through heating air in the proximity of the outtake of the nozzle.

In embodiments, diffuser geometries may be a factor, such as exit angle, length of diffuser, splitting the diffuser in half, in quarters, and the like, increasing the diffuser efficiency, the diffuser shape, the radial swirl, and the like. For instance, as the rate of constriction increases, the optimum diffuser may become longer, and longer as a relative ratio to the intake, such as at 2 there might be a 1:7 optimal ratio of diffuser length to intake length, at 2.5 there might be a 1:9 optimal ratio, and the like. The diffuser shape may be a curve, taken straight to the outlet, convert the radial function to a polygonal function, use long or wide angle diffusers, use optimized nozzles for wind conditions with long diffusers, and the like. The radial swirl may create low-level swirl or higher rates of vorticity in the exit region or rearward of the diffuser, where curved vaning may create an exterior, radial motion of the gas as it exits, which may create an additional layer of sparsity inside the diffuser. In addition, the swirl may be created using ambient air, vaning could be used with drill-through to introduce the ambient air and increase the swirl, and the like. Other mechanical methods of creating sparsity as described herein may be utilized, such as an inverse rotor attached to the main KE converting rotor may be used with an optimized geometry and an array implementation. Such methods of increasing sparsity might allow the use of a non-optimized geometry that could have a positive effect on the cost parameters of the machine.

In embodiments, the relationship of intake geometry and diffuser geometries may changed based on the rate of constriction. To create a high mass throughput, as you increase rate of constriction, the intake and diffuser geometries may become far more important.

In embodiments, the rotor parameters may be important in the current invention, such as the shape of the blade and surfacing (which may create vortices both on the upper and lower surface of the blade). A plurality of blade shapes may be employed, such as using vortex generation on the lower edge (which may add to the lift of the blade), lower angle for more power (but if the angle goes to zero, there may be no lift, so some low number may be good, such as a mean angle of four degrees), minimize the drag effect on the top of the blade due to the boundary layer effect (which may be hard to control if the direction the gas is coming from is unknown, so creating different kinds of blade shapes that minimize boundary layer separation above the blade may be valuable), drill throughs to address the boundary layer, making blades a inexpensively as possible, and the like. For example, the rotor may be two meters long, formed of thermoplastic, could be hollow, and operate with a basic swept-twist airfoil. Adjustable pitch may be used to increase blade efficiency at higher velocities by adjusting to a lower pitch angle.

In embodiments, the present invention may provide an array of nozzles adapted to generate electrical power from the flow of air. A rotor may be configured to operate within a wind power generating turbine where the rotor includes a complex topography vortex generation facility on the blade, such as a vortex generation facility on the lower surface of a blade, such as a vortex generation facility on the upper surface of a blade, vortex generation facility includes providing a dimple on the surface of the blade, a shark scale topography, and the like. A rotor may be configured to operate within a wind power generating turbine, where the rotor may include a low angle relative to the plane of rotation of the rotor, such as the angle being less than approximately four degrees.

In embodiments, the rotor may be a variable inertia rotor, where if the mass of the rotor is centralized around the hub, there is less inertia to start the rotor. In embodiments, there may be a facility for smoothing the mechanical energy output of the rotor, the power capture may be extended as the wind drops off where there may be more power during drop off as the weight is placed out on the edge, change the dynamics of rotor between low speed state and high speed state thereby holding it longer, and the like. In embodiments, the configuration may shift the mass to the outward part as it gets as rotation rate increases, such as by attaching a memory plastic spring, by using a rubber elastic actuator, by using a metal spring, by spring loaded actuation, by actuation with a coil with a current going through it, by a fluid, by a mechanical actuator, by enlarging the rotor, through centripetal motion, and the like. By utilizing a spring, narrowing at lower speeds may be avoided, which may happen on drop-down of the wind. A start weight may also be used at the center, then move out and hold peak power production with inertial at high speed and as the wind drops. In embodiments, a mass on a spring may be used to move the inertia out to the edge of the rotor, such as by putting a flat or round pipe up the central axis of the rotor, putting a mass on the spring, slotting it, and letting it get to the end, where as it slows down, the spring pulls it back in, or the spring releases a weight, and the like.

In embodiments, the rotor may utilize a variable blade, such as starting out with six blades, and then activate an actuator tor pressure-based switch allowing some blades to collapse in order to reduce the total number of active blades. For example, this may be done with any prime multiple, such as eight dropping to four and then dropping to two, or twelve drops to six which drops to three, and so on. In this instance, the prime number blade may have the most structure, with the secondary and tertiary with less structure, such as being made from thermoforms that slot into the hub, and collapse as the wind speed increases. In embodiments, energy capture at a given fluid velocity might go from 12% to 30% with the right blade number, so if one wants to get a good power curve over a range, one might get the right blade configuration and maximize over a whole range of velocities. This may translate into a significant increase in annual yield. For instance, what is considered lower speeds may be 60-70% of maximum (distribution) at any wind site. Today's systems often ignore the low wind, because one gets so much more power out of the high wind areas. Most of East Coast on-land and close urban sites (other than directly on shore—are class 3 or 4 sites. The entire Southeast is a Class 1 site. Where the wind works now (Class 5), there are other problems, because of distance from major urban centers. Thus, setting up a system that works at low wind and still works at high wind is very effective.

In embodiments, the structural configuration of the module may be important to the present invention. For instance, the module may be an integrated assembly that is put together separately with superstructure elements connected into the module, and then everything is connected together. In embodiments, the structure could be a hexagonal, square, triangular, and the like arrangement that components are placed into, a basic geodesic structure and put module components into, and the like. There may be a need for actuators in the superstructure itself, so that the cover can be opened and closed. In embodiments one may build columns (power transfer columns) and fill in the space with modules. Each superstructure element of a module may click into a bus that clicks into the main one (as opposed to providing individual lines. If done modularly, then one component could be popped out, and another popped in, thereby providing a complete modular implementation, with a running stock of replacement modules. In embodiments, the modules could be on sleds with their own way of getting down to the ground or may be installed by way of a built-in installation platform. There could also be a Pseudo-modular implementation, by making the super structure and inserting elements of the module individually. Components could be assembled in installation versus offsite. One could make modules in pieces, such as a clamshell top piece and a clamshell exit piece for the nozzle, where one puts the generator onto super structure first. Guide poles or a form of guided crane may be utilized for removal of parts for replacement. There may be a slot in the superstructure, such as forward and rearward on the superstructure with slotting poles such that modules are installed onto the slotting poles. Modules may be manufactured on-site, such as manufacturing in a tractor-trailer, where for instance, nozzles may be made on site. Once the process is automated, the likelihood of human error may be lower.

In embodiments, there may be wildlife protection/anti-fouling systems such as screens on the same pole as used on the superstructure, where birds and bats may pose a problem. In embodiments, bugs may not be a significant issue, but there may be self-cleaning surfaces utilized, such as certain plants, like lotus leaves, where viscosity of the inherent molecules may not bond to the surface. Modularity may allow slotting out the screens and cleaning them. In embodiments, the present invention may provide a nozzle or array of nozzles adapted for use in a wind power generating turbine, where the nozzle may be adapted for extreme conditions, such as earthquakes, high wind, ice, and the like. The adaption for extreme conditions may include mechanisms to allow the nozzle to survive earthquakes, where the mechanism may be a fluid foundation, a gyroscopic mechanism, a pintle mechanism, a frequency damping mechanism, and the like. The adaption for extreme conditions may include mechanisms to allow survival of high winds, such as category 5 winds. The adaption for extreme conditions may include mechanisms to allow for partial structural degradation of the nozzle. In addition, the adaption for extreme conditions may include mechanisms for deicing the nozzle. The nozzle may also be protected by a wildlife inhibitor, such as a broadcasted sonic inhibitor, a mechanical screen, an olfactory inhibitor, and the like.

In embodiments, arrays of nozzles and the arrangement of the arrays may be an important aspect of the invention, where there may be advantages in an arrayed configuration. For instance, as compared to monolithic, if an efficient proportion is one to ten, then you may need much more power to efficiently use the space required by a monolithic nozzle, and it may not be stable without some structural components made out of expensive aerodynamic materials. In certain embodiments, the distance needed to reestablish flow after the outlet of the turbine is approximately the depth of about one array, and one may thus stack arrays behind each other, such as in the checkerboard of FIG. 2 or in a co-mounted configuration.

In embodiments modules may be configured in the arrays to cover a significant portion of the plane of the array. In embodiments the best way to cover the plane may be to have the truncated catenoid geometry. If a comparison is made between an array and a conventional turbine, one may start to see big differences, such as an array on platform compared to a tall turbine. Additionally, the area of the array may not have to be a fixed shape or size. For instance, the array could start at 30 m and go up to 90 m, or it can start lower. In embodiments, the present invention may provide an array of nozzles adapted to generate electrical power from the flow of air, where the array may include nozzles of variable type at different height. For instance, some nozzles may be larger at greater heights than nozzles at lower heights, have lower constriction at greater heights than nozzles at lower heights, and the like. The array doesn't have to have a circular structure, so it might be 115 m by 35 m, or alternately, it might cover a similar swept area in a similar of different proportion. In embodiments, more power may be derived, because there is more area at the higher wind speed. Another advantage may be that in a traditional single large blade turbine there may be different wind speeds at the top verses the bottom of the prop, and the difference may produce uneven stress loads and production at some mean figure. In the current invention each row may get more than the rows at the bottom, with no stress load between the top and bottom rows. The top one or two rows, on their own, may gather more than the entire traditional turbine prop. The ability to manipulate how you handle the area of the array is a major factor in generated power, footprint, and the absence of the need for custom building, and the current invention may allow the custom design, generating energy based on the power curve, wind distribution, and the like. In embodiments, with an array design, the configuration for an efficient, modular, space frame super structure may be re-used for many different sites.

In embodiments, array parameters may include the optimal number of modules, where the parameters may include tangential wind loads, icing, inertial components, cost of making the rotor, load bearing, power yield, area covered, nozzle depth, tradeoff of height and depth, and the like; the vertical starting point at which the array begins; the vertical point at which the array ends; the width of the array; depth of the array; shape of the modules, such as square, diamond, hexagon, triangle, rectangle, combined packing shapes of polygons, packing polygons, and the like; shape of the array, such as square, diamond, triangular, trapezoid, shaped cladding (where something that bleeds the wind in the direction the nozzles bleeds the wind, with duplicate outside coverage of the nozzles, and/or extending of the cladding); variability of the modules, such as sizes and shapes; bearings, such as between array rows to orient independently or for the whole array, a magnetic bearing, a wind bearing, bearings for rows of arrays, and the like; uniformity, such as outside modules smaller than inner modules or the inverse, impact on structural bearing of the array, impact on the electrical distribution, and the like; load bearing properties, such as managing load across the array; the ability for a series configuration, such as placed end-to-end, in a grid, based on a fraction of the exit speed, and the like; turbulent mixing over the outer part of the module, such as with vortex generators, axial stream tubes, like drill-throughs, trailing edge on airfoil with vortex generator, optimizing the trailing air mix; combined outer shape of the array; the superstructure; installation properties of the individual array; installation properties of the wind farm, such as dimensions relative to each other; arrangements of the arrays; and the like. In embodiments, laying out the arrays into a wind farm configuration may entail a plurality of design parameters, such as the minimum optimal dimensions across the array, the front array numbers and dimensions verses the back, where the arrays are placed in the wind farm, whether the wind farm can be placed near urban spaces, on top of a hot spot, close to transmission line, and the like.

In embodiments, the super structure parameters may present important aspects to the present invention, such as modularity; applying space frames to the superstructure of the array; integrating with the shape of a given module; integrating with the power structure; load bearing supports, such as relative to the length of the modules, a need for lateral support, square shapes bearing less than a diamond shape, and the like; shaped space frame, such as cladding on the space frame, deciding which members need to be thick, placement of lateral support, and the like; structural space frame as an electrical conduit; transferring power through the super structure, such as attaching/conducting power, placement of busses, placement of connectors, need for main bus columns, attachment of modules within the structure to the main bus column, running wire from each one to a central bus to transfer to the grid in one big cable, minimizing resistance to help allow efficient distribution of energy, minimizing complexity and cost of installation and maintenance, and the like; pipe shapes; superstructure weight distribution; and the like. In embodiments, the present invention may provide a structural array for generating electrical power from the flow of air, wherein the structural array may be a composite space frame wind producing array super structure. The space frame may be made of composite or alloy materials. The space frame may include variable profile structural members, variable solidity members, variable members, fixed members, and the like. The space frame may also include properties to enhance structural properties, material use, material cost, material weight, and the like.

In embodiments, the electrical system may present important aspects to the present invention, such as electrical distribution within the superstructure; dynamic voltage regulation; high voltage handling; load regulation; load management/load parsing, such as a higher load on the upper end of the array, parsing the load on a single machine with an array of turbines, and the like; load splitting; power/energy transfer, such as power conditioning of power from any array, network architecture to distribute load, managing a network, neural networks, substation, grid interface, and the like. In embodiments, the storage system may present important aspects to the present invention, such as whether energy to compress a fluid or gas, where energy diverts from the grid into a compression system to say, run turbine compressors off of energy, a water vessel to use heat as you are compressing, blowing compressed air into vortex tube, radiators on bottom of circulating chamber, build a mini version of the wind in a circulation chamber, put turbines in the configuration to produce a very efficient storage system, making wind flow based on hot and dense using nozzles to convert that helps stabilize the output over an hour and then goes out to the grid, stabilize over an hour, use vortex tubes to create massive pressure differentials, and the like.

In embodiments, the present invention may provide an array of nozzles adapted to generate electrical power from the flow of air, where an electrical load management facility may be provided for managing variable electrical load associated with different power generation components of the array. Alternately, a mechanical load management facility may be provided for managing variable electrical load associated with different power generation components of the array.

In embodiments, the present invention may provide an array of nozzles adapted to generate electrical power from the flow of air, where the array may include power control. The power control may be networked or non-networked. The networked power control may include power transfer, such as power transfer being integrated into the structural components, external to the structural components, including a network topography that minimizes resistance losses utilizing at least one of a branch and trunk network structure and direct generator-main trunk connection structure, and the like. The networked power control may optimize the power production within the array and monitor power production of the array for performance, maintenance, replacement, and the like. The networked power control may dynamically manage load requirements for at least one of a plurality of arrays. The networked power control may use optimization methods such as neural networks, genetic algorithms, fuzzy algorithms, probabilistic predictive-corrective feedback loops and the like, to provide maximizing output, minimizing losses, and the like. The networked power control may use a dedicated communications system, a routing system, distributed communications system, and the like, to control individual network elements within at least one of a plurality of arrays. The networked power control may utilize digital control, analog control, and the like, may utilize an electronics, electronics chip, electronics logic, and the like, use centralized or distributed processing, be hard-wired or wireless, including at least one of an electronics chip and management algorithm, and the like.

In embodiments, the present invention may provide an array of nozzles adapted to generate electrical power from the flow of air, where the array may include power conversion elements, power management elements, and the like. The power conversion and management elements may be connected to a power frequency converting mechanism, power conditioning mechanism, and the like, to prepare the power generated for storage, transmission, use, and the like, where the mechanism may be an LVDC converter, HVAC converter, LVDC frequency converter, HVAC frequency converter, and the like. In embodiments, power management may be local, global, and the like. The power conversion and power management elements may utilize power diodes, thyristors, transistors, power MOSFETs, IGBTs, and the like. In embodiments, the power conversion and power management elements may operate the array for fixed speed generation, operate the array for variable speed generation, performed by electrical facilities, performed by mechanical facilities, and the like.

In embodiments, the present invention may provide a nozzle adapted for use in a wind power generating turbine, where the nozzle may convert kinetic energy from the wind into at least one of electrical and mechanical energy. In embodiments, the conversion may be made with a conversion mechanism including at least one of a DC direct drive rotating machine, AC direct drive rotating machine, flywheel, generator, transmission/gearbox, synchronous singly-fed DC rotating machine, synchronous singly-fed AC rotating machine, asynchronous singly-fed DC machine, asynchronous singly-fed AC machine, asynchronous doubly-fed DC machine, asynchronous doubly-fed AC machine, induction singly-fed DC machine, induction singly-fed AC machine, induction doubly-fed DC machine, induction doubly-fed AC machine, MHD DC rotating machine, MHD AC rotating machine, Maglev DC rotating machine, Maglev AC rotating machine, low-speed DC rotating machine, low-speed AC rotating machine, medium speed DC rotating machine, medium speed AC rotating machine, high speed DC rotating machine, high speed AC rotating machine, variable speed DC rotating machine, variable speed AC rotating machine, fixed speed DC rotating machine, fixed speed AC rotating machine, variable frequency DC rotating machine, variable frequency AC rotating machine, fixed frequency DC rotating machine, fixed frequency AC rotating machine, squirrel cage DC rotating machine, squirrel cage AC rotating machine, permanent magnet DC rotating machine, permanent magnet AC rotating machine, self-excited DC rotating machine, self-excited AC rotating machine, superconductor DC or AC rotating machine, superconductor AC rotating machine, 1-n phase DC rotating machine, 1-n phase AC rotating machine, coreless DC rotating machine, coreless AC rotating machine, vibrational mechanism, and potential energy based mechanisms. The conversion mechanism may also be controlled by at least one of an electrical and mechanical power control management facility.

In embodiments, the present invention may provide a nozzle adapted for use in a wind power generating turbine, where the nozzle may include speed and load management facilities wherein the speed management optimizes the relationship of rotor speed, power conversion, and aerodynamic losses. The speed facilities may include electrical or mechanical mechanisms to operate the machine at variable or fixed speed. The load management facilities may include either electrical or mechanical management of the load applied to the rotor or generator. Electronic load management may be performed by means of power electronics. Mechanical load management may be performed by means of a transmission or gearbox or a geared, CVT, or applied field type.

In embodiments, the present invention may provide a nozzle adapted for use in a wind power generating turbine, where the nozzle may include power conversion management elements. The power conversion management elements may be connected to at least one of a power frequency converting mechanism, power frequency conditioning mechanism, LVDC to HVAC converter, LVDC to HVAC frequency converter, and the like, to prepare the power generated for at least one of storage, transmission, and use. The power management may be local, global, and the like. The power management elements may utilize power electronics, such as a power diode, thyristor, transistor, power MOSFET, IGBT, and the like. The power management elements may operate the array for fixed speed generation, variable speed generation, and the like. In embodiments, power management may be performed by mechanical facilities.

In embodiments, detailed aspects of the nozzle configuration may be important to the present invention, where the differentiators between current technologies and the current invention may include polygonal truncation of a figure of revolution to create the underlying geometry, leading edge (LE) geometry as constrained/determined by intake length, curvature, and LE angle relative to constriction, use of intake and constriction parameters to determine diffuser geometry, and the like.

In embodiments, the current invention may use a particular nozzle geometry to accelerate a flow under constriction to a high percentage of its theoretical velocity increase. The nozzle may conform to the basic Converging-Diverging or DeLavel structure with the constriction rate of the convergent end serving to accelerate the incoming flow and the diverging to "re-expand" said flow. The nozzle geometry may be based on a molecular fluid dynamics theory that differs substantially from the continuum approach and is also dissimilar to numerical methods, such as Lattice Boltzmann Method (LBM's) or Monte Carlo methods. The nozzle geometry differentiators may include the basis geometry, specific geometry with regard to LE characteristics and volumetric ratios, and surface geometry.

In embodiments, plane use optimization may be achieved by way of a basis quadric surface geometry wherein the inlet and exit geometry of the nozzle is formed by an asymmetric (with regard to both axes) hyperboloid of revolution of one sheet truncated at an orthogonal regular or Reuleaux polygonal boundary. The hyperboloid of revolution may be obtained by the use of an asymmetric catenary function or a closely similar combination of radial/elliptical or truncated radial/elliptical and linear functions. In an adjusted catenary form the hyperboloid of revolution can be obtained with the following equations and conditions. For the intake mapping values the hyperbolic cosine function, $y=a*\cos h(x/a)$, can be used for the set of real numbers where $x<0$ and where 'a' is determined as a function of desired rate of constriction and intake length. For exit values, the set of real numbers where $x>0$, the following formula is used, $y=(a''*\cosh(x/a''))-(a''-a)$, where n determines the rate of divergence/increase from the initial (0, a) throat value for the y values of the function.

In embodiments, the polygonal truncation of the hyperboloid of revolution may allow the nozzle to cover a polygonal intake area with variable intake curvature while having an effective momentum focusing circular structure and expanding to a closely similar polygonal outlet area. The ability to cover a non-circular, for example a square inlet area, may immediately yield more efficient use of the fluid plane. The preferred polygons or combinations thereof are those that can be tightly packed and provide a minimal surface area solution with regular polygon/s used for complete plane coverage or Reuleaux polygon/s used when a percentage of freestream flow through the given structure is desired. Higher order regular polygons may also be used to allow a percentage of freestream flow.

With regard to the exit it can be formed either by truncation of the asymmetric catenoid or linear element or by interpolating the relative arc curvatures to from a value of $1/r_t$ at the throat (where $r_t$ is the radius of the throat) to 0 at the exit expanding therein to the dimensions of the entrance polygonal truncation. In the case of the Reuleaux polygon the curvature of the arc segment forming the sides is used as the lower value. In the regular polygon and Reuleaux polygon exit cases the geometry is based on the figure of revolution but does not constitute a figure of revolution. Additionally, in the case where a portion of parallel exit is preferred this can be added as an extension of the truncating polygon. In this regard, global (e.g. for the whole nozzles vs. a bounded area in the nozzle) rate of constriction and thereby the parameters of a regular truncating polygon is given by, $$r = Ai/At,$$

or $$r = \frac{(n/4)s^2 \cot(\pi/n)}{\pi(05 d_t)^2}$$

or $$s = \frac{r \square \pi (.5 d_t)^2}{(n/4) \cot(\pi/n)} \cdot .5$$

where n is # of sides, s is the side length, r is the rate of constriction, and $d_t$ is the desired throat diameter.

The resultant geometry may be constrained by the following parameters in order to insure high-mass flow through the nozzle. The initial angular LE value of the radial or catenary function for the curvature of the constrictive region can be determined two dimensionally in its simplest form by using a radial arc approach and is given by the convergence of i for the following equations, $$i = \frac{.5(d_l - d_t)}{1/\sin\theta - (1/\sin\theta^2 - 1)^{.5}}$$

and $$i = \frac{d_t - .5(d_l - d_t)}{\tan\theta}$$

wherein:
θ=vector resulting from initial incident leading edge angle
i=intake length from leading edge to throat
$d_l$=diameter of intake
$d_t$=diameter of throat Dependent on the value of y and the rate of constriction, this can be a catenary, radial, elliptical, or truncated radial, truncated elliptical, or combination thereof constrictive/convergent section.

In embodiments, the present invention may provide a nozzle adapted for use in a wind power generating turbine. A nozzle may be adapted for use in a wind power generating turbine, where the maximal optimal curvature of the nozzle intake may be determined two dimensionally in its simplest form, such as in the case of a radial arc, may be given by the convergence at the initial angular leading edge, such as the value of i for the following equations: $i=(0.5(d_f-d_t))/(1/\sin \theta - (1/\sin \theta^2 - 1)^{0.5})$ and $i=(d_t-0.5(d_f-d_t))/(\tan \theta)$, where $\theta$=vector resulting from initial incident leading edge angle, i=intake length from leading edge to throat, $d_f$=diameter of intake, and $d_t$=diameter of throat. This optimization may be applied two dimensionally or three dimensionally to a catenary, radial, elliptical, truncated radial, truncated elliptical, or the like function. In addition, a nozzle may be adapted for use in a wind power generating turbine, where the optimal curvature of the nozzle intake may be greater than two times the throat diameter.

The geometry of the i value convergence may be applied globally across the intake derived from an i boundary maxima or at some lower boundary i value. It may also be applied locally with interpolated values, wherein the truncation boundary's minima and maxima are solved separately and then used with a weighted interpolation (matching the curvature of the maxima-minima interstitials) to determine the local i convergence relative to varying intake lengths across the polygonal boundary. When applied locally the resultant geometry does not conform to a normal figure of revolution as in the divergent case above. An additional constraint herein is that the mean value for i be preferably equal to or less than the diameter of the nozzle throat. An additional constraint is to maximize the rate of curvature of the wall within the other geometric parameters and this can be inherently optimized by the preceding equations. In this regard the value of $\theta$ can be relaxed by a coefficient defined by the following relationship: $C_r=1+2((1/r)^r)$, wherein r is the rate of constriction. Thereby the relaxation coefficient approaches a minimal value as the rate of constriction increases.

Extant "optimal" intake curvatures, researched under pressurized conditions, indicate that the optimal curvature for a radial nozzle, regardless of rate of constriction, is an arc section from a circle between 1.8 to 2 d where d is the diameter of the throat. Research in furtherance of this invention has shown that such curvature engenders the loss of a large portion of the mass available at the intake area.

With regard to the divergent portion of the nozzle an angular value from throat to exit may be used to determine the volumetric ratio of the divergent length to convergent length. The constraint herein is that the angle of the divergent wall be no more than 5 degrees, with the angle relative to rate of constriction preferred being described by the following equation, $\emptyset=C_d(a+b+b^{5+a})$ where $a=1/r^r$, $b=r^{1/r}$, and $C_d$ is an adjustment coefficient related to intake length, wherein r is the rate of constriction. Therefore the divergent geometry in the current invention is predicated on a ratio of rate of constriction to intake length to divergent length that results in convergent to divergent volumes wherein the volumetric ratio increases with the rate of constriction. It is this combination of specific LE geometry with a variable, rate of constriction and intake dependent, convergent-divergent volumetric ratio that enables high percentage mass flows. Additionally the complexity of the surface geometry of the nozzle can be increased by application of quadric or other complex structures to the basis geometry. This may include small-scale structures used for flow enhancement or larger scale structures for structural or flow enhancement.

Said quadric functions can be bounded to create n-structure surfaces, e.g. scales or dimples, or can be applied globally across the surface as in corrugation or scalloping or rearward truncated scalloping, bounded by the initial truncating polygon. Scale and origin points of the quadric structures can be varied and the surfaces can be compound, with multiple layers of quadric structures mapped against the preceding layers' basis geometry. This allows the combination of various global and local flow-enhancing elements to maximize the nozzle mass throughput. Additionally said quadric structures can have drill-throughs in either single layer or channel implementations to the near wall characteristics of the flow.

In embodiments, the present invention may provide a nozzle adapted for use in a wind power generating turbine. The nozzle may include a variable wall profile, such as a wall profile utilizing linear scalloping. The nozzle may include complex wall topography, where the complex wall topography may maximize structural properties, minimize material use, minimize material weight, and the like. The complex wall topography may have a uniform circular profile, polygonal profile, and the like. The complex wall topography may provide a variable profile, such as with linear scalloping, being generally radially curved, being generally elliptically curved, and the like. The complex wall topography may provide a variable density structure, uniform, variable, and the like. In embodiments, the complex wall topography may provide nozzle components that may be variably adapted to the lowest cost solution for local load bearing parameters within the nozzle. The complex wall topography may provide nozzle components that are made of rigid materials, flexible materials, and the like.

In embodiments, the performance characteristics may be provided. A number of single layer quadric truncated and non-truncated nozzles have been fabricated based on the above parameters. Nozzle constriction rates have ranged from 2-4 with regard to the ratio of the intake to the throat. In cases where the desired rate of constriction exceeds 4, single layer quadric geometries are insoluble as i tends to infinity within the constraint of the LE vector solution. In such cases multi-layer and/or multi-body quadric structures are preferred. Nozzles were fabricated in two throat size ranges 25 cm and 10 cm with the attendant geometric parameters deriving from the structural descriptions above.

As is well known in the art the Bernoulli equation describes the continuum pressure-velocity relationship of a fluid flowing through a constriction wherein the rate of constriction results in an equal rate of acceleration for the mass in question as detailed by the change in KE (u) and internal energy (p). The majority of extant work in nozzle optimization is therefore based on pressure measurements. There is however a substantial divergence in the prior art (Reid et al) between the empirical measurement of volumetric mass flow and. pressure efficiency of nozzles. This indicates that, with regard nozzle efficiency, pressure might not be the most accurate variable. The mass throughput of a particular nozzle geometry is the variable of primary importance in categorizing efficiency. Mass flow efficiency categorization of these nozzles derives from velocity and power data. In comparing velocity results with power results, which are directly dependent on mass throughput, the nozzle performance can be accurately judged by their close agreement. The velocity relationship relies on the mass flow equation, Mdot=puA, where p equals density, such that, for given areas $A_1$ and $A_2$, $Mdot_{a1}=p_f A_1 u_f$, and $Mdot_{a2}=p_t A_2 u_t$, and solving for $u_t$ with Mdot and p values being the same for both in incompressible flow gives, $u_t=u_f A_1/A_2$ or simply the $u_I$ value is multiplied by constriction ratio of the intake to the throat thereby providing the theoretical velocity increase in u for a given constriction.

Mass loss to the exterior of the nozzle will therefore be apparent in the velocity measurements based on the following, where the maximum mass flow rate is $Mdot_{max} = p\, u_I\, A_1$ and, $Mdot_{actual} = p u_a A_2$, mass loss % at throat $= u_a A_2 / u_I A_1 = Mdot_{actual} / Mdot_{max}$ by which the mass efficiency of the nozzle can be judged based on actual velocity measurements. With regard to power analysis, the power equation can be derived by combining the KE and mass flow equations wherein the Mdot term is substituted for the mass term. Thereby the theoretical ratio of power at the intake and throat adjusted for area difference becomes, $$R_{pt:pi} = \frac{(A_i(A_t/A_i)) * p * (u_i A_i / A_t)^3}{A_i p u_i^3} = \frac{A_t}{A_i} * \frac{u i^3 A_i}{A_t} * \frac{1^3}{i_i} = \frac{A_i^2}{A_t}$$

And therefore, $$Pt = Pi * R_{pt:pi}$$

And the nozzle mass flow can be expressed as a function of power, $Mdot_{actual} = P_{actual}/0.5\, u_{actual}^2$ Where, $u_{actual} = (0.5\, A_t p/P_{actual})^{1/3}$ and given simultaneous measurement inside and outside the nozzle, $Mdot_{actual}/Mdot_{max} = (P_{actual}/0.5\, u_{actual}^2)/(P_{max}/0.5\, u\, max^2)$. Where, $u_{max} = u_I\, A_i/A_t = (0.5\, A_t p/P_{max})^{1/3}$ and, $P_{max} = P_i * (A_i/A_t)^2$. Thus the same mass loss rate can be determined as in the velocity case. For example a nozzle with a constriction of 2 would yield a 2 times velocity increase and a 4 times power increase. If the mean measured velocity increase is 1.7, the mass flow efficiency would be approximately 0.85 of the maximal value. With regard to power this mass flow results in a power increase of approximately 2.5. Conversely, a mean velocity increase of 1.85 indicates a 0.94 value for mass flow which results in a 3.3 power multiple.

With regard to the structural parameters described above optimum mass flow performance range for this nozzle type is detailed in the following table:

Table of optimum parameters for structural variables with mass throughput and measurement ranges:

| r | $\theta_{LE}$ | $C_r$ | $L_i/d_t$ | $L_d/L_i$ | $\emptyset_D$ | Mdot % | V inc. mean | P inc. mean |
|---|---|---|---|---|---|---|---|---|
| 2 | 31 | 0.5 | >1, opt .5 | >6 | <2 | .92-1 | 1.8-2 | 3-4 |
| 2.75 | 27 | 0.12 | >1, opt .8 | >8 | <1.5 | .95-1 | 2.5-2.75 | 5.625-7.56 |
| 4 | 25 | 0.03 | >1, opt ~1 | >12 | <1 | .815-0.9 | 3.25-3.6 | 8.66-11.6 |

It was found that divergent length and function thereof is mainly dependent on intake length not throat diameter, as in prior art, although in higher rate constrictions these values are forced to approach each other by geometric and curvature constraints. Variation of the intake length and the diffuser length but not the throat diameter resulted in little or no performance difference, providing the ratio of $L_d/L_i$ was maintained, $L_i < d_t$, and the nozzle conformed to the other geometric parameters. Variation of throat diameter with static $L_d/L_i$ proportions again resulted in little or no performance difference.

The optimum divergence angle was found to differ from those previously described in the art. It was also found that the narrowness of the optimum range was inversely proportional to the rate of constriction. Mass throughput degraded steeply in testing outside the optimum range described. Higher rate constriction nozzles were especially sensitive. Additionally it was found that variation of intake length in excess of the described range substantially degraded performance especially if combined with a variation of the diffuser length below the described range.

No substantial mass flow difference was noted between truncated and non-truncated nozzles of the same rating, indicating that the truncated nozzle might be more efficient simply based on its geometric coverage of the wind plane, and therefore preferred. Additionally a 2.75 nozzle had a secondary quadric layer applied after its initial phase of testing. A performance improvement based on power capture was noted. Additionally the nozzles were tested in staged and nested configurations wherein in the first case the nozzles were tested at some nominal separation with little or no performance degradation. In the second case nozzles were nested within each other with the smaller being placed at a nominal distance rearward of the larger throat to achieve better throughput on higher rate constrictions.

As detailed in the previous section nozzle flow acceleration is premised on the principle of conservation of mass. Bernoulli and Navier-Stokes equations are considered the governing equations for fluid flow at standard pressure and density. This regimen is generally known as the continuum regimen wherein a fluid model is based on macroscopic properties. Navier-Stokes equations are usually solved numerically as no general solution is known. In addition to these approaches there are various numerical methods applied to fluid flows ranging from Lattice Boltzmann to Monte Carlo methods. At some level however most of these solutions are based on empirical adjustment of the theoretical result to match test data. Additionally there is very little wide-scope experimental data regarding the performance of nozzles. Gibson and Reid provide the most comprehensive data in the art but in both cases the studies are limited to isolating the effects of one characteristic of the nozzle such as 2 dimensional divergent length in Reid. Most recent work is premised on numerical estimations or design testing.

Numerical studies such as Tekriwal use pressure variables to calculate accuracy of numerical simulation against empirical pressure data, but ignore flow rates or derive flow rates from the pressure variables. Additionally the basic assumptions therein are based mainly on the work of Gibson and Reid which are relatively constrained in scope. Problematically prior art provides no satisfying explanation for the nozzle's improved function with the divergent section in the subsonic regimen. Likewise there is little research on the actual properties of a flow along a gradient. Formulas such as the linear interpolation pressure gradient force (PGF) equation, $$F(m/s^2) = \frac{1}{p} * \frac{p_1 - p_2}{n},$$

approximate flows reasonably well but do little explain the mechanisms of the flow itself or the properties said flow displays either at initial condition or in steady state. As can also be seen the simultaneous use of the pressure and density terms is problematic.

This can be said generally of the fluid dynamics equations. They are very good for approximating performance under specific conditions, usually pressurized, but generally the solutions do not match experimental data closely in the area under consideration, e.g. mismatch between theoretical performance and test data that is especially true of nozzles. The almost complete lack of research in non-pressurized conditions adds to the imperfect understanding of nozzle function. The divergence between experimental data and theory is usually explained by variation of a real gas from an ideal gas or frictional effects or some slight error in fabrication. More likely it is due to oppositional geometry enhancing flow effects that would otherwise by masked by the free volume proportions of single-body research.

Since single-body constitutes the majority of solid body research data and the basis of Prandtl boundary layer theory and Blasius' work, the error rate in predicting nozzle performance is a strong indicator that there are some inherent flaws to understanding the mechanics of flows as embodied by the fluid dynamics (FD) equations. For these reasons extant theory does not provide a solid basis from which to optimize nozzle design in and of itself. Given the dearth of experimental data in the area especially in the subsonic regimen this means that use of extant theory to enhance design is mainly educated guesswork.

Since an efficient nozzle design is one of the purposes of this invention, it was desirable to develop a flow model which indicated different design paths by which a nozzle might be optimized, one which explained the interaction of the various nozzle regions and which matched experimental data. This requires a detailing of the problems with the current set of assumptions and development of a model of the types of flows a nozzle such as the designs described herein are likely to encounter in operation and thence a more in depth description of solid body interaction with said flows.

The most pressing problems in this regard may include, assumption of solid body interaction being substantially similar regardless of the type of fluid flow, use of the Pressure Gradient "force" (PGF) to explain the mechanism of fluid flows, assumption that subsonic flow in the continuum regimen is of uniform density, assumptions associated with the distinctness of free-stream and boundary layer, assumption that pressure can provide a substantially accurate description of fluid behavior, assumption that pressure, velocity, and density are substantially differentiated variables, and the like.

First there are two distinct conditions that result in fluid flows. One is when a displacement volume is introduced into a fluid system that results in the distribution of the momentum from the volume of introduction throughout the system until the system again reaches a state of equilibrium. Two is when energy is introduced into a fluid system that effects the system-wide distribution such that flow is created by the properties of the imbalance in distribution and continues until a state of equilibrium is again reached. Solid body interaction with a flow that is substantially of one type or another must, by its very nature, have different parameters. Any given flow is likely to include elements of each type of flow (e.g. a plane flying into a headwind), but the majority of interaction in a given localized system can usually be ascribed to one or the other. These two types of flow are best described as wake flow and gradient flow. In the first case introduced force drives the flow, whereas in the second case density drives the flow.

This brings us to a second adjustment with regard to the current model of flows. Both the macroscopic and microscopic properties of a fluid flow are describable by revising the variable set used. In this regard the Bernoulli equation can be characterized as a statement of proportion and, while useful for measurement, it is not very useful for mechanics. The macroscopic pressure-velocity relationship is simply a convenient description of the proportion of unidirectional net momentum vs. omni-directional momentum at the molecular level as determined by the thermal/energy properties of the system in question, wherein the unidirectional component is the bulk velocity and the omni-directional is the bulk "pressure". In the case where this net flux across the system in question has not been caused by displacement, there is only one potential source—statistical movement based on the kinetic energy of the molecules in the system and a variation in molecular density.

This can be most conveniently viewed in the context of an n-dimensional matrix for which the population of the matrix has n degrees of freedom from state t to state t+1 wherein the probability of any given path is substantially equal and random and the population is constrained to shift position at every time step, e.g. Brownian motion. The desired sampling rate of said matrix would be the mean molecular separation although the matrix can be scaled to represent the mean properties of groups of molecules. If the matrix is subjected to a sparse-dense mapping wherein the population of the matrix is denser in area a than in area b, then the statistical net momentum/movement, e.g. flow, is found in the dense to sparse direction. Providing an approximation of thermal energy input into a system by constraining density variation at each time step to be substantially similar to the preceding time step, this method of representation provides a close approximation of short-term steady state flow as one might find in a wind system.

From this model it is clear that gradient flows are a statistical expression of the density variation in a system and the level of kinetic energy present in the system, not the product of PG "force". Thereby the continuum assumption of uniform density in a fluid flow in the subsonic regimen is clearly at odds with the mechanics of the flow itself. Therefore the assumption of uniform density must be held to local constraints of intermolecular repulsion and thermal expansion.

Additionally it can be seen that both the macroscopic properties of velocity and pressure are functions of the microscopic properties of molecular density, root-mean-square (RMS) velocity, and translational momentum. In this regard these macroscopic variables can be done away with in favor of the more accurate model. This revised model must now be developed to be of use in solid body design. The first step therein is a definition of the mechanics of the flow.

Similar to the rest energy calculation the potential maximum of the flow in terms of energy or velocity can be calculated based on an instantaneous unidirectional flow, e.g. all molecules flowing from a standard density region to vacuum, by setting the velocity equal to the mean RMS velocity of the mass under examination. In this way any portional flow can be characterized as a percentage of the RMS unidirectional velocity.

Since velocity can be expressed as a function of momentum and mass, the velocity of a given intermolecular slice can be expressed as the net transfer of momentum and mass between slices with the mass transfer between the slices determined by the density:sparsity difference. In a steady state flow this transfer would be constant between the slices somewhat similar to a cascade effect.

In this regard there will be a net momentum increase between any given pair of slices, $n_n$ and $n_{n+1}$. At each slice $n_1$, $n_2$, $n_3$ ... $n_n$ the momentum increase will be additive in the sparse direction as each slice has a net momentum increase between samples t and t+1. Thereby the velocity profile of the gradient field is dependent on the specific dense sparse distribution of molecules for the field in question and the sum of momentum transfer and number of slices within the field.

In this way the macroscopic properties of velocity, e.g. the bulk transfer of mass over a given distance, can now be represented by the microscopic fluid conditions and more specifically the microscopic momentum field.

This is of special import with regard to the introduction of a solid body into the gradient field. Specifically with regard to nozzles this implies that the velocity increase at the throat is no longer a function of mass conservation as in the continuum model. Instead it results from changes in the density gradient field caused by the introduction of the solid body and differences in the momentum transfer resulting from those changes.

The nature of the field in the steady state may be such that the maximal value the rate of momentum transfer may be concurrent with the maximal rate of change in the density gradient wherein said rate of change can be assumed to be non-linear and likely parabolic.

With the uniform density constraint relaxed and the bulk properties no longer dependent on mass conservation, this has substantial implications with regard to boundary layer. Assumptions of the distinct separation between conditions in the boundary layer and the freestream are no longer valid as the foundation for the boundary and freestream separation is the mass continuity of the freestream.

It is useful now to treat the nozzle as a separate field within the larger density field. Assuming steady state condition for a nozzle in a gradient flow, the maximum rate of constriction for a radial inlet nozzle occurs at the leading edge of the nozzle inlet. This implies that the greatest density change within the nozzle field will occur in the region of the leading edge. Density will increase proportionally to the local rate of constriction and the thermal constraints of the field and thereby momentum will increase in the flow direction at a similar rate.

This has several implications for the visible boundary layer. While some momentum is lost in the LE region as incident molecules collide with the nozzle wall, subsequent collisions should conform to general parameters of elastic collisions between molecules. Thereby there exists a mean (e.g. statistically directional diffuse reflection) direction of the n molecules incident to the LE, with some parameter of momentum loss. The momentum vector of the molecules deflecting from the LE region will reflect into the stream upon each collision while the individual molecules will continue to collide with incoming molecules on a mean free path basis until the initial incident path becomes closely orthogonal to the nozzle wall. Under this model there is a formation of a boundary layer which satisfies the no slip and visible boundary layer conditions but this boundary layer does not contain the momentum as is assumed in extant boundary layer theory.

With regard to design optimization this implies that the LE vector is of substantial importance in transferring momentum into the inward intake regions. Additionally this implies that there is a relationship between the rate of constriction and parameters of the LE dependent nozzle function as is borne out by experimental data.

Conversely there is a limit at which the density increase becomes such that the net momentum transfer from the external field into the LE region is opposed by the density increase such that there is also probabilistic momentum transfer in the direction generally opposite to the flow engendering mass loss. Such a condition leads to the entrainment of less mass into the nozzle and mass and momentum loss to the exterior of the intake and a lesser rate of momentum transfer to the inward regions of the intake.

This condition can be experimentally observed most easily in a converging nozzle. In a converging nozzle as the rate of constriction grows the rate of velocity increase is noted to shrink indicating a mass build up in and forward of the intake. This is observable in smoke visualizations of converging nozzles wherein when the rate of constriction becomes sufficiently large the flow becomes stagnant to the point where the observable boundary layer does not form. Length over which the constriction occurs also contributes to this effect. It can also been seen in the attachment of shock to a solid body in the sonic regimen.

A velocity increase is noted in the use of a converging nozzle usually at much lower rate than the theoretical increase. An examination of the density gradient in the converging section is of interest here. As the LE density condition increases a region of additional sparsity is created rearward of the LE. In the case of a strictly converging nozzle the exterior field density at the throat is not a sufficient gradient for the flow to attain a rate of momentum sufficient to clear the LE density and allow the full mass available at the intake to enter the nozzle.

Under such conditions it is likely for the momentum field to be parabolic achieving a maximum rate within the inlet where the rate of constriction acts as a counterbalance to the potential maximum rate of transfer.

As a note this model also serves to explain the experimental difference between radial and straight inlets. In a radial inlet the maximum rate of constriction is localized to a relatively small region wherein the density increase is localized. Conversely a straight or funnel inlet has a constant rate of constriction creating a constant density increase through the intake to the throat.

With a localized density region at the LE the diffuser functions to increase the dense sparse rate of the gradient field which the nozzle contains. The increased diffuser length with increased constriction serves to increase the volumetric ratio by which the gradient is controlled and thereby clear the forward density in the LE region. Based on the rate of constriction and thereby the rate of LE density increase, the length of the diffuser determines whether the rate of maximum momentum transfer is at or close to the throat.

If this maximal rate is clear of the intake region, a condition exists such that the increased density is cleared and the limiting condition resulting in flow opposing the flow field is not reached. The increased velocity at the throat is thereby due to the combination of the gradient between the LE region and the exit and the initial momentum influx from the exterior field. In this regard the diffuser serves to control both the properties of the gradient field and the rate at which the mass and momentum transfer occurs from the throat to the exit.

Figure 27:
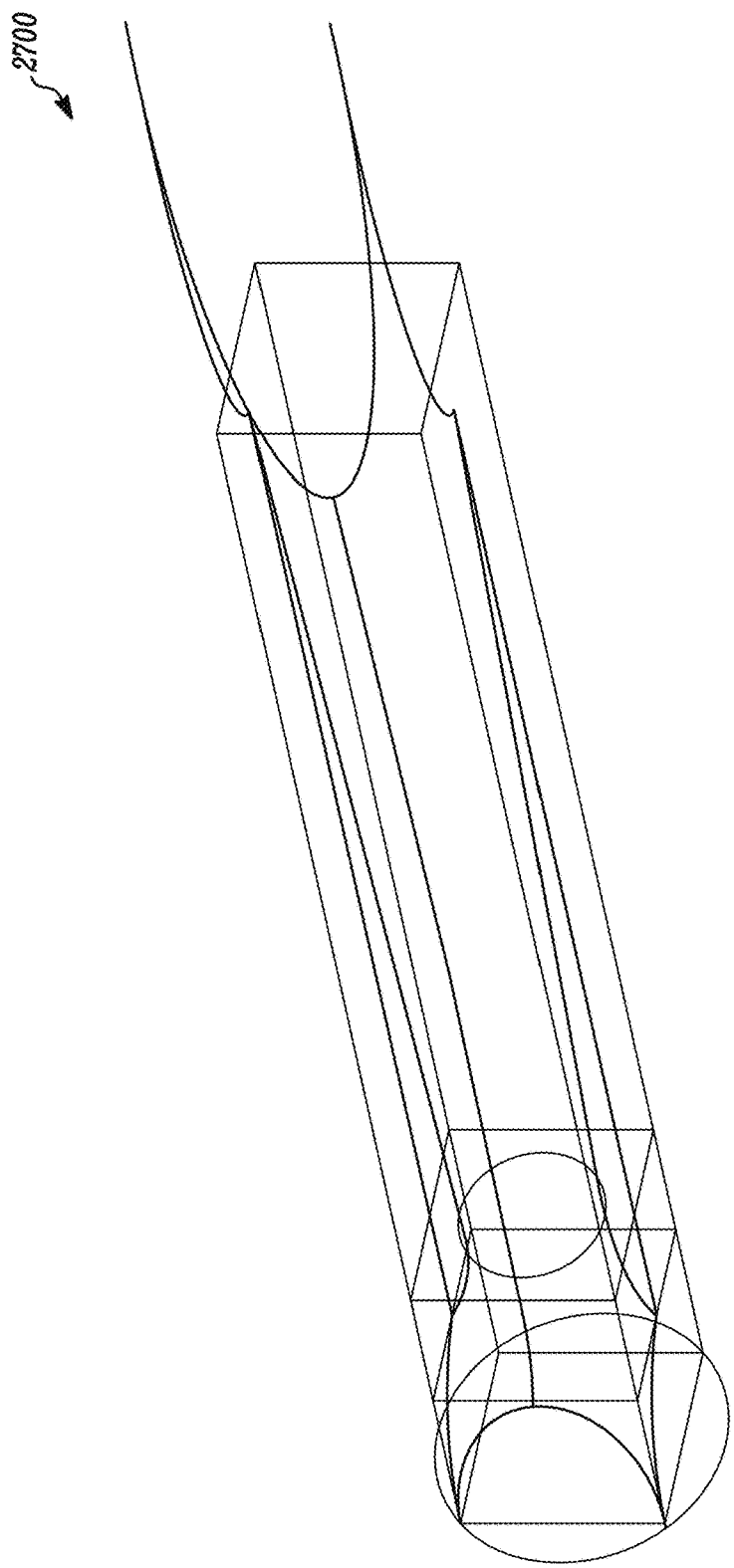
FIG. 27 depicts a nozzle with truncation intake and exit.
Figure 28:
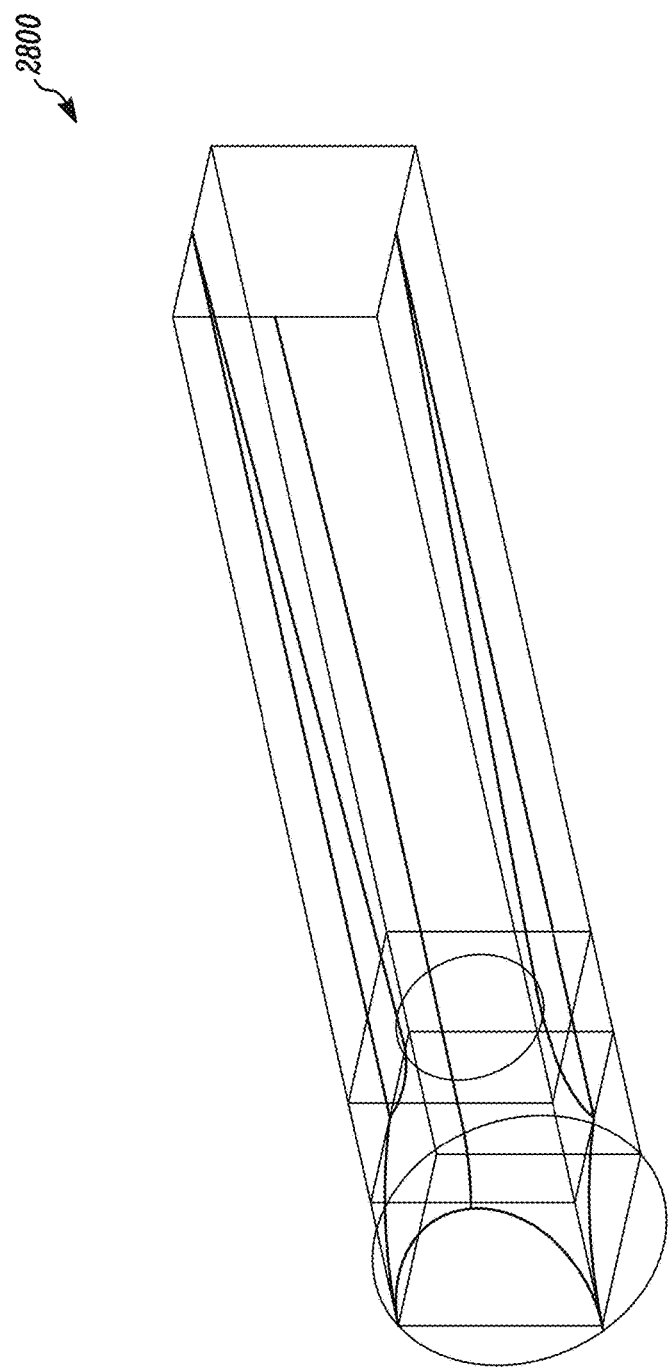
FIG. 28 depicts a nozzle with truncated intake and 1/r–0 interpolated curvature.
Figure 29:
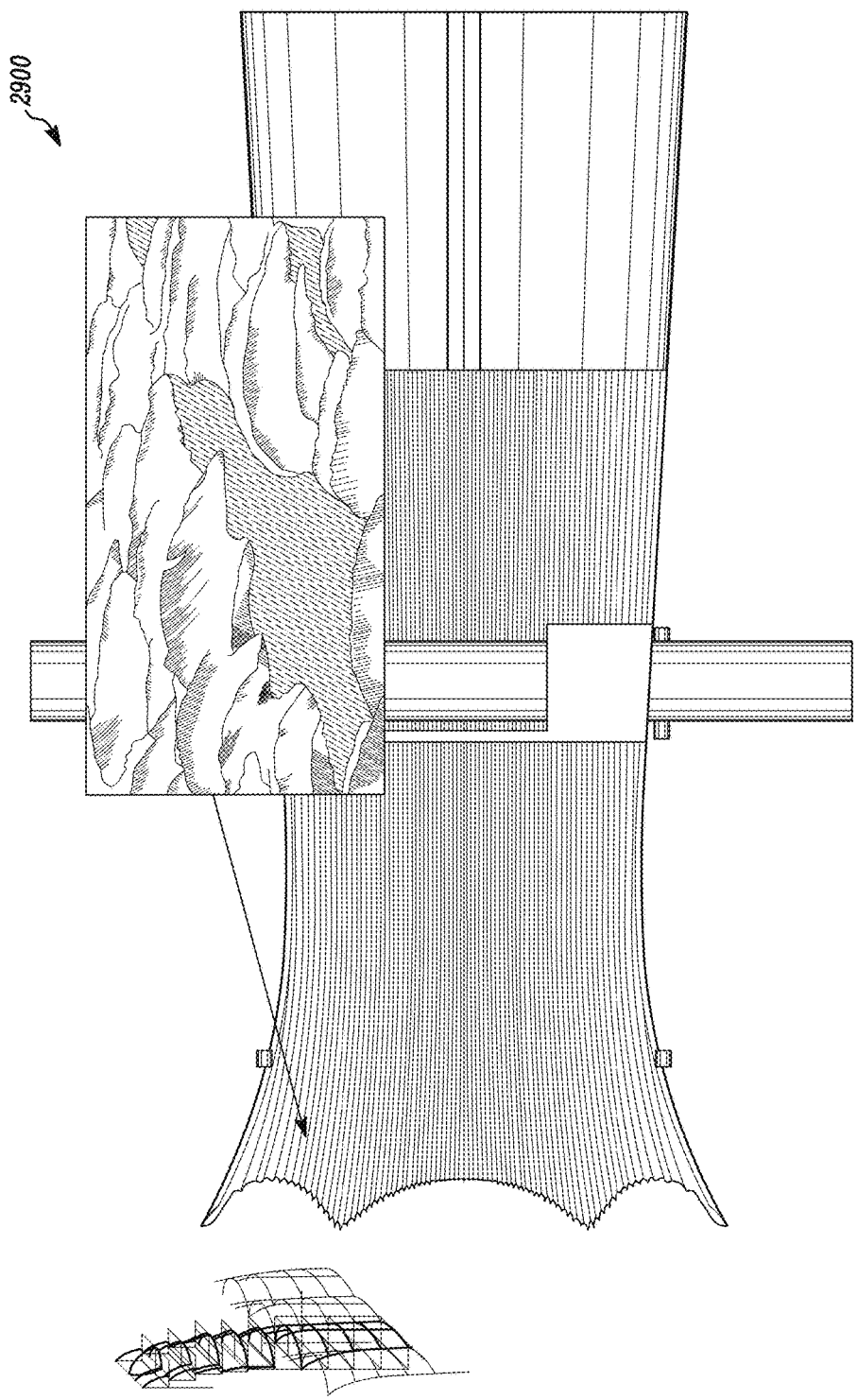
FIG. 29 depicts an arc section diagram for inlet geometry.

In embodiments, this describes the basic function of the nozzle regions under a revised model. This model delineates the properties of the different nozzle regions and provides a foundation both for the explanation of regional function and the design of high throughput nozzles. In illustration of the above discussion, FIG. 27 depicts a nozzle with truncation intake and exit 2700, FIG. 28 depicts a Nozzle with truncated intake and 1/r–0 interpolated curvature 2800, and FIG. 29 depicts an arc section diagram for inlet geometry 2900.

Figure 30:
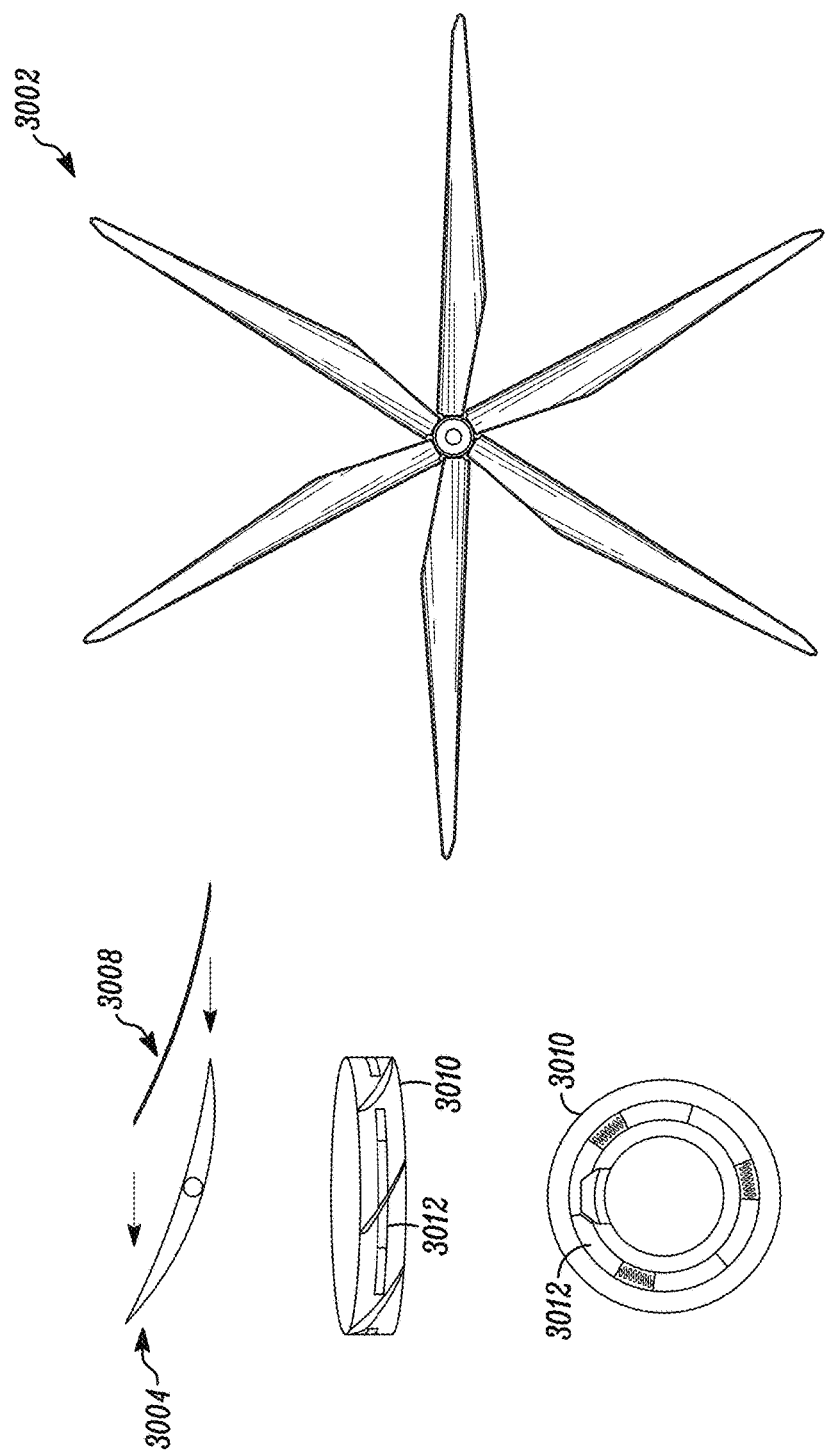
FIG. 30 depicts a multi-blade configuration

In embodiments, aspects of a variable blade rotor are presented. A variable blade number-type rotor is described wherein the number of blades a rotor presents to the flow varies with flow speed. In an embodiment, FIG. 30 depicts a six-blade open configuration 3002, showing the primary 3004 and secondary 3008 blade, and the primary 3010 and secondary 3012 hub of the pressure mechanism. As is well known in disc theory, rotors with different numbers of blades and different profiles have performance profiles that closely fit a given flow velocity range. Since it is desirable to optimize the power output of a flow driven power device, a rotor that adapts the disc solidity presented to the flow would be more efficient at gathering power across a variety of speed regimens than a fixed solidity rotor.

Figure 31:
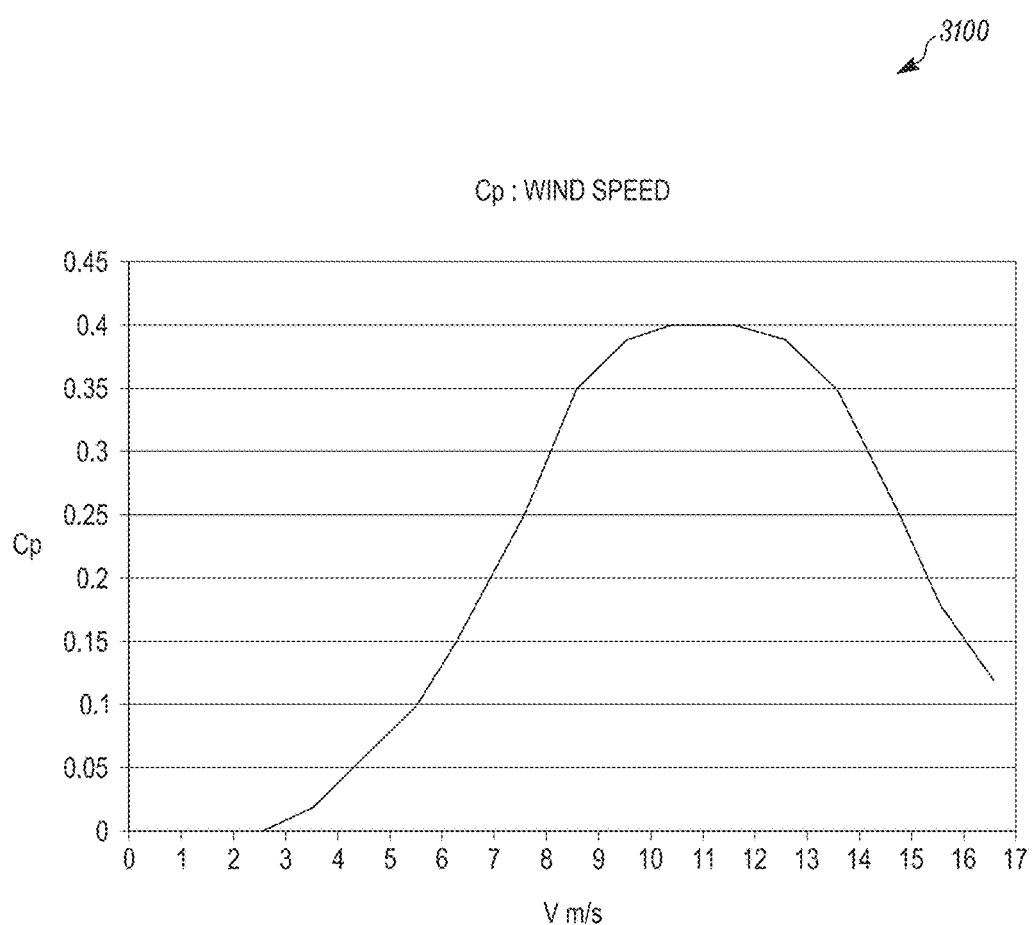
FIG. 31 depicts a 3-blade rotor efficiency plot.

A 3-blade rotor efficiency plot 3100 is shown in FIG. 31. $C_p$ represents the proportion of power available at the area covered that the rotor is able to convert. This is a direct result of the rotational speed as it relates to tip/blade speed and the loading of the rotor through the generator. The power plot of this relationship forms the well-known power curve.

Figure 32:
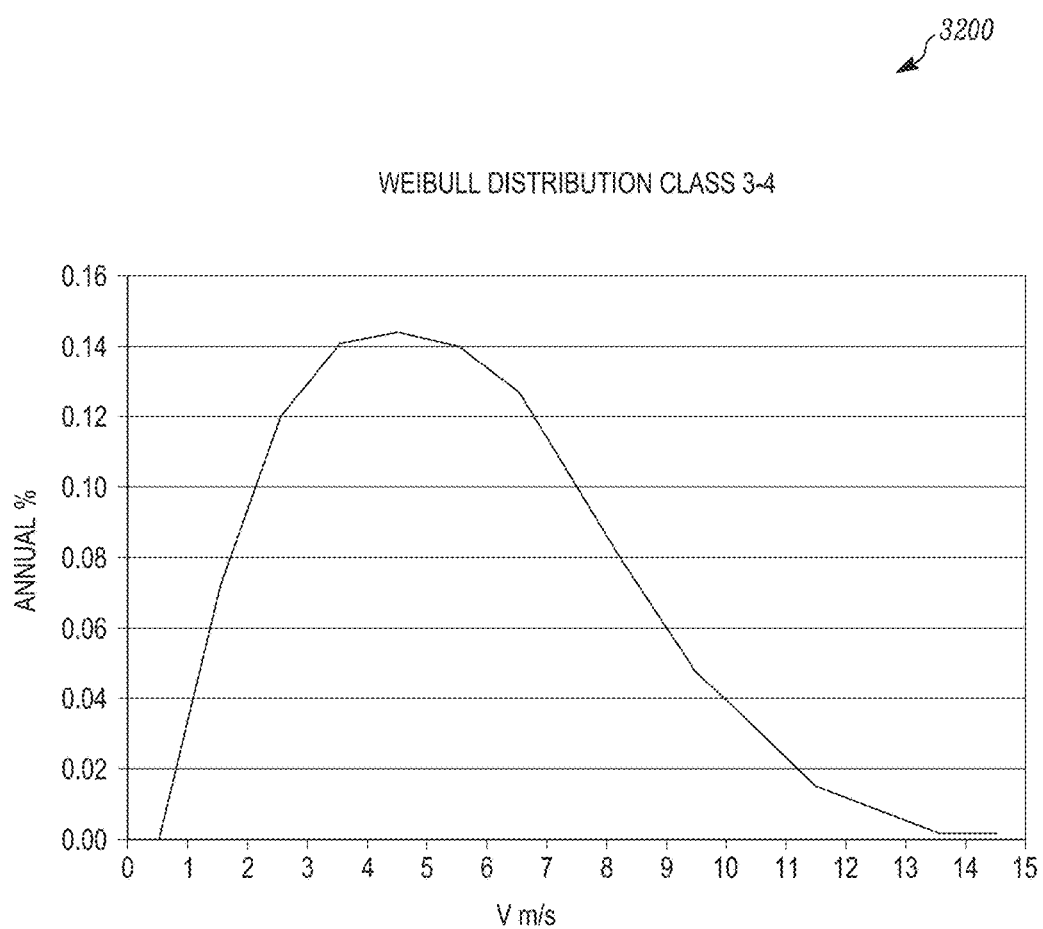
FIG. 32 depicts a plot of annual velocity distribution.
Figure 33:
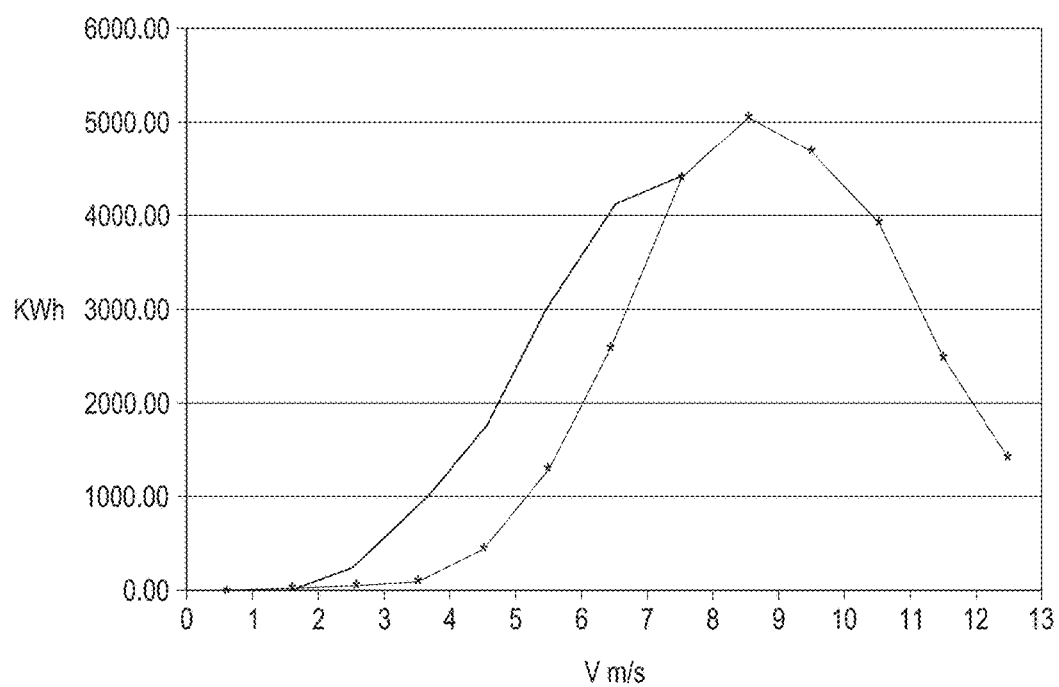
FIG. 33 depicts an annual distribution power output by linear velocity.

FIG. 32 shows a Weilbull distribution of annual velocity 3200. Taken in combination these result in FIG. 33, a comparison 3300 of a 6>3-blade $C_p$ profile and a 3-blade $C_p$ profile for annual power:velocity distribution. As linear velocity increases, tip speed increases, and the rotor reaches a limiting rotational value based on the aerodynamic properties of the blades and disc solidity making the typical 6-bladed rotor inefficient in the ranges above 6 m/s.

Figure 34:
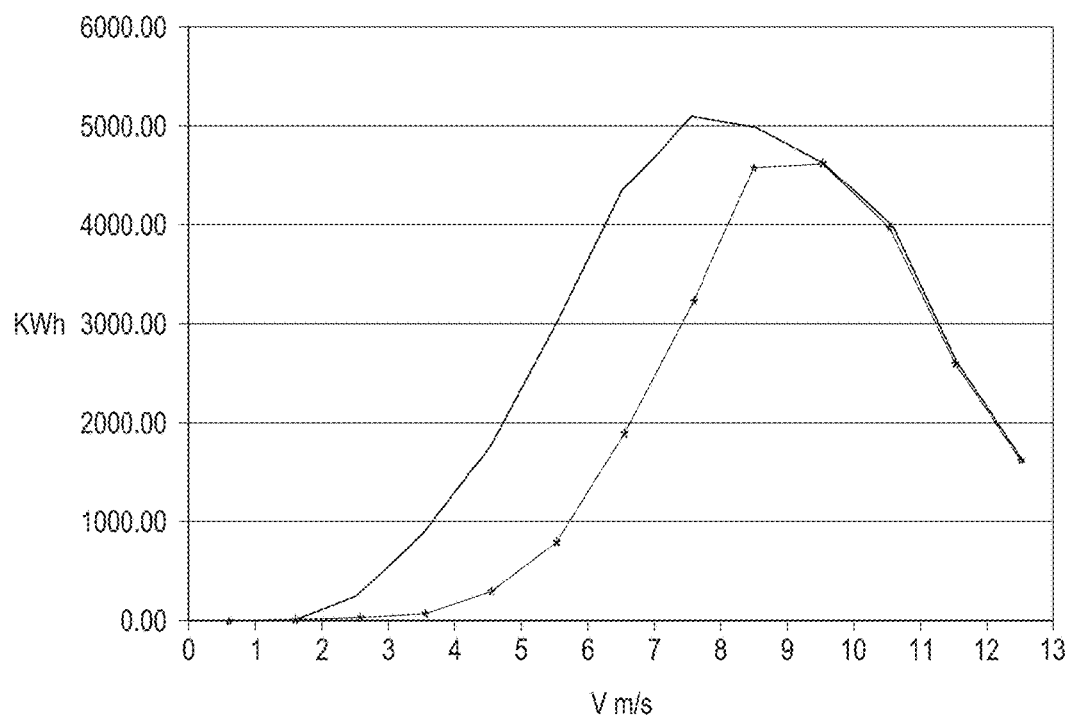
FIG. 34 depicts annual distribution with heavier loading to shift.

While this efficiency range is highly dependent on the loading scheme both with regard to the gearbox/transmission and electrical loads, assuming an optimized design for both mechanical and electrical loading there is a clear efficiency limit to a blade set based on its rotational speed. Enhanced loading schemes, as plotted 3400 in FIG. 34, that shift the rotational aerodynamic efficiency range upward without negatively effecting efficiency of power capture are preferred in this invention. That said, in the 1 m/s to 6 m/s range the 6-bladed rotor captures more of the KE available in the raw flow. Given a situation wherein the majority of a given flow on a time period basis is in the lower ranges the advantage of having variable disc solidity is clear.

The variable solidity rotor may have a plurality of prime number rotors sets (e.g., 1, 2, 3, 5, etc) co-axially mounted inclusive of a facility which allows the secondary, tertiary, . . . nth rotor set to slot into each preceding set. As an example, for a 3 blade primary rotor with three sets, the initial stage would be a 12 blade rotor which would close to a 6 blade rotor and then into the primary set of 3.

The facility for closing said primary rotor sets may be inclusive of both dynamic pressure driven and/or actuator/mechanical methods. Rotor sets can either be of closely similar properties in terms of aerodynamics and mass or of divergent blade structural, mass, and aerodynamic properties.

In embodiments, rotor sets may be mounted to a series of dual position slip rings wherein when the dynamic force on a given set is exceeded the ring is released and dynamic force on the blades shifts it to a closed position on the following set of blades. A mechanism is slotted on closure such that when the dynamic force on the closed blade sets indicates a drop in velocity the blade set is released to open position.

In this embodiment the rotor is constituted of 3 sets wherein the primary set is a structurally reinforced swept-twist thin airfoil blade and the secondary set and tertiary sets are thin swept-twist airfoils. The camber geometry of the secondary set is fitted to the lower surface of the tertiary set and similar fitting geometry is used for the primary and secondary sets. Geometry is such that the blade pitch between states is not altered. Each set is optimized for higher-speed profiles, to extend the usable range of each blade state to maximum efficiency.

Figure 35:
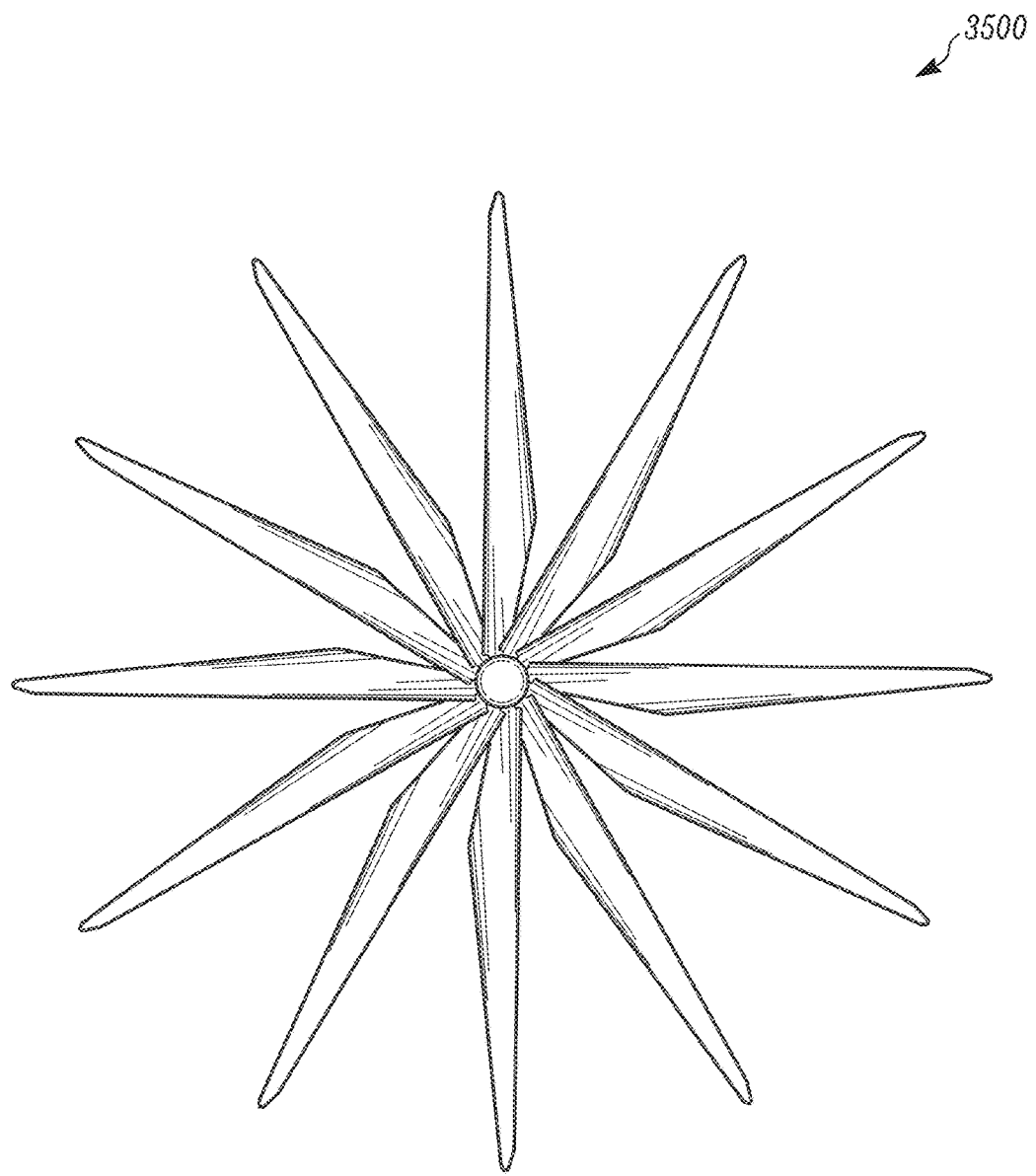
FIG. 35 depicts open position 12 blades, where velocity is approximately in the range of 1-3 m/s.
Figure 36:
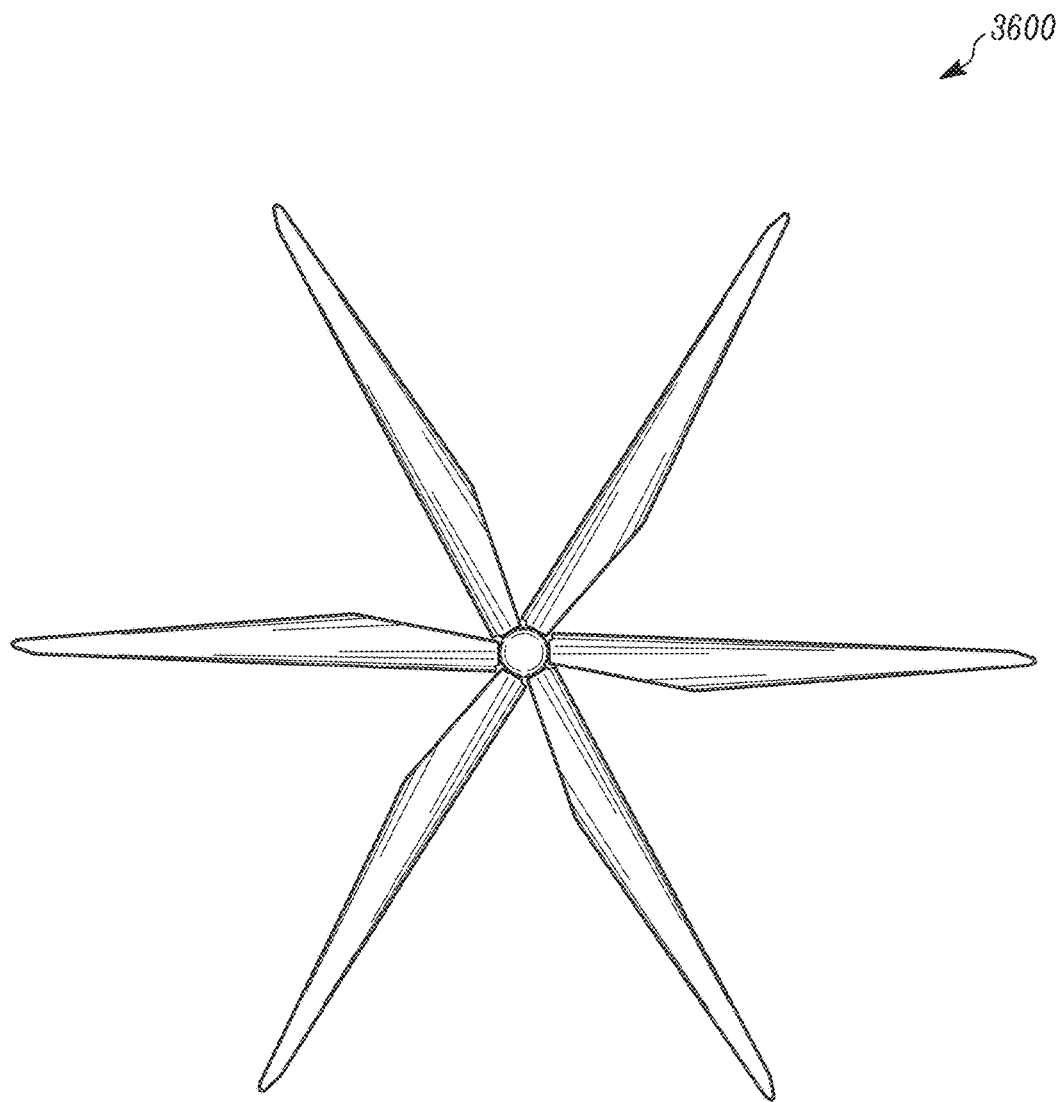
FIG. 36 depicts open position 6 blades, where velocity is approximately in the range of 3-6 m/s.
Figure 37:
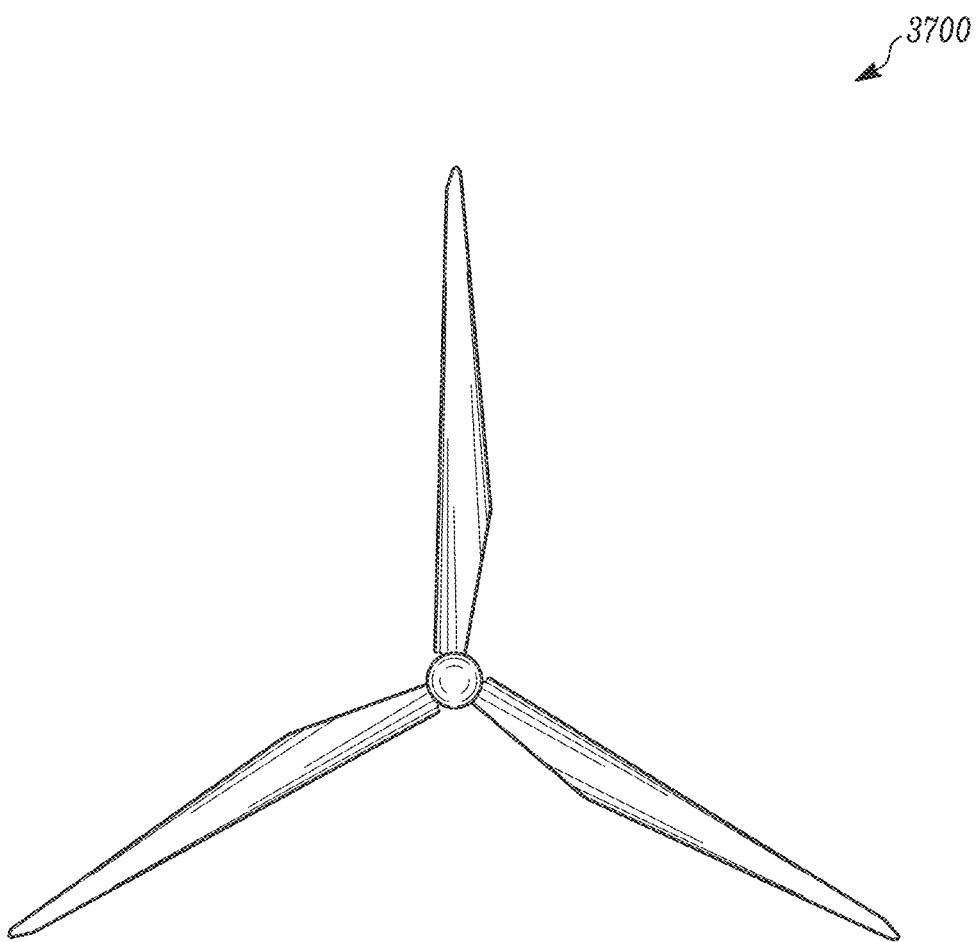
FIG. 37 depicts closed position 3 blades, where velocity is approximately 6+m/s.
Figure 38:
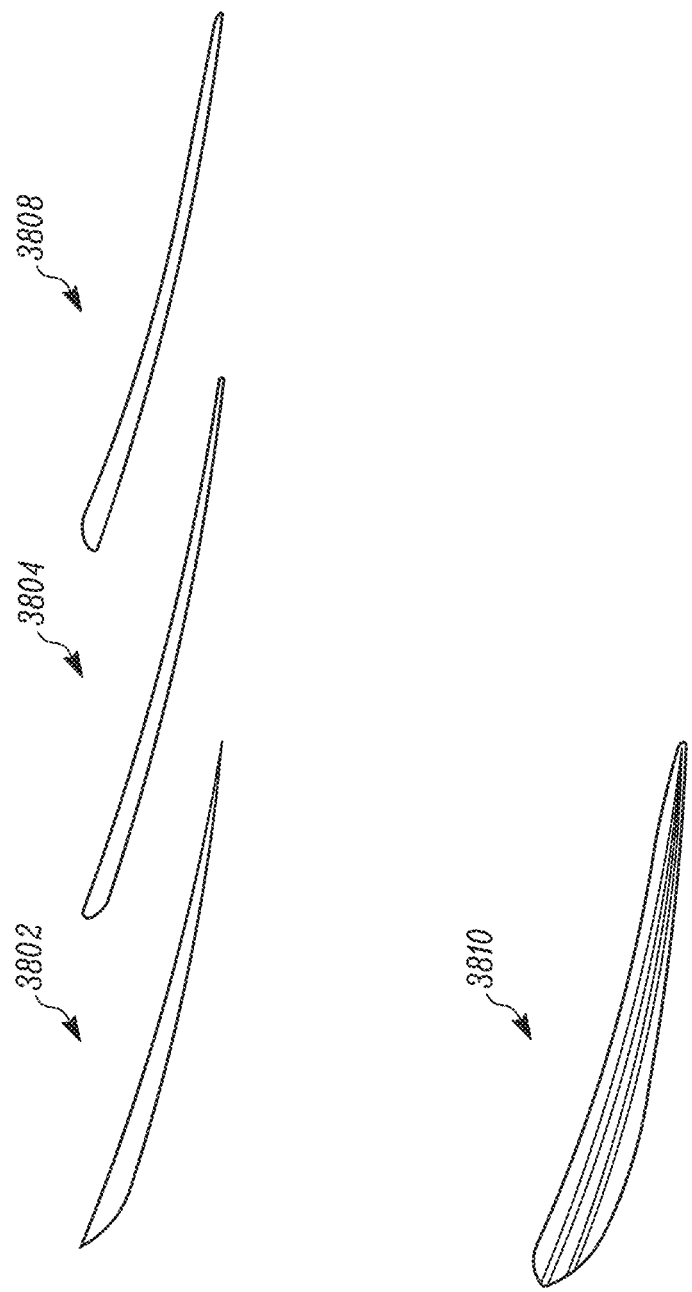
FIG. 38 depicts a sample of open and closed profiles.

In embodiments, the primary blade set is inclusive of structural components that allow mass distribution to be controlled on the rotor per provisional application. FIGS. 35-38 show certain aspects of the blade configurations previously discussed, where FIG. 35 depicts open position 12 blades 3500, where velocity is approximately in the range of 1-3 m/s, FIG. 36 depicts open position 6 blades 3600, where velocity is approximately in the range of 3-6 m/s, FIG. 37 depicts closed position 3 blades 3700, where velocity is approximately 6+m/s, and FIG. 38 depicts a sample of open and closed profiles 3210, where the open profile shows the primary blade 3802, the secondary blade 3204, and the tertiary blade 3208.

In embodiments, an inertial rotor may provide advantages by enhancing rotational stability under dynamically variable conditions, wherein the outward centripetal force of the rotation is used to enhance the inertia of a rotating body by way of a variable radius mass distribution system. A material may be allowed to move based on centripetal motion toward the outer radius of the rotating body. This can be executed with any material that can be controlled in its balance under centripetal force. Said material can also be controlled by way of actuators.

In embodiments, an inertial rotor may be comprised of single or plurality of rigid or semi-rigid bodies symmetrically or asymmetrically joined in a contiguous or non-contiguous manner around a centroid of rotation wherein there exist facilities to control the mass distribution within the plane/planes of rotation and thereby the inertial characteristics of said rotation in a manner advantageous to the desired use.

In embodiments, the invention may constitute a rotatable body 302, as shown in FIG. 39, with a central mass reservoir 3904, a facility for controlling said mass 3908, and an outer mass reservoir 3904. Said reservoir can be either a single or plurality thereof. The initial condition is with the mass central to the axis of rotation wherein there is little additional energy required to begin rotation. As the body's rotation accelerates the mass may be moved toward the outer radius 3910 and 3912 through the mass control mechanism 3908, which may include but not limited to centripetal acceleration or mechanical or other actuators. The additional mass in rotation on the outer portion of the body provides a more stable rotation with greater relative inertia.

In embodiments, the control of the mass within the rotor radius may be achieved by way of variable mass flexible structures, e.g. weights/springs or memory plastic/foam or other suitable material known in the art, wherein the flexible structure, with an external element of the structure having greater mass than the internal element, is contained in an housed chamber extending axially through a single or plurality of solid bodies. As rotation and centripetal force increase the weight will extend the flexible structure to the maximal desired external radius of the rotating body. As detailed below these structures can include magnetic properties of use in both mass distribution control and field generation.

In embodiments, a contiguous substance is housed within a single or plurality of central portion/s of the rotor assembly wherein channels extend axially through a single or plurality of bodies attached to said central hub. The substance can be any substance that conforms to a given viscosity wherein the substance will shift mass toward the outward radius through the channels only under rotation while maintaining contiguity through the radial channels and central hub such that as centripetal force is reduced the viscosity (coherence) of the substance will draw the outer mass back into the central hub. As detailed below said material can also include magnetic properties of use in both mass distribution control and field generation.

In embodiments, a fluid may be allowed to cycle through a single or plurality of axial channels. Said fluid can be a standard dense fluid or can be fluids with special properties such as magneto-rheological fluids wherein the electromagnetic properties of the fluids can be used to control mass distribution within the solid body under rotation. In such a rotating body the magnetic fluid, or other magnetically "enhanced" substances or structures such as those mentioned above, while being controllable in its distribution through the body by way of electromagnetic fields may also serve the purpose of generating useful electro-magnetic fields as the substance or structure achieves its maximal radial position. Such executions of the current invention can be achieved with either a fixed method of field generation or in combination with a single or plurality or counter-rotating bodies. In addition, mechanical actuators may be used to granularly control the mass distribution of the substance or structure under consideration.

Figure 40:
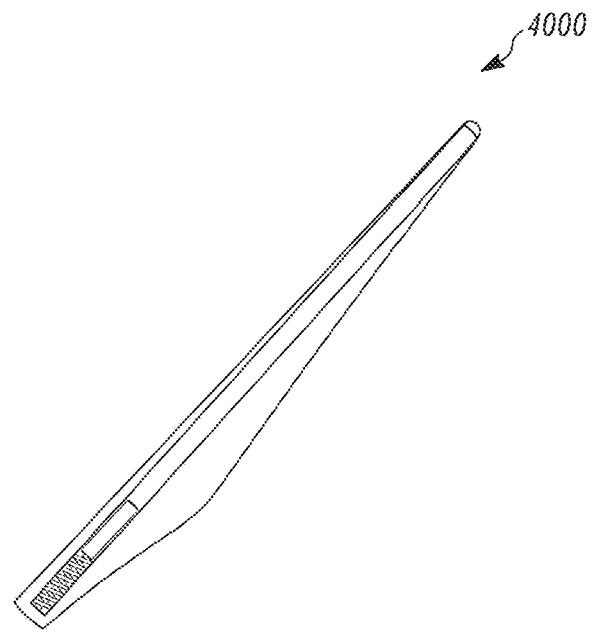
FIG. 40 depicts a weighted structure initial position.
Figure 41:
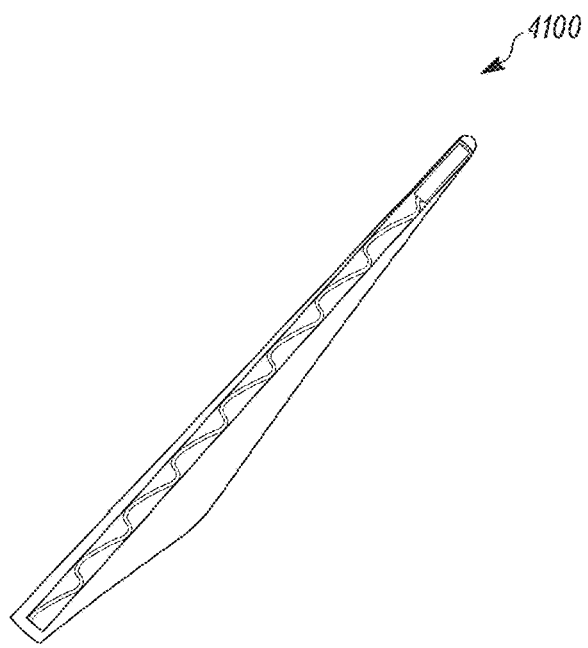
FIG. 41 depicts a weighted structure in a subsequent position.
Figure 42:
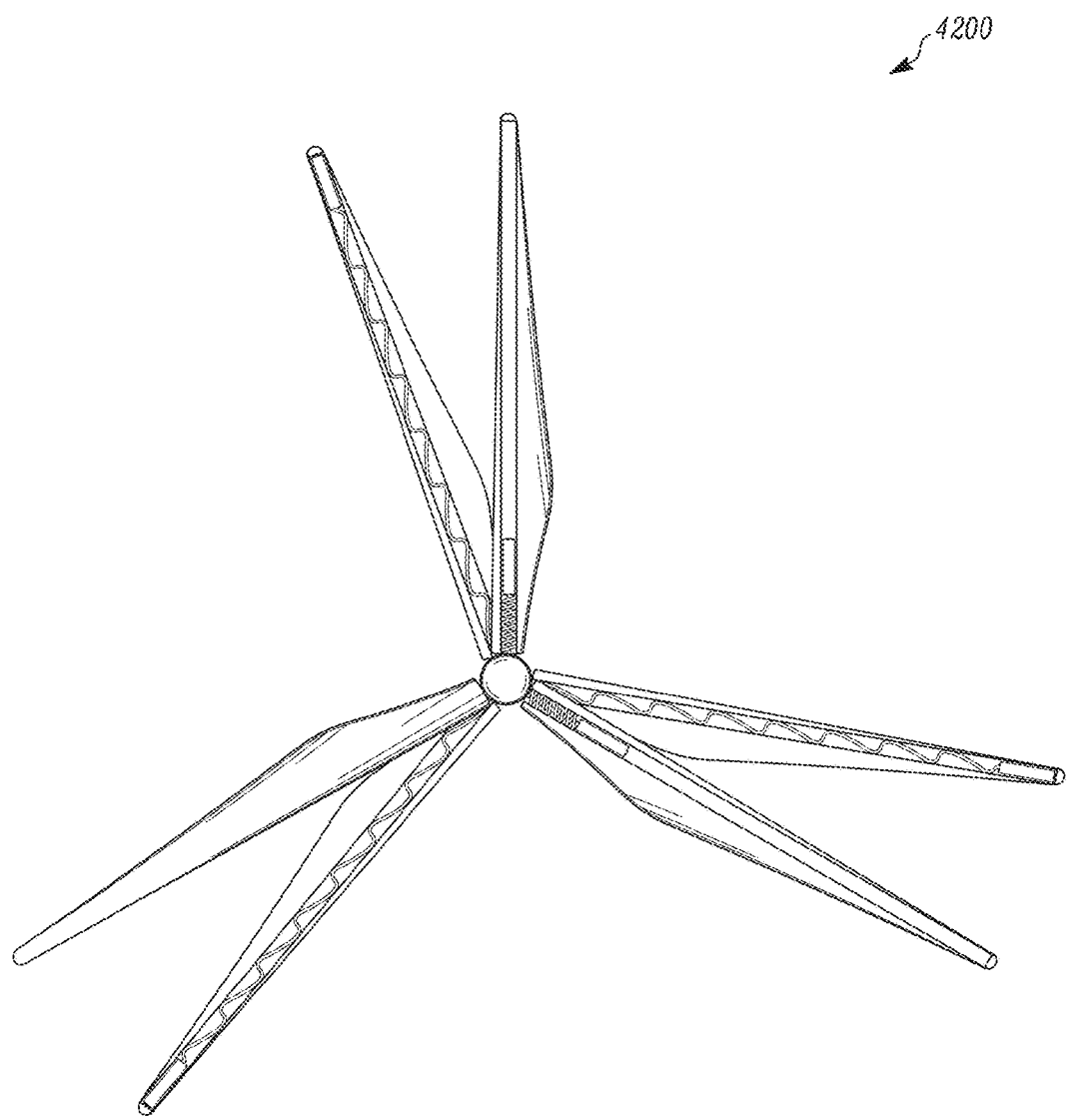
FIG. 42 depicts a 3 blade structure in motion.
Figure 43:
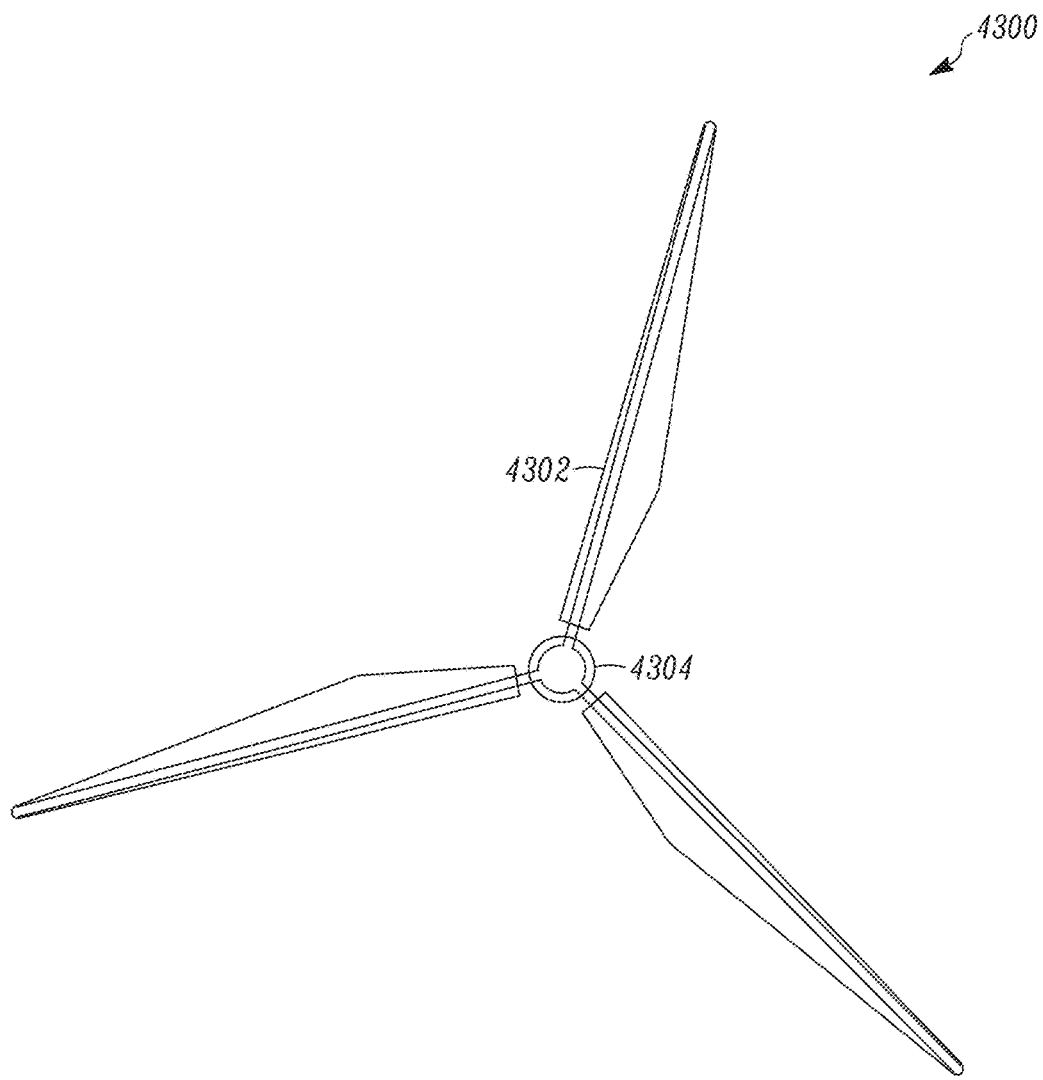
FIG. 43 depicts a 3 blade structure with mass control channel and central mass reservoir.

FIGS. 28-31 show embodiments relating to aspects of an inertial rotor as described herein, where FIG. 40 depicts a weighted structure initial position 4000, FIG. 41 depicts a weighted structure in a subsequent position 4100, FIG. 42 depicts a 3 blade structure in motion 4200, and FIG. 43 depicts a 3 blade structure 4300 with mass control channel 4302 and central mass reservoir 4304.

It may be advantageous to reduce the cost and weight of the structural support of an accelerating array. It may also be advantageous to reduce the assembly cost therein either through methods or specific mechanisms. It may also be advantageous to reduce lifetime component replacement costs through use of modular components. It may also be advantageous to have supporting structures that are only partially integrated with the array, serving only a structural support function for one or more nozzles. A number of methods for doing this are described including "fractal" space frames, methods of installation and maintenance, methods of supporting or suspending arrays, and the like.

Figure 44:
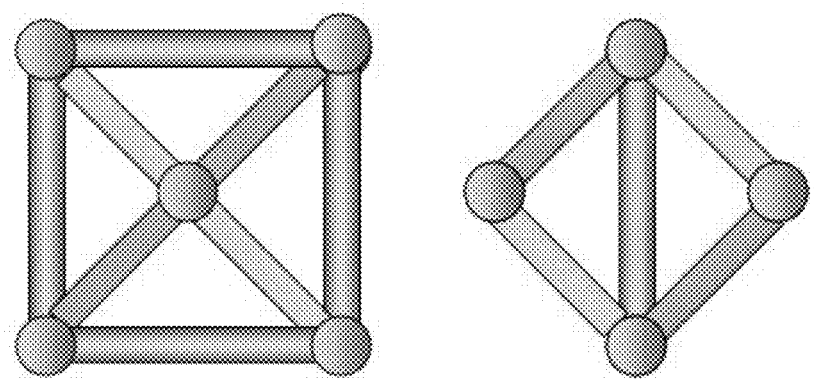
FIG. 44 depicts an embodiment of a fractal space frame.

In embodiments, the present invention may provide for structures utilizing fractal configurations. Referring to FIG. 44, a fractal space frame is depicted wherein the geometric structure of the space frame is repeated in the members of the space frame to the nth iteration. In embodiments, the smallest scale iteration or the nth iteration may be termed the base member, and the polyhedron that forms the basis of the nth iteration member may be termed the basis polyhedron. FIG. 44 shows an image of the top and side elevations of a basis octahedron.

A fractal space frame is a 3-dimensional fractal. A fractal space frame may use a regular, Reuleaux, Kepler-Poinsot, and like polyhedral structure, or a form incorporating multiple polygon types such as a zonohedron or a combination thereof and may be made of composites, metals, or other like materials that can be molded or fabricated. Fractal space frames may include classes of structural members that are in tension or compression or a combination thereof. They may include both uniform or regular structures, such as in a geodesic space frame the basis members could formed from triangular or some other polygonal variation of a truss, and non-uniform or irregular structures such as tensegrity structures. Structural variations that can be used for the basis member include but are not limited to structures such as bundled column structures, tensegrity structures, diagrid structures, all classes of truss structure, and the like.

Figure 45:
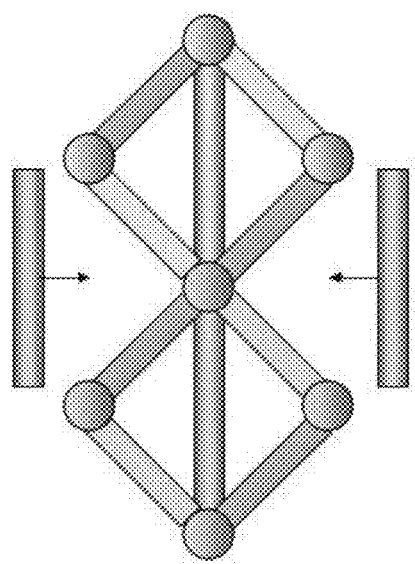
FIG. 45 depicts an embodiment of a configuration of a fractal space frame where the additional members may be added.

Referring to FIG. 45, to form and stabilize a member structure some vertices may be shared and additional members may be added to connect some vertices (side elevation image below). Generally the polyhedral type may match the characteristics of the element being supported by the space frame.

Members added to the polyhedra to construct the elongated member form may be added at the vertices forming the maximal circumference under rotation or at vertices within the maximal circumference, such as depending on the desired load bearing properties, orientation of the polyhedra under consideration, and the like.

"Fractal" space frames may be fabricated by a number of methods including molding, lay-up, filament winding, welding, assembly, and the like. In the case of a filament wound space frame polyhedra skeletons may be found in a base member. A different or the same method of manufacture or assembly may be used for the various iterative combinations of the space frame.

Figure 46:
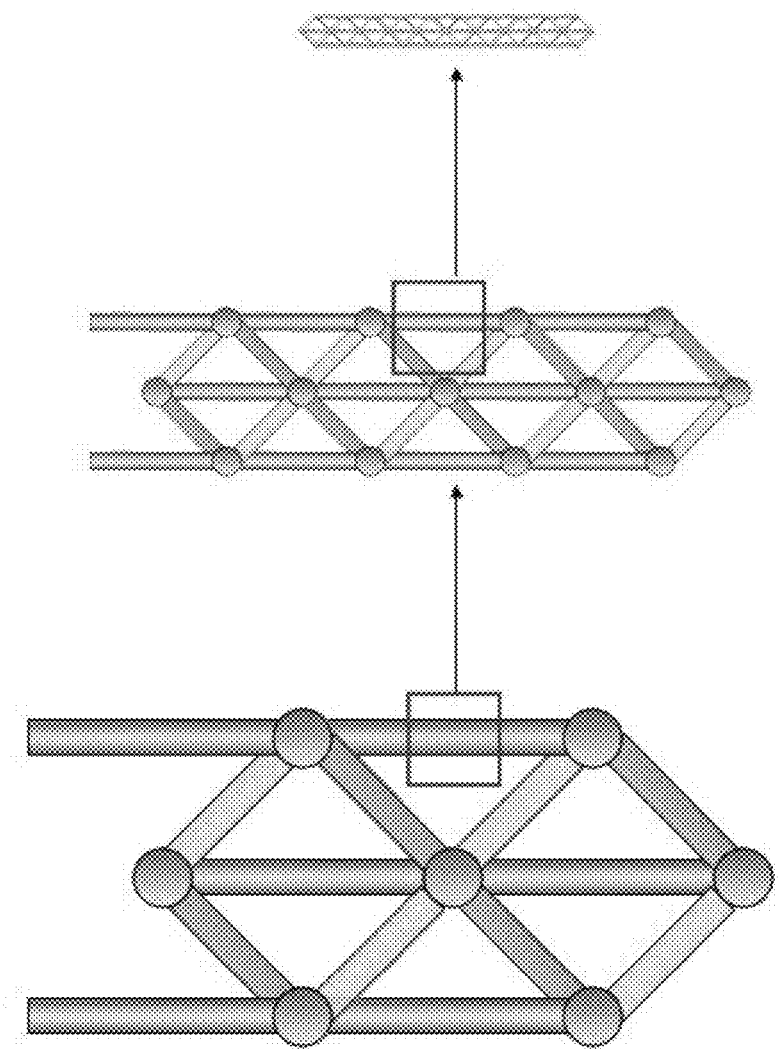
FIG. 46 depicts an embodiment of a 3 iteration octahedral space frame.

Referring to FIG. 46, the image shows a side elevation of a three iteration octahedral space frame wherein the space frame members may include the edges of a polyhedral series, where the space frame connectors are found at the vertices. Additional members in this case may be added at the maximal circumference.

The advantages of a "fractal" space frame may include low solidity relative to structural and loading capacity thereby reducing the cost and weight of the structure under consideration.

In embodiments, the global structure of the space frame may additionally be fractal based on local conditions. In this case the initial fractal iterations may be in the vertical or horizontal dimensions and adaptive to the local load bearing requirements based on the number of vertical or horizontal layers, and further iterations define the member components of the edges of the series polyhedral skeleton at the desired level of iteration.

It may be of benefit to have a method by which an array may be modularly constructed and maintained. A structure is described herein that may include an installation facility for both the supporting and producing components of an array where the facility may include a platform, a method of elevation, a method of placing components of the array, a method of removing components of the array, and the like.

Figure 47:
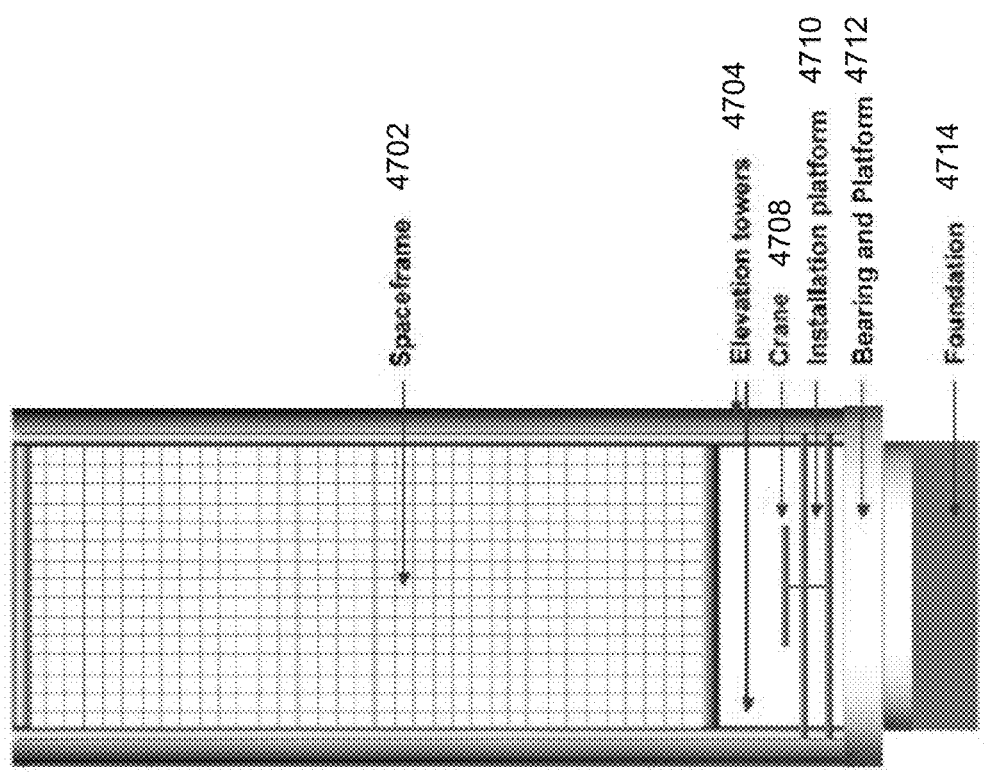
FIG. 47 depicts an embodiment of an accelerating array.
Figure 48B:
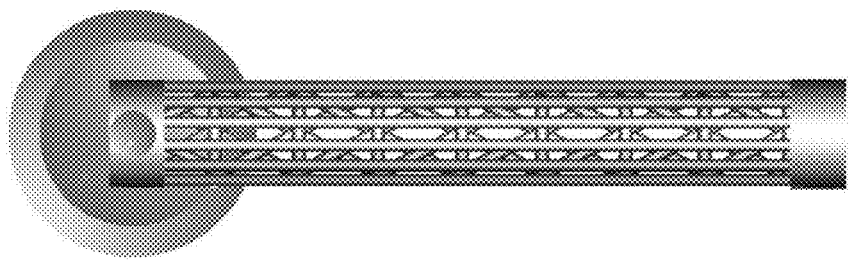
FIGS. 48A and 48B depict embodiments of structural members.
Figure 48A:

Referring to FIG. 47, the image shows an embodiment of an accelerating array, wherein the array is constructed and various components are installed by way of at least one installation platform, at least one installation crane, at least one exterior or interior method of elevating the same, and the like, including a spaceframe 4702, elevation towers 4704, a crane 4708, an installation platform 4710, a bearing and platform 4712, and a foundation 4714. FIGS. 48A and 48B show embodiments of a drive sheave structural member, in a front elevation FIG. 48A and side elevation FIG. 48B.

The bearing may additionally be modular. The bearing may have n modular elements that form the bearing as a whole wherein each element has an external or internal sliding element and may be removed and replaced in the case of failure or maintenance independently of the other elements. In case where the bearing is a sealed bearing the modularity may require an alignment and locking facility to replace the modular element. In the case where the bearing is not sealed a mechanism by which the localized load may be relieved from the modular element to facilitate removal may be necessary. The number of modules in the bearing may be determined by a solution that minimizes installation and assembly complexity and cost while allowing the removal a single module and the temporary redistribution of load on the remaining modules during the replacement operation.

Various methods of operation of achieving same are disclosed wherein the installation facility and associated facilities may utilize an elevation mechanism with more than one drive element integrated into the space frame, an elevation mechanism with more than one drive mechanism integrated into columns at the corners of the array, an elevation mechanism that has multiple drive elements integrated across the array, and the like.

Alternative methods of constructing an array of nozzles modularly or non-modularly are described. It may be advantageous to minimize the mass and materials use or weight of both the space frame and the nozzle components in an accelerating array. Methods of creating arrays and installing nozzles within single space frame, suspension, buoyant, and the like, or combinative structures are examined.

Figure 49:
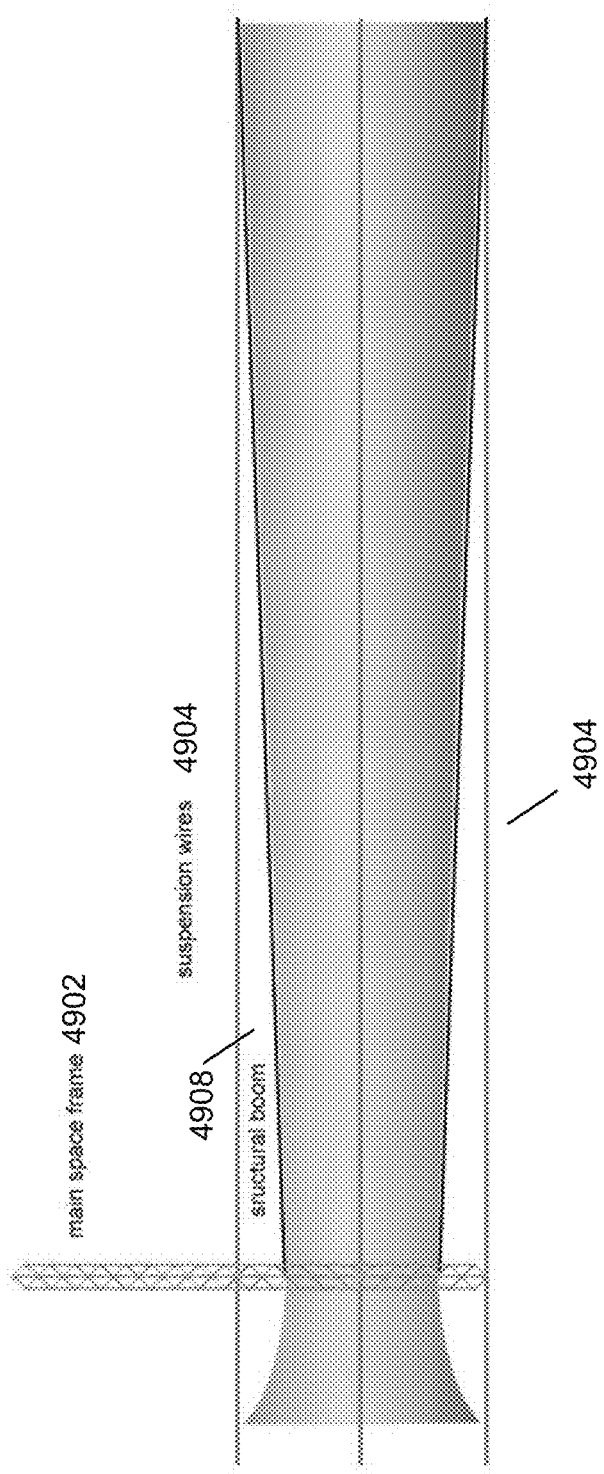
FIG. 49 depicts an embodiment of a single "mast" frame.

Referring to FIG. 49, one embodiment may be a single "mast" frame with a main space frame 4902, suspension wires or cables 4904, structural boom 4908, and the like, where a flexible nozzle material such as latex, coated fabric, and other like flexible materials. A non-flexible material, such as a thin wall molded co-polymer, may be secured to the throat and the polygonal vertices of the exit and/or entrance and/or a frame that may define the truncating polygon at least one of the exit and entrance. In embodiments, these may be installed in situ or manufactured separately for modular installation. The mast frame may be constructed from readily available members such as HSS or I-beam or the like as any class of framed construction such as staggered frame, bundled columns, diagrid, and the like, or may be a constructed of fractal elements mentioned above. The structure may be singular and uniform in depth and width or may be non-uniform such as I or H cross section or a more complex polygonal cross section that would include the various classes of beam cross sections that may be designed to maximize horizontal and vertical load resistance and minimize material use. A mast and boom structure may further utilize combinative tension structures for both the lateral and the mast support. The tension structures may be simple as in a tension frame or may have complex rigging in either the vertical or horizontal dimensions.

An example of such complex rigging might be where tension wires are supported by two perimeter columns and rigged in a diagrid pattern and then locked together at the nodes. The nodes may form the attachment point for the mast rigging which may attach locally on or near the same row as the nozzle mast insertion or non-locally at some optimal support angle to a node vertically or horizontally further from the nozzle mast being placed. Such complex tension rigging may allow structural optimization for the load bearing structure such that the horizontal and vertical forces effecting the structure are more distributed or are "focused" on or "deflected" to specific areas of the structure that are designed to absorb the combined load density.

Figure 50:
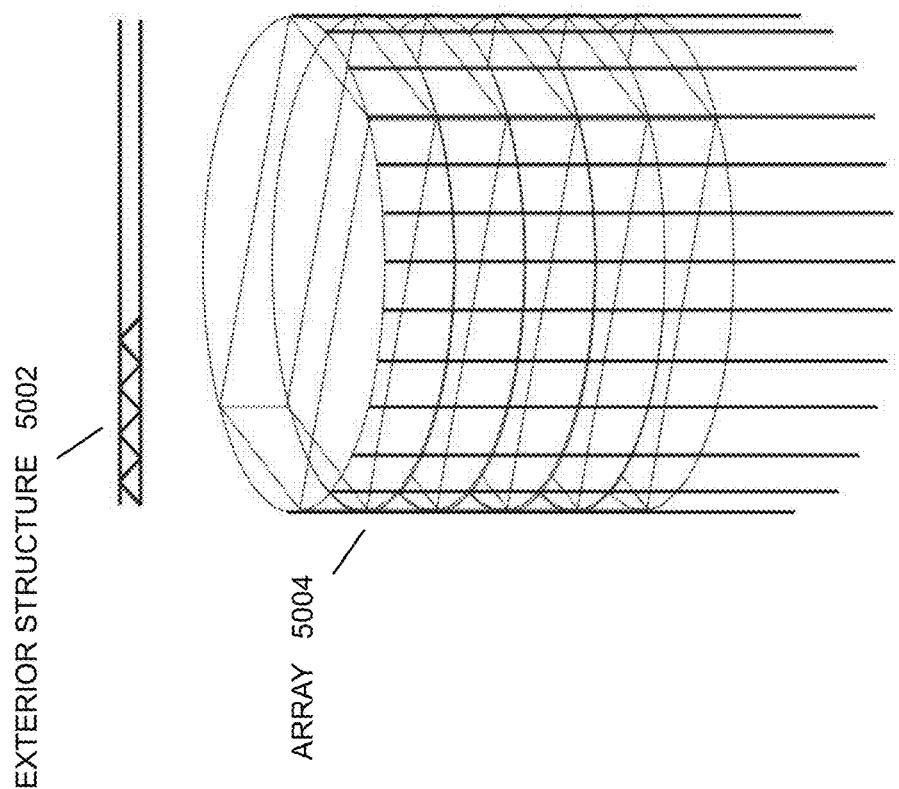
FIG. 50 depicts an embodiment of an array 5004 and a portion of an exterior structure.
Figure 51A:
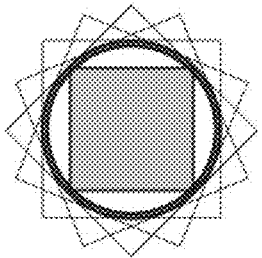
FIGS. 51A-51E depict exterior superstructures with polygonal variation.
Figure 51B:
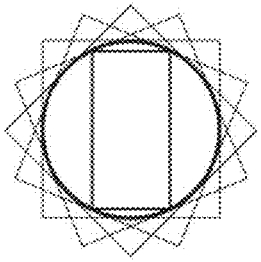
Figure 51C:
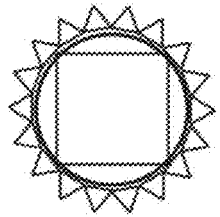
Figure 51D:
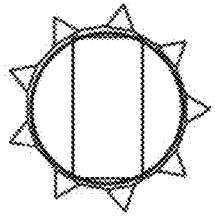
Figure 51E:
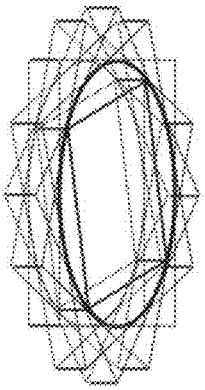

It may also be desirable to decompose the structure of an integrated array and superstructure to a non- or partially integrated array and superstructure wherein the superstructure may be exterior to the array and fixed on the exterior perimeter and the array may be supported by rotating internal structures that attach to the exterior structure through a bearing or bearing-like facility. FIG. 50 shows an embodiment of an array 5004 and a portion of exterior structure 5002. It may be advantageous to further decompose the structure to fixed interior and exterior columnar elements upon which a single nozzle or a row array or a row-column array of nozzles are similarly fixed on either or both the exterior column or the interior column by means of a bearing or bearing like facility. These bearing facilities in either may include a yaw system to assist the co-mounted array section to orient to the local flow direction.

Exterior superstructures may endow a number of advantages in terms of reduced torque experienced by the superstructure from variation in inflow vectors in the vertical plane, increased safety, less loading on individual bearing mechanisms, enhanced opportunity for load isolation, and the like. Exterior superstructures may also maximize the local and global load bearing properties of the superstructure for both horizontal and vertical loads by creating greater beam depth with respect to wind loading and greater diameter with regard to bearing loading.

Figure 52:
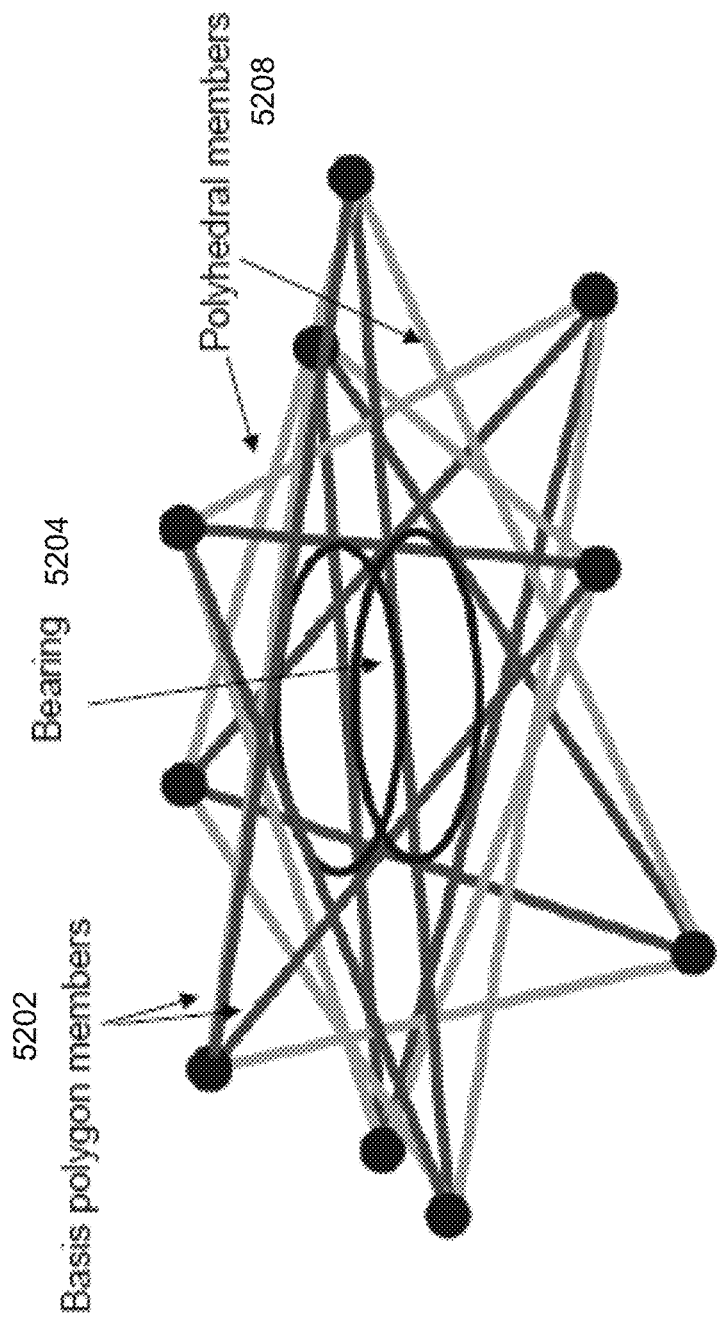
FIG. 52 depicts a structure with basis polygon and polyhedral members.
Figure 53:
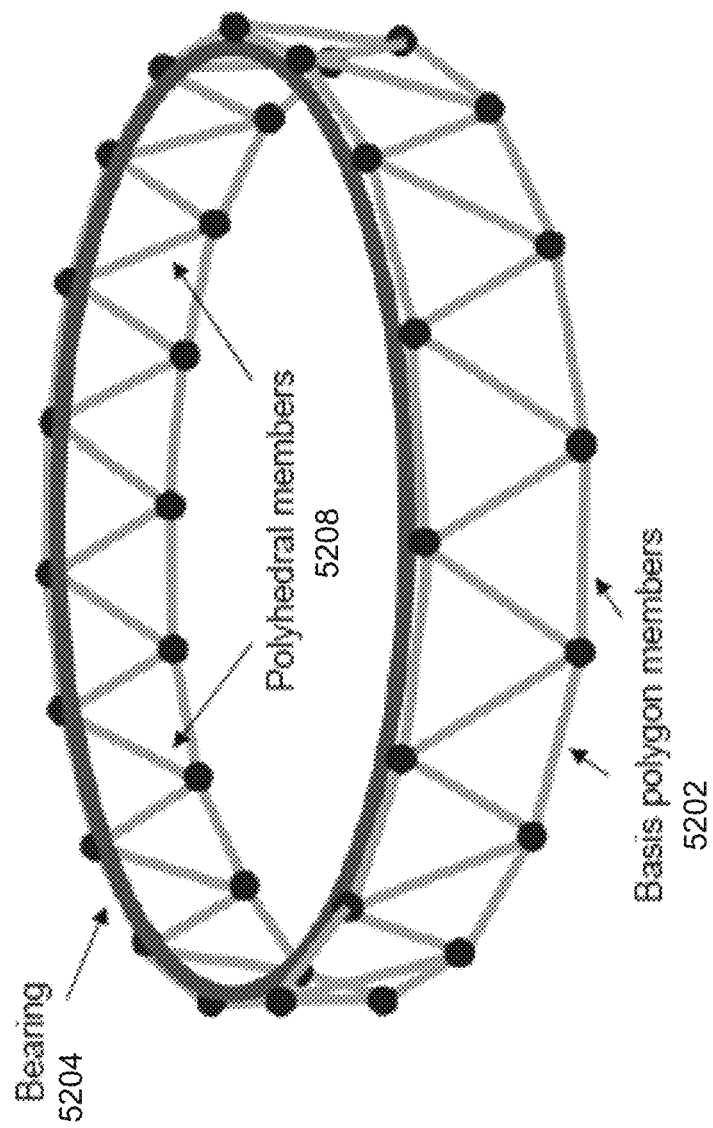
FIG. 53 depicts a structure with basis polygon and polyhedral members mounted with a bearing.

As illustrated in FIGS. 51A-51E, an exterior superstructure may be circular as in a space frame "tube" inclusive of rectangular, polygonal, or circular cross sections or may be more complex in its perimeter cross section. The exterior superstructure may involve a single layer on the structural perimeter or multiple layers on the outer or inner perimeter. The cross section may be n-pointed star polygon or any an n-sided regular or irregular polygonal structure of variable or uniform complexity that provides local and global load bearing advantages to the structure. The structure itself may be a single or multiple regular or irregular polyhedra wherein the constraint is that the interior of the polyhedra be uniform or roughly cylindrical. This would include all classes of regular, irregular, anit-prismatic, or prismatic polyhedra and the like with the types of cross sections mentioned above. FIG. 52 and FIG. 53 illustrate embodiments showing basis polygon members 5202 configured with polyhedral members 5206 mounted with the bearing 5204. The basis members of the frame connecting the vertices of the polyhedra may be placed to maximize the load bearing capabilities and minimize weight and density of the superstructure. The members may be a combination of compressive members or tension members. This may include geodesic variations, tensegrity variations, and the like. In addition to being optimized for load bearing the superstructure may also be constructed in such a way as to provide minimal flow resistance to the interior of the structure. This may include shaping or cladding the members or designing the structure such that the width and profile of the members is minimized. Such parameterization provides advantages both in terms of the yield of the interior array and in terms of reducing the wind load on the structure overall.

As in other iterations of the invention with regard to the superstructure and modular assembly of the array, in the case of the exterior structure, the properties of the structure may be designed in such a way as to allow easy extraction of a single module or multiple modules from an array within structure. As in other iterations this may be performed by an installation and maintenance facility constituted of an insertion and removal mechanism, an elevation mechanism, and the like.

An exterior superstructure may additionally be uniform or non-uniform in its geometric properties with regard to its dimensions in the vertical plane. Additionally the local polyhedra may be optimized for the specific load bearing properties of given level. For example, a 10-pointed polyhedra may be optimal at ½ the height of the structure whereas a 12-pointed polyhedra might be optimal at ¼ the height of the structure. Members may be limited to spanning a single polyhedral section or span multiple levels of the polyhedral sections.

An array of modules within an exterior superstructure may be mounted on the superstructure either as single or multiple row arrays. The row array/s may be attached to the superstructure by means of a bearing, a roller, or rail system, or by other means of mechanical or fluid induced rotation. The row array/s may be attached to the interior structure or the exterior or both by means of a mechanism of rotation. The mechanism of rotation may be roller drive and yaw system, a rail drive and yaw system, a slewing bearing and yaw system, a roller bearing and yaw system, a magnetic bearing and yaw system, a Teflon slide bearing and yaw system, and the like or a combination thereof. The row array/s may be attached to the rotation mechanism by means of single or multiple trusses or space frames in depth wise or horizontal or angular direction or a combination thereof, of tension wires in the depth-wise or horizontal or angular direction or a combination thereof, and the like or a combination of tension and compression members. The row array/s may be mounted within the support members, on the support members, below the support members, or above the support members. These members may attach to rotation mechanism within the same plane as the row array/s or exterior to the plane of the row array/s either in the upward or downward direction to provide additional load bearing capability.

The exterior superstructure may be constructed and manufactured or fabricated by means of and of the classes of materials described in previous iterations of the invention. In addition to the space frame members including members in both tension and compression the perimeter frame may include elements of tension and compression. This may include guy wires attaching the columnar structure of the perimeter to a counterbalance mechanism such as a piling foundation.

In embodiments, the present invention may provide for buoyant facilities, where the module may include a nozzle that may be formed of a flexible or rigid material, where the structural rigidity may be provided by method of internal pressure and a minimal shape skeleton or by the material itself or a combination thereof, and where the method of providing internal pressure to "inflate" the nozzle may be performed by thermal energy or pumping, such that the nozzle is comprised of a single or multiple bodies that contain a volume or volumes of fluid that can be used to achieve a buoyant condition. Buoyant nozzles may include all classes of nozzles described in this and previous iterations in the invention wherein the interior surface of the nozzles is one of the buoyant surfaces and the bounding polygon or circle or the like from which the nozzle geometry derives forms the other surface and the volume contained therein provides the buoyancy. The bounding geometry may be extended to curvatures greater than 0 to provide higher buoyancy for smaller nozzles wherein sufficient volume is not enclosed within the original geometry described above.

The method of inflation or pumping may be such that it provides buoyancy to the nozzle such that all or a portion of the dead load of the module is neutralized by the degree buoyancy. The medium of buoyancy may be air or other fluids that provide the buoyancy by decreasing the density of the fluid within the enclosed geometry through thermal input or it may be a fluid that has a naturally lower density such as hydrogen or helium or a combination of both methods. The nozzle may be formed of any material which will maintain the density balance between the interior and exterior fluids such as all classes of treated woven materials, all classes of flexible rubbers and polyurethanes and the like, all classes of rigid materials such as polymers or copolymers or syntactic foams or plastic foams, and the like. The nozzle body may include a single or multiple uni- or bi-directional valve mechanisms by which the density of the interior of the nozzle may be maintained at a given level and thermal control mechanism to achieve such an end. The nozzle body may include various methods of thermal input such as resistive components and the like that produce heat through as electrical charge or chemical reaction or may include gas contained in pressure vessels wherein a lighter than air gas is used to achieve buoyancy and the gas is released when the enclosed volume density exceeds a given level.

It may be advantageous in the case of a buoyant module to reduce the weight of any given component especially generators. The power producing components of the module may utilize generators which minimize weight to power ratios such as superconducting generators and the like. Similarly the structural elements of the nozzle such as the membrane and structural members that maintain the shape and support the internal components may be made of lightweight materials such as carbon fiber or aramid fibers and the like. The structural material may further be any of a class of rigid or flexible impregnated foams wherein the foam is impregnated with a gas that provides direct buoyancy to the structural elements of the module. These could include structural elements made of syntactic foams wherein the microspheres or any interior space/s are impregnated with hydrogen or helium or may include classes of foaming agents and polymers or copolymers wherein the foam is impregnated directly in the foaming process or after the foaming process is complete with a lighter than air gas.

Buoyant modules may be attached to a tether and thereby to an anchoring mechanism either singly or in arrays or may be attached to a superstructure. Arrays of buoyant nozzles may be attached to each other and a tethering mechanism by means of metallic or composite cables or a combination thereof and the like wherein the strength to cost ratio is optimized. Metallic or composite tethers may similarly be used to attach an array of buoyant modules to a superstructure such as those described above or in other iterations of the invention. The cable may additionally include an embedded or separate means of power transfer. A buoyant array may also include the means to adjust the elevation or orientation of the array to seek optimal power producing conditions.

Figure 54:
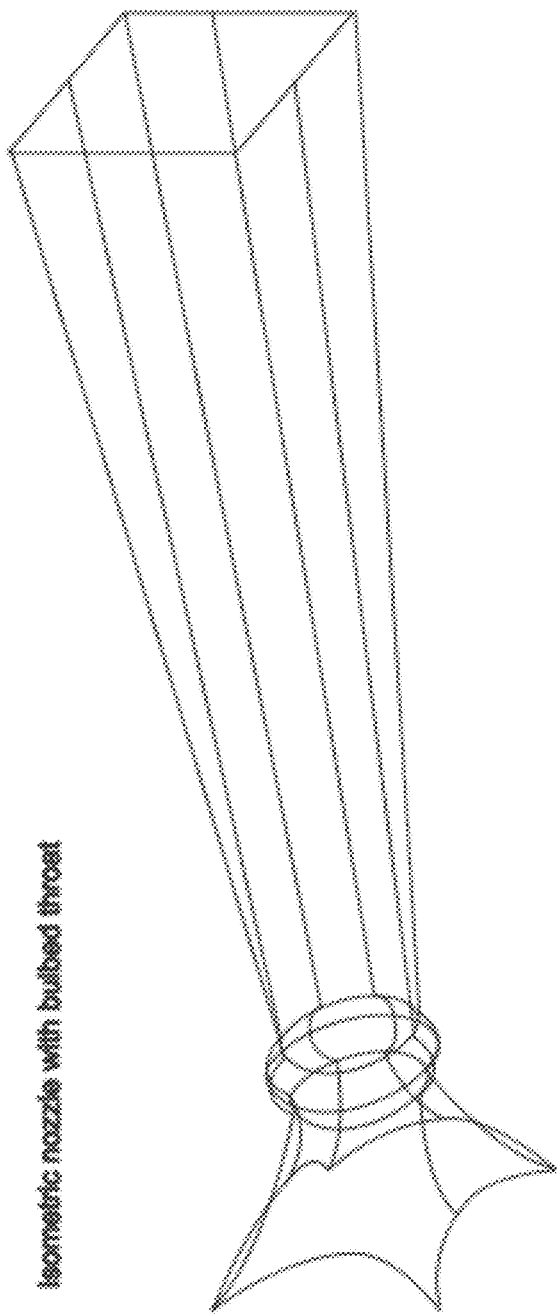
FIG. 54 depicts an isometric nozzle with bulbed throat.
Figure 55:
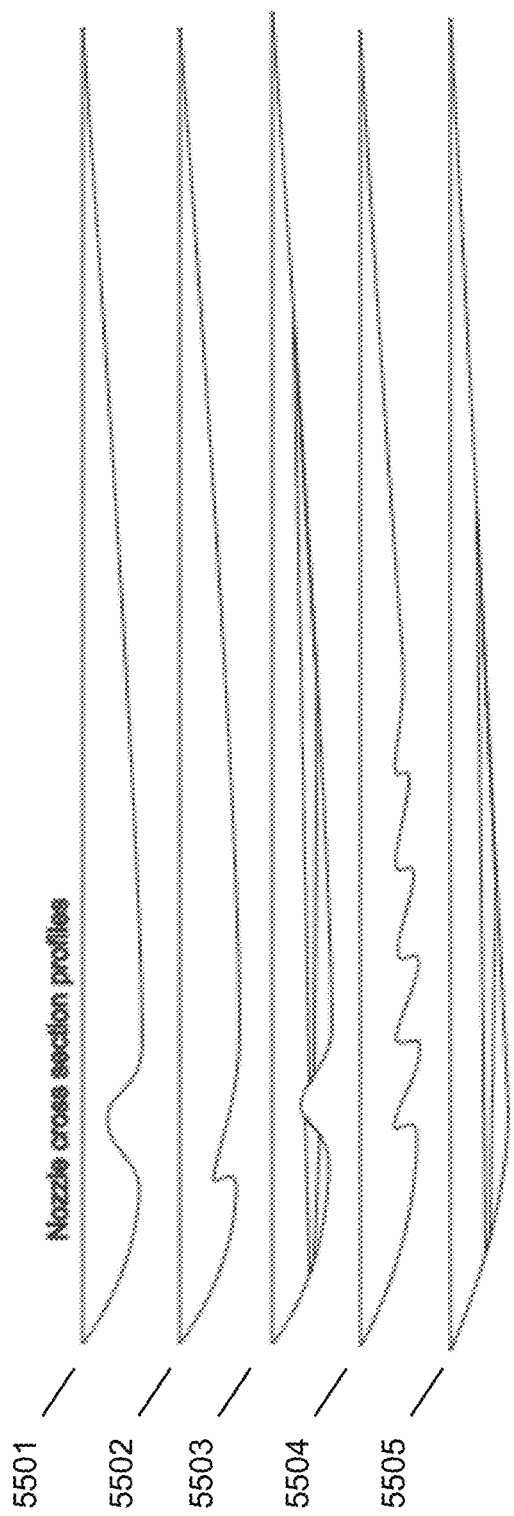
FIG. 55 depicts nozzle cross section profiles.
Figure 56:
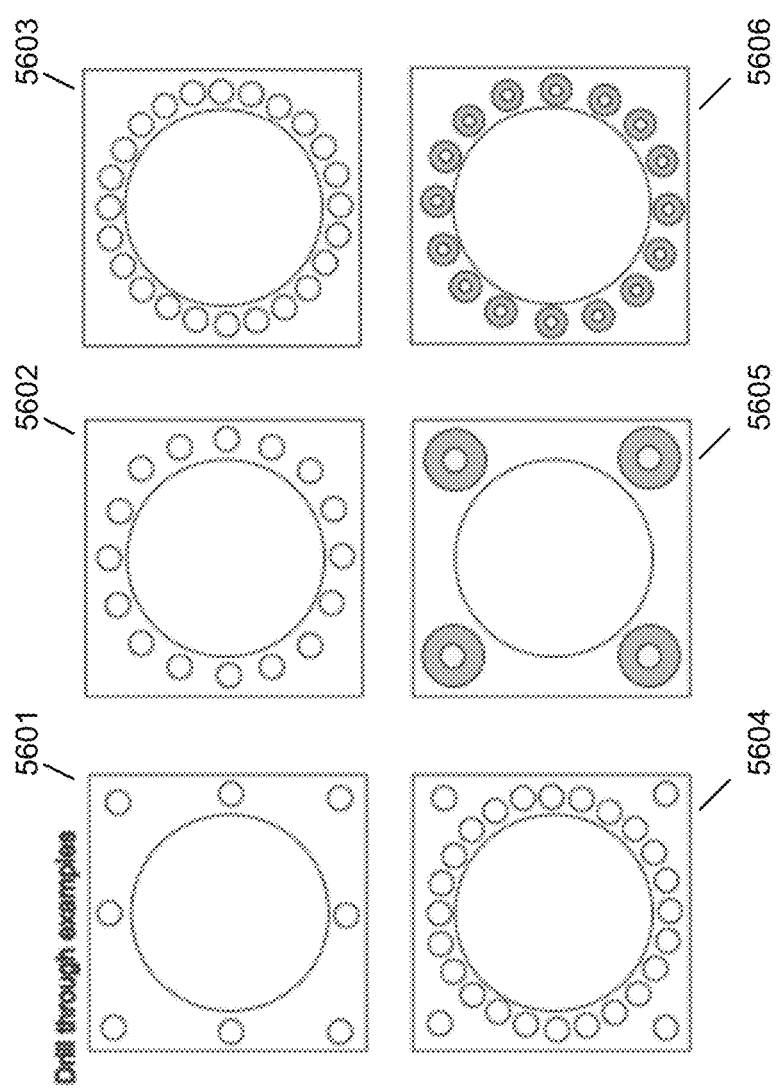
FIG. 56 depicts drill through examples.

Referring to FIG. 54, another embodiment may be a nozzle wherein the shape of the nozzle provides a release area or channel for over-density conditions that may be found in the nozzle. The release may take the form of a single or multiple vortex or swirl mechanism/s, bulbous feature/s, drill through mechanism/s, and the like or a combination thereof. Bulbous features may include macro and micro uniform or non-uniform features such as an annular inverted semi-ring or rings around the rotor wherein the depth of the ring/s is formed smoothly or acutely from areas forward and rearward of the throat, or a weighted annular semi-ring wherein the area of maximum depth is forward or rearward of the central diameter of the ring/s, or a continuous or non-continuous annular semi-ring/s, or the like. FIG. 55 shows examples of nozzle cross section profiles 5501-5505. Drill through features may include uniform or non-uniform drill through in the flow-wise direction, in an angular or spiral configuration, densely or sparsely packed drill through mechanisms, uniform or non-uniform placement in the direction orthogonal to the flow, mechanisms placed in the forward and/or rearward sections of the nozzle, circular arrangements or polygonal arrangements or random arrangements, and the like or a combination thereof. FIG. 56 shows examples of drill through patterns 5601-5606. In the case of non-uniform drill through the rearward portion of the drill through may be expanded as in a diffuser to assist clearance of over-density conditions at or around the inlet of the drill through. This may be utilized in both the intake and exit regions of the nozzle in the case where an annular "relief" ring is present or may be utilized from the intake to the exit in the case where an annular ring is not present or a combination thereof dependent on the local topographical features as in a non-contiguous annular feature. As in previous embodiments these features may be applied to uniform or non-uniform scalloped nozzle wall topography. Another embodiment may be the use of uniformly or non-uniformly 3-dimensionally tessellated surfaces in flexible or non-flexible materials to enhance flow or structural properties of the nozzles.

It may also be desirable that the least expensive materials and/or methods of fabrication or manufacture be considered in production of optimized space frames or nozzles.

Another embodiment may be where the nozzles mentioned above are mounted into contiguous n×m arrays, where n is greater than 2, within a superstructure or a buoyant array as in previous iterations of the invention. Additionally this may include other types of nozzles or accelerators such as wide-angle uniform and non-uniform nozzles. This may include the classes of nozzles known as diffuser augmented turbines or super-venturis or nested nozzles and the like. These nozzle types may be fit into a superstructure in substantially the same way as previously described, e.g. mounted at the perimeter or onto a central support member or onto a tension member such as a wire or a combination thereof and the like. Additionally in the case of the diffuser augmented turbine or other types of non-uniform nozzles this may require additional components or shapes forward of or around the inlet to reduce the effect wind pressure on the diffuser and thereby the array. It may be desirable to have such mechanism to reduce wind pressure coefficients or the expense of the superstructure or anchoring mechanism in the case buoyant iteration may be such that the technology becomes non-viable.

Another embodiment may be an array where a square truncation of the nozzles described above or nozzles described in previous iterations may be rotated 45 degrees to form a diamond array or diagrid wherein the angles forming the diamond may be uniform or non-uniform. The diamond array may have the advantage of tangential structural support similar to a geodesic space frame while allowing a square truncation and increased nozzle packing.

In embodiments, rotor profiles may be optimized for accelerating nozzle throat conditions. It may be desirable in accelerating arrays to utilize rotors that are optimized for high-speed rotation or high-torque conversion. Wind turbine rotors may operate in instantaneous dual flow conditions. One flow may be the inflow that drives the rotor and the other may be the crossflow over the blade as it describes its period of rotation.

Rotors used in wind turbines may be based on airfoil profiles used for subsonic aircraft. An aircraft profile may operate in an environment where the wing may encounter flow from many vectors and the instantaneous operating environment is a uni-flow type. This may be useful for normal HAWT type machines as the instantaneous inflow might be from a variety of vectors due to turbulence or as the inflow constantly shifts direction and the machine orients to it.

Conversely a rotor in the throat of an accelerating nozzle may operate in dual flow condition but the inflow vectors may be stabilized along a single path. With regard to rotor profiles this may mean a different type of profile may be possible that would reduce aerodynamic losses and increase the velocities at which the rotor can effectively operate and produce power. This would be especially true as the circumferential velocity of the blade tips approach or enter the low sonic regimen.

Profiles that reduce interaction of the cross-flow with the inflow on the upper side of the blade may be necessary to allow high speed operation with minimized flow disturbance. Most research is limited to wind tunnel flow over an aerofoil designed to optimize flow properties at various angles of attack. Given a typical aerofoil profile pitched to maximize imparted momentum from the inflow and at an angle of attack relative to the axially encountered fluid the boundary layer on the upper surface of the profile may be usually thickened or detached. This may create substantial interference between the inflow and the cross-flow such that some momentum may be deflected from interaction with the blade or in cases of higher RPM reflected back against a portion of the inflow, thereby reducing its efficiency in converting inflow momentum to axial velocity for a particular blade and disturbing overall properties of the inflow with regard to the rotor as a whole.

Given the single inflow vector found at the throat of a nozzle, the profiles used in this environment may no longer need to be optimized for various angles of attack as are the existing classes of profiles. The parameter by which they may be optimized in this environment may be to reduce the mass flow disturbance over the upper portion of the blade, better attach the upper and lower boundary layers, create vortex cycling on the lower portion of the blade to counteract drag, minimize the lower portion of the blade's interaction with the flow or manipulate such interaction, and the like, or a combination thereof. It may therefore be beneficial to design profiles that manipulate the local flow properties such that inflow interaction with the blade is maximized and the axial interaction of the inflow and the crossflow is minimized so that the effect of each blade's passage on the rotor as a whole may also be minimized. This may lead to rotor profiles that are very different from extant airfoils as the flow conditions they are operating in both in terms of a single inflow vector and the in and crossflow environment are very different.

Blades optimized for this environment may include either or both upper and lower surface vortex or density manipulation mechanisms at either or both macro and micro scale. The blades may be a body or sheet profile and may include variable quadric surface geometry to reduce disturbance in the flow. These mechanisms may be variably adapted along the body of the blade to optimize local performance at a specific axial velocity or flow condition.

Figure 57:
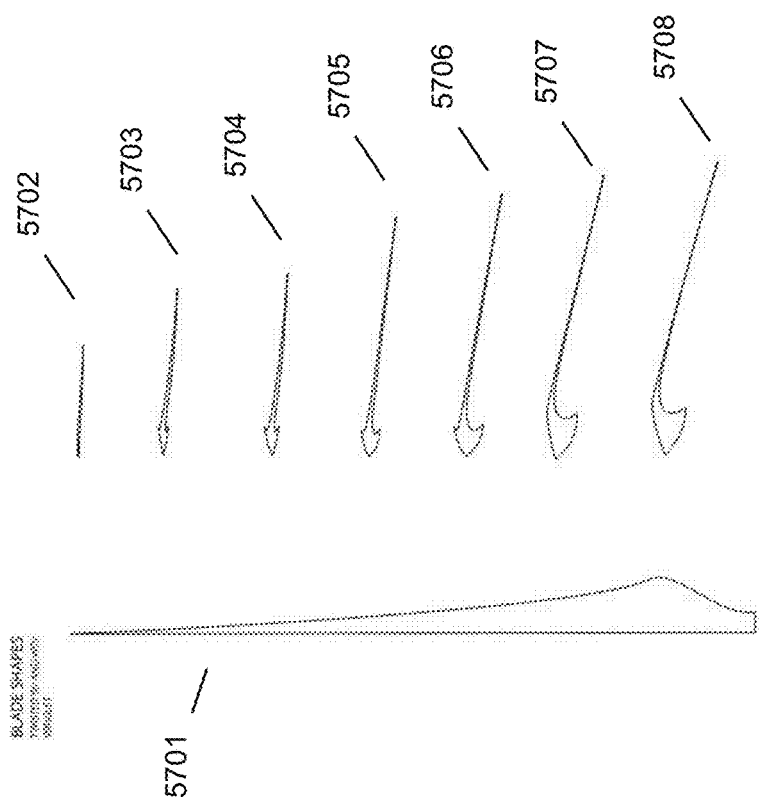
FIG. 57 depicts example blade shapes.
Figure 58:
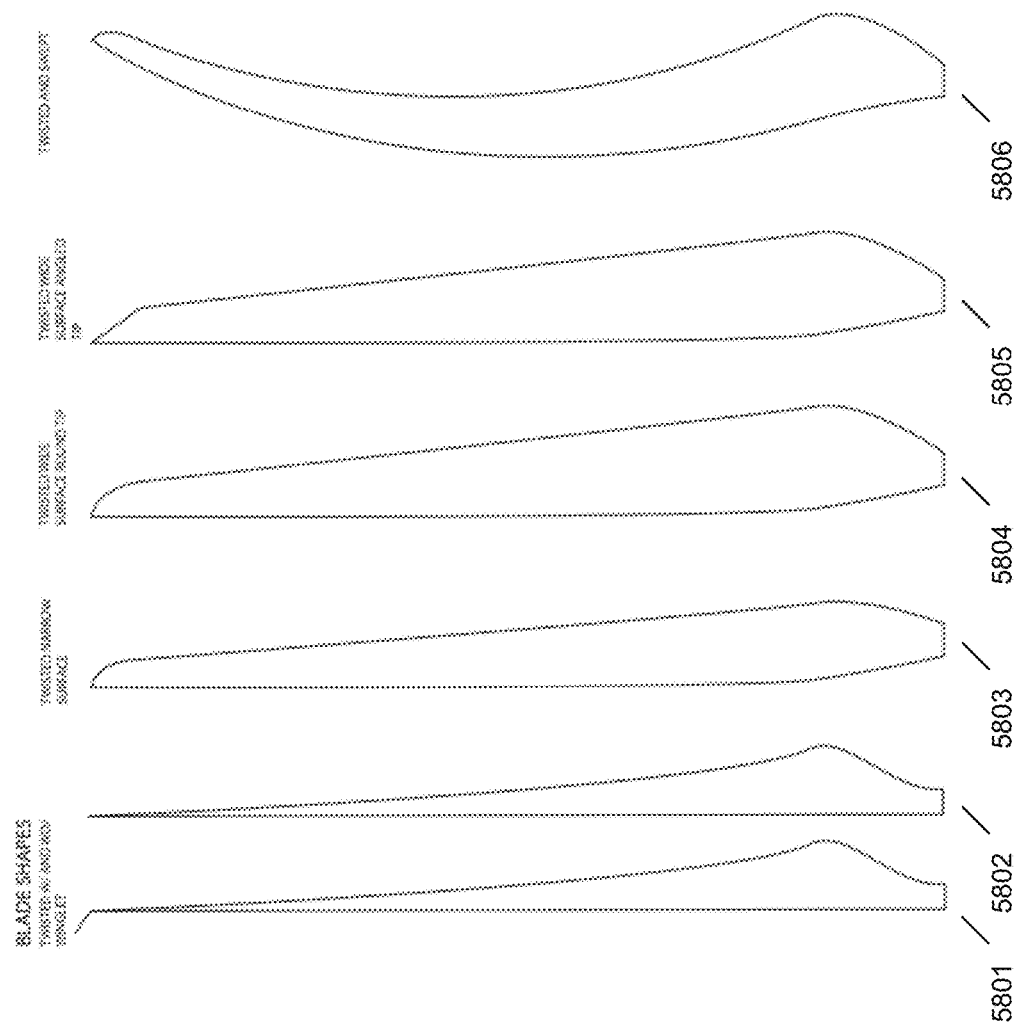
FIG. 58 depicts example blade shapes.
Figure 59:
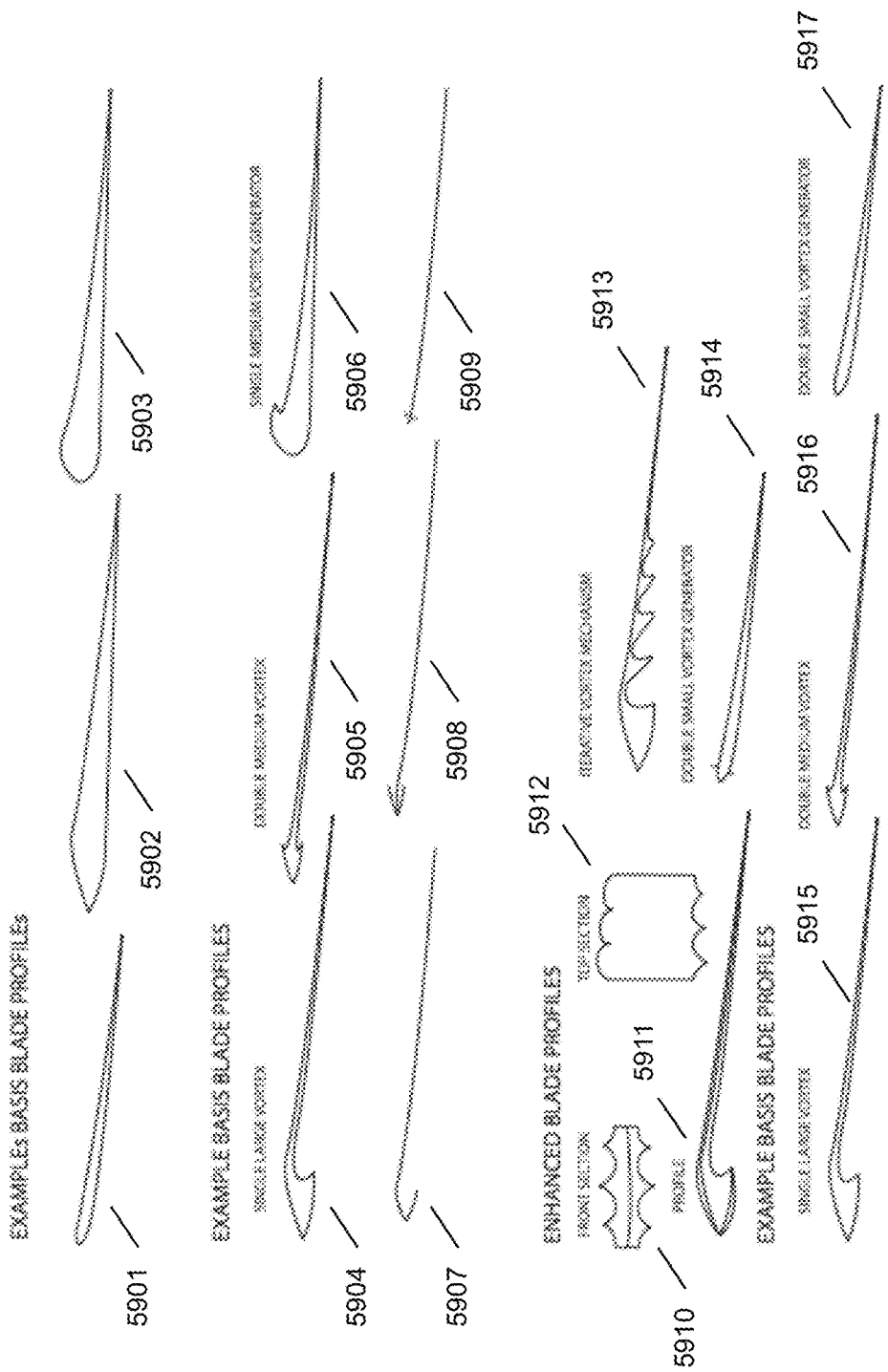
FIG. 59 depicts example blade shapes.

For example, a "wide" vortex generation mechanism may be used to reduce flow opposition on the underside of the blade toward the root of the blade where in a twisted embodiment the angle of the blade may be the most acute and the axial velocity of the blade may be lower or near to the inflow velocity causing minimal axial disturbance or flow separation on the upper portion of the blade to act against the inflow such that the inflow itself may serve as a boundary control mechanism. Moving along the blade where the axial velocity is increasing the blade angle may vary to present a less acute angle to the flow, approaching a presented angle of 0 near the tip where the axial velocity is at its greatest value. As the angle presented to the axial fluid decreases in may be beneficial to shift from a single "wide" vortex generation mechanism to a double "narrow" vortex generation mechanism as the axial velocity increases. These micro and macro scale vortex generation mechanisms may be used in combination wherein the intervening profile geometry is interpolated for two or a plurality of bounding conditions. The bounding conditions may represent the physical extremum of the blade or arbitrarily bounded sections of the blade. These mechanisms may be independently or combinatively utilized wherein a "large" scale vortex generation feature used to create globally desirable density conditions may include a "small" scale generation mechanism to control the local flow properties associated with the larger mechanism. FIG. 57 shows examples of such blade shapes 5701-5708. FIG. 58 shows examples of blade shapes, including twisted with a winglet 5801, twisted without a winglet 5802, with a twisted narrow surface 5803, with a twisted wide surface round tip 5804, with a twisted wide surface angled tip 5805, and twisted and swept 5806. FIG. 59 shows additional blade profiles 5901-5917, including a single large vortex 5904, double medium vortex 5905, single medium vortex generator 5906, interactive vortex mechanism 5913, double small vortex generator 5914, single large vortex, double medium vortex, and double small vortex generator 5917.

An optimal "wide" vortex generation mechanism might be designed such that it effects the global flow over the blade and may create areas of low density characterized by vortex or swirl properties. The vortex or swirl created rearward of the mechanism may additionally impart some added degree of momentum to the blade in the axial direction as it would be optimal for the rotation of the vorticity or swirl to be tripped in the direction of the axial motion of the blade. A "wide" mechanism might have a variable interior surface either applied globally or locally to access and/or enhance this effect. A blade might have iterative "wide" vortex mechanisms along a single or plurality of surfaces. The "wide" mechanism or mechanisms may be further enhanced by the placement of vortex mechanisms along the relevant surface to enhance the mass throughput to the central volume affected by the mechanism.

Facilities to the reduce interaction on the upper surface of the blade and drag on the lower surface may include vortex generators, uniform or non-uniform three dimensional surface tessellation, uniform or non-uniform flow-wise vortex edges or edge tessellations, and the like, or a combination thereof.

Specific pitch angles along the blade, degree of sweep and twist, tip vortex control, and the like, or combinations thereof may also be utilized in combination with the aforementioned facilities to optimize rotor operation.

It may also be desirable that inexpensive materials and/or methods of fabrication or manufacture may be considered in production of optimized surfaces and profiles, as described herein.

In embodiments, the present invention may provide for rotor/load optimization. Methods for dual speed control of rotor and generator may reduce rotor angular velocity and thereby reduce aerodynamic losses in fluid energy conversion.

In normal HAWT type wind machines it may be desirable to increase the rpm of the generator relative to the rpm of the blade to maximize power production. This is usually achieved through use of a transmission.

In accelerating arrays it may sometime be desirable to reduce the angular velocity of the rotor due to the increased velocity and thereby rotor angular velocity at the throat. It has been found that circumferential velocity of rotors in accelerating nozzles may approach lower sonic conditions at the higher inflow velocity ranges in conditions where the applied resistive load is optimized for power production. This may present a limiting factor to the function of an accelerating array.

By utilizing electrical and mechanical loading in the form of power electronics and/or a transmission facility, the rotor angular velocity may be stabilized in an optimal range for both reduction of aerodynamic losses in extraction of energy from the flow and optimization generator rotor speed for power conversion.

In an embodiment a continuously variable transmission may be used to increase the mechanical load on the rotor in order to slow the rotor's angular velocity to a range where the circumferential speed is reduced below the low sonic regimen. At lower regimens the applied mechanical load might be reduced or reduced to zero to maintain an optimal rotor and generator rpm.

In another embodiment the applied load may be electrical.

In another embodiment the applied load may be an optimized combination or electrical and mechanical loading.

Additionally it may be desirable to optimize the power transfer and/or power control networks by use of algorithms that minimize connections or resistance through connection types within the network topography or maximize local intra-machine conditions for power production. These algorithms may include combinatorial techniques, dynamic programming techniques, evolutionary approaches, and the like.

In embodiments, the present invention may provide for optimization of cost/yield, where methods for global and specific optimization of cost yield parameters may produce lowest COE within technological parameters.

The method of optimizing the cost to yield relationship at the global level may involve assigning variables to each component in an accelerating array based on the cost of a component and its sub-components and/or basis materials, yield or loss contribution of a component, structural parameter of a component as it relates to load bearing, structural parameter of a component as it relates to contributory mass of a component to local and global load parameters, cost of manufacture a component inclusive of sub-components, cost of assembly of a component, cost of installation of a component, cost of maintenance of a component, contribution of a component to maintenance on other components and the lifetime cost of a machine, and the like. This analysis may also be applied to each component and it sub-components and basis materials and manufacturing methods if an initial level of specific optimization was desired.

These analysis also may include the efficiency to cost parameters of the underlying technologies such as the accelerating nozzle geometry.

Each set of component variables may then be run through its set of potential parameters based on the technologies or methods that can be applied in the given component area. In embodiments, the solution set that provides the minimal COE value for the formula, COE=Annual All in Cost/Annual Yield, may be considered to be the optimal solution given the currently applicable set of input variables.

For example, the lowest cost material for the supporting space frame of an accelerating array may be fiber reinforce plastic (FRP) but given the size of the structural members necessary for local load bearing properties the amount of material used might contribute significantly to the loading parameters at each subsequent vertical level of the array necessitating the use of larger structural members capable of bearing a higher load. This in turn may necessitate the use of more material thereby increasing the dead and live loads of the machine both locally and globally and increasing the cost of bearings, installation, maintenance, levelized cost of replacement, and the like, due to increased stress based on the increase loading parameters.

While FRP might be the most cost effective on a per unit basis it may be more cost effective to use a more expensive material that engenders a lesser increase in the global and local structural properties of the array, such as a carbon fiber composite. Conversely if it was found that the cost of manufacture for an FRP component may be significantly lower than the cost of manufacture for a carbon composite member, it may be the case that FRP may be indeed lower cost on both a per unit and overall basis and FRP would be indicated to be optimal. If however such were the case for initial cost, but it was found then that the increased load resulted in the need to replace the bearing and yaw motors on an accelerated basis it might be found that while initially more cost effective FRP might make a significant contribution to the lifetime cost of the machine and would again be considered non-optimal.

As another example, yield ratings of wind machines may be set at some upper limit of extraction which in turn may define the rating of the generator used to convert the kinetic energy to electrical power. This rating may be based on a maximum inflow speed usually between 12 and 13 m/s. Generally speaking the distribution of velocities in this range may be low, such as below 5%. In this case if only 5% of annual power output derived in the range between the maximum rating and 90% of the maximal rating, and the additional 10% of power rating contributes a cost of weight and rating that exceeds the 5% of annual power derived in the range then using a generator with a lower rating and sacrificing the extra power may be considered optimal. This could also include deliberately rating the generator at the lower level and allowing operation for a certain percentage of the time at the higher rating if it was found that such operation did not contribute significantly to higher lifetime replacement costs relative to the higher yield achieved by such operation.

Additional factors in calculating an optimal cost/yield combination for a modular system may include calculation of likely improvement rate of the technology under consideration. Also considered may be the longer term effect of material and component supply availability and its projected effect on cost.

It may be desirable to optimize an energy producing machine as described in the invention based on a simultaneous optimization of yield and cost. Since the interdependencies may be complex between components having a yield and cost parameter and those that are strictly cost driven, a simple independently analyzed lowest cost and highest yield solution may not produce an optimal balance between cost and yield with regard to the final cost per unit power produced. Additionally for certain applications yield or energy density may be determined to be of greater importance and therefore the method of optimization may include additional complexities beyond the interdependencies of cost and yield.

The purpose of the optimization may be to better inform the design of a given machine for a particular location or application or the design of machine classes across application or location parameterized sets. Due to level of interdependency a recursive or partially-recursive optimization may produce the best results. Other methods may be used to achieve the optimal result inclusive of deterministic and non-deterministic, genetic, decomposition, approximation, gradient-based, evolutionary, matrix, fuzzy, stochastic, empirical, statistical methods, and the like or a combination thereof.

In the method described below a recursive tiered matrix representation is used but the parameters of optimization may be applied with the broader range of methods.

In the case, the permutations of possible design solutions may be applied wherein the permutations are identified in an n dimensional optimization matrix wherein the dimensional number of the matrix may be determined by the number of optimization parameters under consideration. The desired result may be that each matrix value may represent a weighted cost per unit of power produced for a given design implementation that captures all cost, yield, and other parameters effecting the system.

For example, the ith and jth design of an optimization matrix may capture all the cost parameters of the particular implementation, the yield of the particular implementation, and weighting ratios pertaining to the value of either parameter based on its importance for a given machine application. This may be because there may be applications wherein energy density or some other parameter is considered to be wholly or partially more important than the cost of energy from the system. This structure may best accommodate variations within applications.

It may be desirable to have n optimization sub-matrices wherein each matrix may be assigned a tier level based on its dependencies that contribute to the ith, jth cell of the primary optimization matrix wherein a given matrix value may be assigned from an nth optimization matrix that analyses a contained subset of optimization parameters. Sub-matrices may be internally supplied with variables or may be internally and externally supplied with variables from other matrices. An example may be the input result of a module power optimization matrix which may in cases be internally supplied with power producing component variables but externally supplied with global height, width, and depth characteristics that may substantially contribute to the decision structure of optimization. Such a matrix may also contribute to other primary matrix variables such as cost or weight or LRC. The basis for the optimization matrices may be component cost or global cost models that allow the modeling of various parameters affecting the cost of a given design. Such matrices may include the basis and derivative costs as well as any formulas and equations that are contributory to calculating the basis and derivative costs. The optimal solutions may be found by convergence of sub-matrices in the case where matrices are constructed for all affecting variables or by maxima-minima analysis of the global n-dimensional matrix. Such a matrix or a base case may also be used initially to identify desirable design parameters or conditions by which better design optimization may be achieved. This process may be recursive. Granular recursion may also be used wherein a boundary condition may be used to identify regions of the optimization matrix that fit a defined range of conditions and wherein a higher resolution of the contributory variables may be used than the original resolution of the matrix and may be useful to identify the precise parameters of optimization if those parameters fell between the step size of the original matrix. Random-walk matrices may also be utilized wherein once the parameters have been accurately characterized the matrix may be populated by random variation to test whether the original base case parameters constrained the optimization to potentially non-optimal configuration due to basis assumptions that may not have captured all of the optimization relationships.

Figure 60:
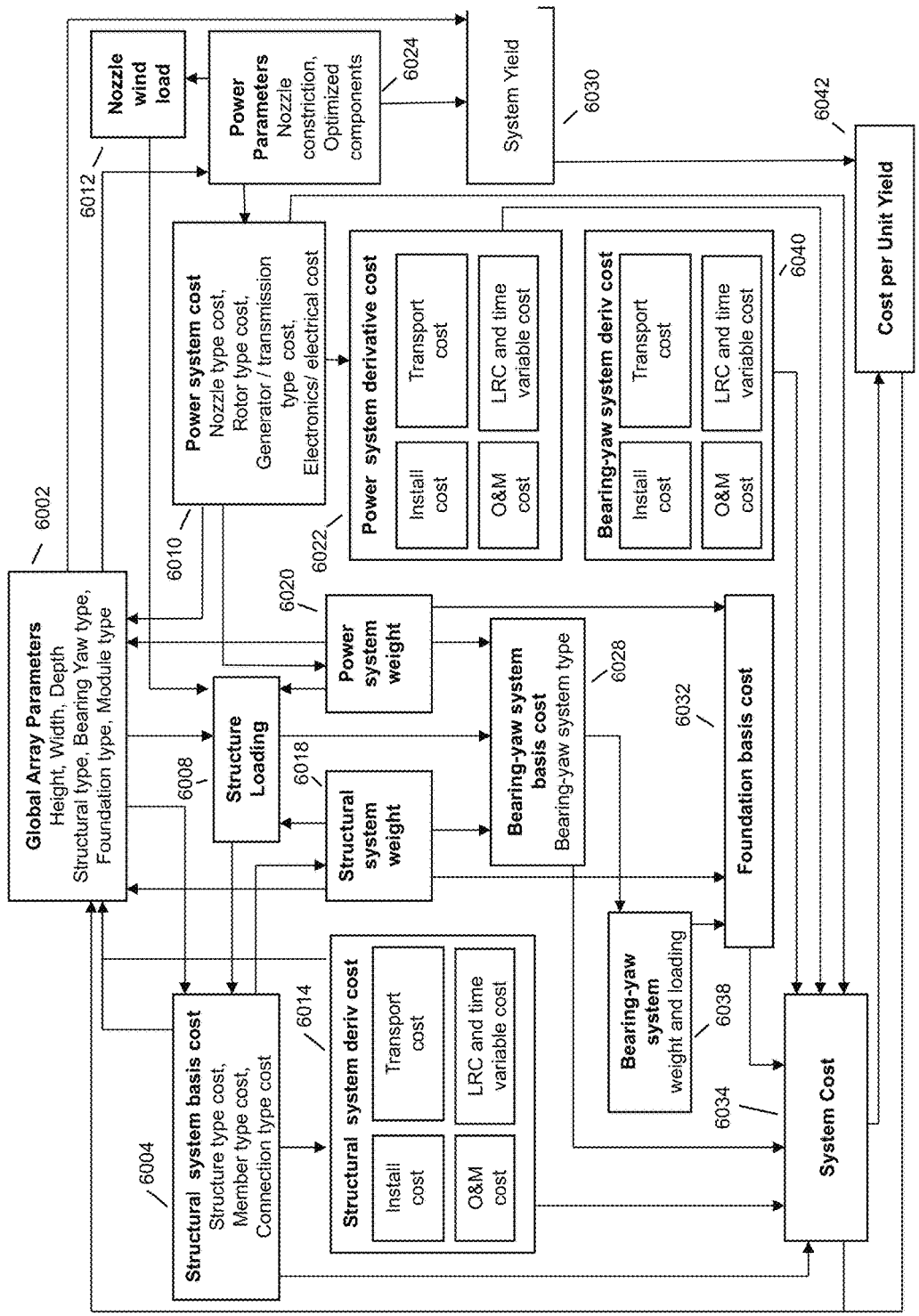
FIG. 60 depicts a cost-yield optimization flow chart, in an embodiment of the present invention.

Each component of the array may contribute to the global cost of the machine in a multiplicity of ways. First may be the basis cost of the component. Second may be the derivative costs of the component which may have an effect on the cost of other components of the machine. The flow chart shown in FIG. 60 details a base set of variables and the respective interdependencies that may be applied to the optimization matrix, including the global array parameters 6002, structural system basis cost 6004, structural loading 6008, power system cost 6010, nozzle wind load 6012, structural system derivative cost 6014, structural system weight 6018, power system weight 6020, power system derivative cost 6022, power parameters 6024, bearing-yaw system basis cost 6028, system yield 6030, foundation basis cost 6032, system cost 6034, bearing-yaw system 6038, bearing-yaw system derivative cost 6040, and cost unit yield 6042. As can be seen in the flow chart, recursive loops may be global or granular to optimize particular sub-systems of the machine and sequentially or non-sequentially the global characteristics of the machine.

With regard to basis and derivative cost and recursion, the basis cost may be directly derived from the assignment of a "type". Derivative cost may be indirectly determined by the effect the "type" assignment has on other elements of the system and thereby on the lifetime costs of the machine.

For example, the choice to use a particular copolymer for fabrication of the nozzle may have both basis costs and derivative costs. The basis costs in the case of the nozzle may be the cost of material, the cost of fabrication, and the cost of assembly. The derivative costs may be the cost of weight as it relates to the superstructure and substructure, the cost of weight and geometry as it relates to transport, the cost of geometry as it relates to manufacture, the cost of environmental degradation as it relates to failure and thereby LRC, and the cost of installation. In this case copolymer A may present the lowest cost of material and fabrication relative to copolymer B. Copolymer A may however contribute more to the weight, LRC, transport, and installation cost than copolymer B. In the case where Copolymer A's basis and derivative costs exceed copolymer B's basis and derivative costs then copolymer B is more optimal on a cost basis than copolymer A despite the lesser basis cost of copolymer A.

Sometimes the relationship between the basis and derivative costs may be simple as in the case above or complex. Additionally it may be found that optimized cost solutions may vary dependent on machine siting or on timeframe variability of the basis cost. These additional parameters may be included in a cost optimization derived from a particular site's characteristics or from a given basis cost variability measured over a given timeframe. The variables may include values for availability, market stability, demand and supply variation, and the like. Additionally the basis cost may include stability of supply as a variable. These values may be considered directly as variables in component cost or yield models or as coefficients applied to basis variables.

One example of representing the cost per unit power produced directly using matrix tiers may be, Ith, jth cost per unit power produced=((((cost of superstructure type+cost of Module type+Cost of bearing/yaw system type+cost of power transfer type+Cost of foundation type)−(summed lifetime operating costs))*Annual cost of initial capital)+(summed annual operating costs))/Annual yield Where, using the superstructure as a representative example, Ith, jth cost of superstructure type=Cost of members+cost of connections+cost of installation+cost of LRC+cost of transport+lifetime cost of operation & maintenance Where, Cost of members=Sum of n rows' member cost Nth row member cost may be determined based on loading values at the nth row, acceptable slenderness ratio, weight of material in row for all nth row members, cost of members per unit weight post fabrication, and material cost variability over time.

Cost of connections=Sum of n rows' connection cost

Nth row connection cost may be determined based on loading values at the nth row connection, weight of material for all nth row connection, cost of connections per unit weight post fabrication, and material cost variability over time.

Cost of installation=Sum of n rows' labor cost+cost of equipment

Cost of LRC=(member rate of failure*cost of replacement (inclusive of equipment and labor))+(connection rate of failure*cost of replacement (inclusive of equipment and labor))

Cost of transport=cost of member transport+cost of connection transport

Cost of operation & maintenance=cost of upkeep and repair (inclusive of reapplication of treatments over lifetime)+cost of labor As may be seen in this example, elements of the superstructure cost may be dependent on other "type" assignments or global design parameters. For example, Load for a member at the nth row=(dead load (dependent on module "type", member "type" and connection "type" load from higher rows, and power distribution load from higher rows)+environmental load (dependent on global height, depth, and width parameters, superstructure "type" load distribution, module "type" wind $C\_p$, location wind velocity load parameters inclusive of height variation, location seismic load parameters, and location snow load parameters))/number of nth row members (dependent on global design parameters or structural type optimization)

Additionally optimization of the superstructure cost may be dependent on optimization of the components of superstructure cost prior to inclusion in a higher tier matrix. Cost of installation may be dependent on the complexity of connection for a particular member/connection pair type, weight of member type as it effects cost of installation machinery, increased labor and associated insurance costs with specified height of machine. Cost of members and connections may be highly dependent on the types of superstructure under consideration and the load characteristics of a particular structure type vs. another. Transport may be dependent on volume of transport means relative to volume used by a member and connection type and expected location. LRC may be dependent on expected location, type of member and connection used, type of environmental coating applied to members and connections, and exposure of members and connection dependent on module or superstructure types.

Each interrelated and independent optimization may require an individual matrix of design options that may supply a specific optimal value to a higher tier matrix variable set. Each tier of optimization matrices may also require recursive evaluation.

Another example of representing the cost per unit power produced in a primary matrix may be, Ith, jth cost per unit power produced=((basis cost of superstructure type*cost coefficient of array geometry*coefficient of installation*coefficient of LRC*coefficient transport*coefficient basis material time variability*coefficient of operation & maintenance*coefficient of location)+(basis cost of Module type*coefficient of installation*coefficient of LRC*coefficient transport*coefficient basis material time variability*coefficient of operation & maintenance*coefficient of location)+(basis cost of bearing/yaw system type*cost coefficient of array geometry*coefficient of installation*coefficient of LRC*coefficient transport*coefficient of location)+(basis cost of power transfer type*coefficient of installation*coefficient of LRC*coefficient transport*coefficient of location)+(basis cost of foundation type*cost coefficient of array geometry*coefficient of location))*annual cost of initial capital)/(basis annual yield*yield coefficient of array geometry)

Where using the coefficient of array geometry as an example, coefficient of array geometry=(cost increase or decrease of wind load based on array dimensions and nozzle type C_p+cost increase or decrease of dead load based on array dimensions+cost increase or decrease of location snow and seismic load based on array dimensions)/basis cost Additionally each variable used in calculating the coefficients may be further decomposed into individual coefficients. Tiered optimization matrices and coefficient based matrices may be also be used in combination.

In embodiments, it may be desirable to optimize the yield for a given module by optimizing the integrated function of the accelerating and power producing components of the module. In short the module yield optimization process may be stated as matching of rotor aerodynamic performance to nozzle aerodynamic performance to generator characteristics such that nozzle acceleration, rotor conversion, and generator efficiency are simultaneously maximized across the operating velocity range and loading conditions.

A matrix representation was chosen to elucidate the optimization method but any optimization representation could be used by those knowledgeable in the art provided it allowed analysis and optimization of the contributing variables.

Figure 61:
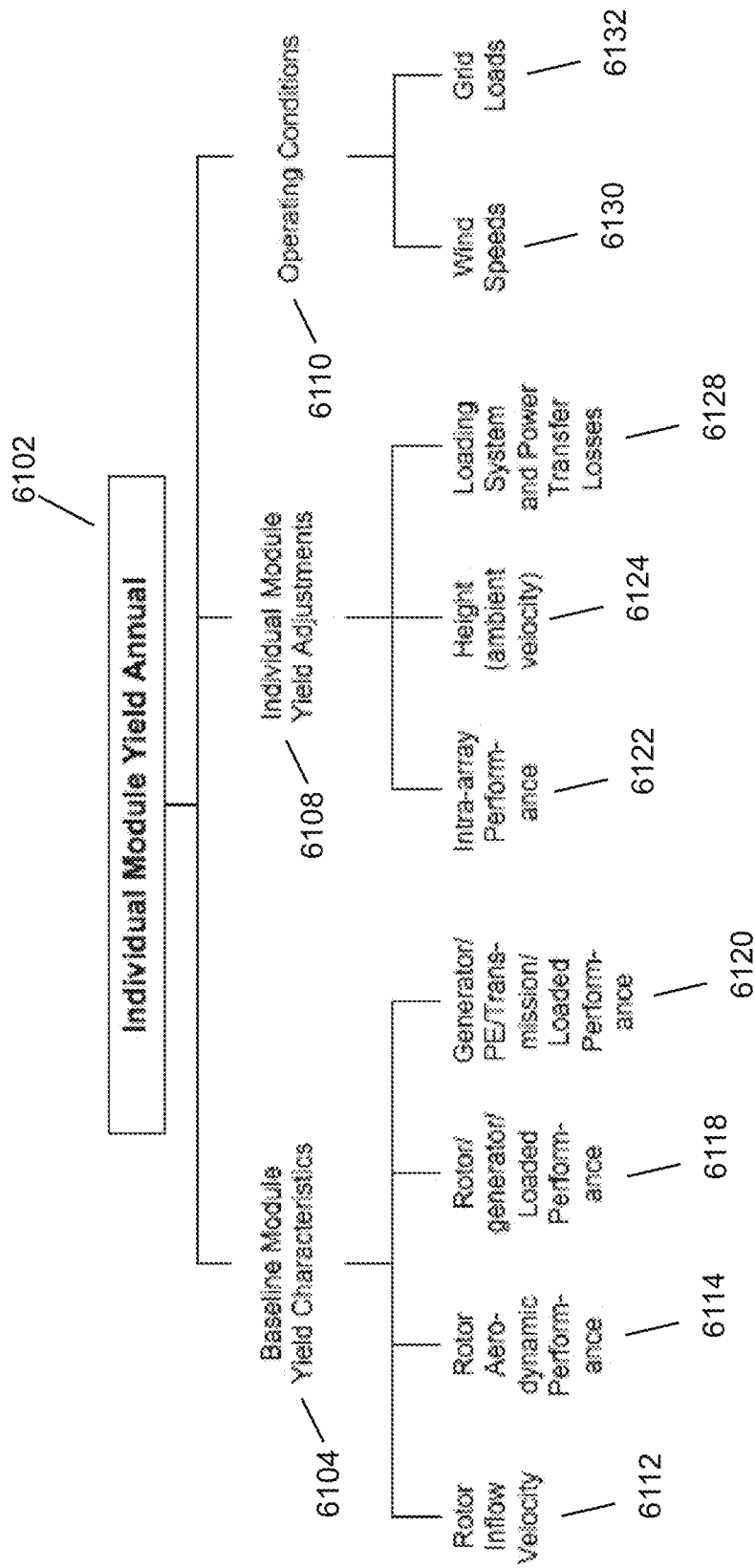
FIG. 61 depicts an embodiment of elements affecting annual yields.

Yield optimization for a given module design may be derived from the testing and comparison of rotor, nozzle, transmission, and generator characteristics over a matrix of loading and velocity inflow conditions. This object may be to optimize the efficiency of component sets over the broadest possible range of values, or, alternatively, the most prevalent range of values, within the parameterized operational conditions for loading and inflow velocity by matching rotor design to nozzle design to generator design wherein the output is optimized by varying the applied load on the rotor and generator and/or transmission ratio between the rotor and the generator to achieve an optimal output. It may desirable to determine the optimal output as an annual, seasonal, or other periodic cumulative value vs. an instantaneous value as derived from a Weibull or real set of wind data to determine the maximum possible annual energy production within the design constraints of the components. The elements effecting annual yield 5302 are detailed in FIG. 61, including baseline module yield characteristics 5304, individual module yield adjustments 6108, operating conditions 6110, rotor inflow velocity 6112, rotor aerodynamic performance 6114, rotor/generator/loaded performance 6118, generator/PE/transmission/loaded performance 6120, intra-array performance 6122, height (ambient velocity) 6124, loading system and power transfer losses 6128, wind speeds 6130, and grid losses 6132.

A set of rotor designs and types may be selected for an optimization set. This may be a range within the same general class of blade profiles and geometry or a selection of rotors from different profile and blade geometry classes or a combinative set. The initial set of rotor designs may also include rotors having a singular number of blades or a set having rotors with different numbers of blades.

The object of this parameterization of conversion characteristics may be to serve as a basis for optimizing rotor geometry to the nozzle or other specified conditions. In this regard the aim may be the highest conversion efficiency relative to the lowest flow disturbance. Flow disturbance may be preliminarily characterized at a maximum by a limiting rpm condition achievable by a given rotor design. Optimization variables may include torque imparted to the blade. The rpm and torque values may be determined by a force sensor and tachometer coupled to the rotor shaft. Bias in the optimization may generally be toward increased conversion efficiency at the higher velocity ranges and/or the broadest range of peak conversion values for the rotor or may consider granular optimization across all inflow conditions as in the case of an adaptive rotor.

A given rotor design's aerodynamic characteristics may be empirically determined as a rotor conversion coefficient under varying loads and velocities in a duplicative operational environment, in the nozzle case this may preferably be a closely contained density driven flow. Where the characteristics of rotor to power conversion prior to transmission, shaft, or generator losses may be expressed as, $$C\_r, n \times m * P\_t, m = P\_r, n \times m$$

Or $$C\_r, n \times m = P\_r, n \times m / P\_t, m$$

Where, $$P\_r, n \times m = RPM n \times m * t\_n \times m$$

Where,

C_r, n×m=Conversion coefficient of available fluid power at the nth loading condition and the mth inflow velocity condition P_t, m=Power available in flow at the mth inflow velocity condition RPM_n×m=rotor rpm at the nth loading condition and the mth inflow velocity condition t_n×m=shaft torque at the nth loading condition and the mth inflow velocity condition An example of a conversion matrix of these values is shown in FIG. 62.

Optimal rotor conversion may be derived from convergence of empirically derived rpm and torque characteristics of the rotor at the nth and mth conditions at a maximum value within the matrix.

Evidence of flow disturbance may additionally be gathered by means of particulate visualization of the flow at a given operating condition wherein the properties of the flow may be plotted and the disturbance effect on rotor plane throughput may be determined by plotting the particulate distribution in the flow over time.

A range of n optimized rotor geometries may be selected for the next stage of optimization.

The range of n optimal rotor geometries may then be tested with a set of m nozzle geometries. As before the conversion characteristics of the rotor-nozzle pair may be determined by coupling a force sensor and a tachometer to the rotor shaft.

Nozzle aerodynamic characteristics may be empirically determined by use of anemometers or particulate visualization or the like. The set of nozzles tested may be of a singular constriction ratio or of multiple constriction ratios. The set may additionally test both basis and enhanced or complex geometries as described in previous iterations of the invention. It may be beneficial to determine basis geometry function initially and secondarily enhanced geometries to determine an optimal combination of basis and enhanced geometries.

Figure 63:
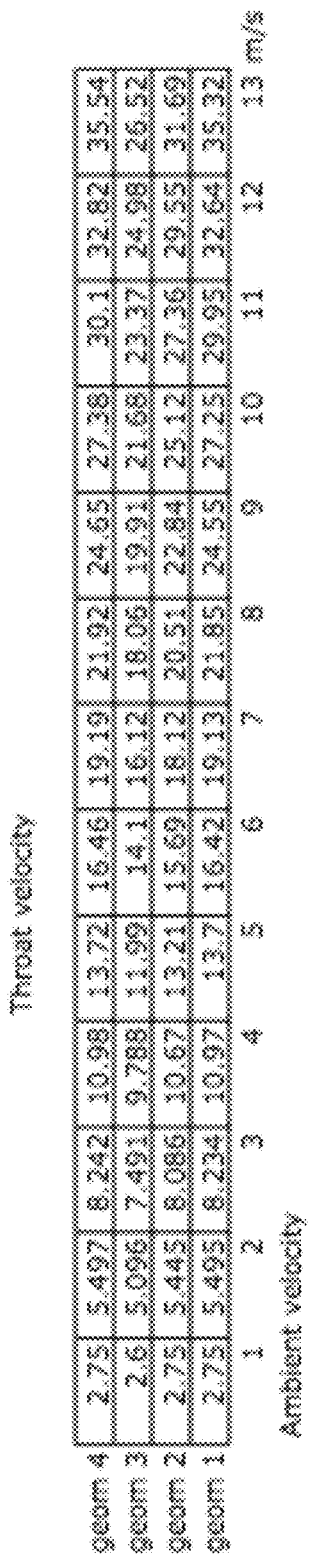
FIG. 63 depicts an embodiment of an acceleration matrix.

An example of an acceleration matrix for 2.75 constriction ratios for 4 geometries is shown in FIG. 63.

Figure 64:
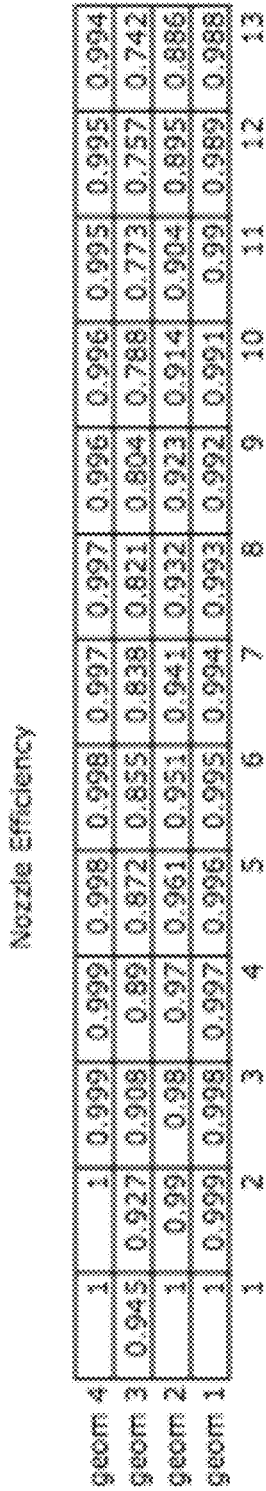
FIG. 64 depicts an embodiment of a mass throughput efficiency matrix.

Since power from a nozzle is dependent on mass throughput or mass flow rate, it may be desirable to characterize the nozzle in terms of mass throughput efficiency, such as shown in FIG. 64.

Figure 65:
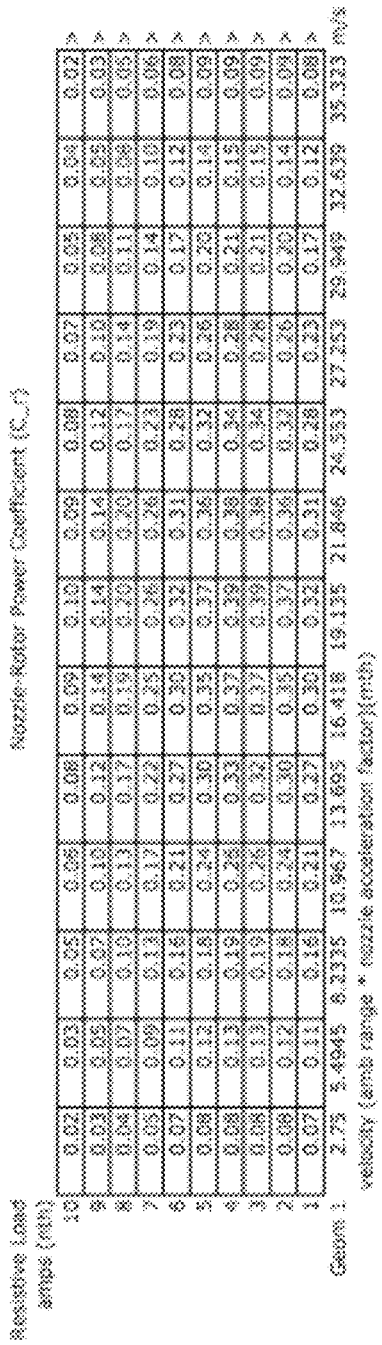
FIG. 65 depicts an embodiment of a nozzle efficiency row matrix.

A nozzle-rotor pair may be tested by the means described above. From this a rotor-nozzle pair conversion matrix may be derived from the rpm and torque matrices at the nth and mth loading and rotor plane inflow conditions and the nozzle efficiency row matrix mass throughput values for a given geometry, such as shown in FIG. 65.

Figure 66:
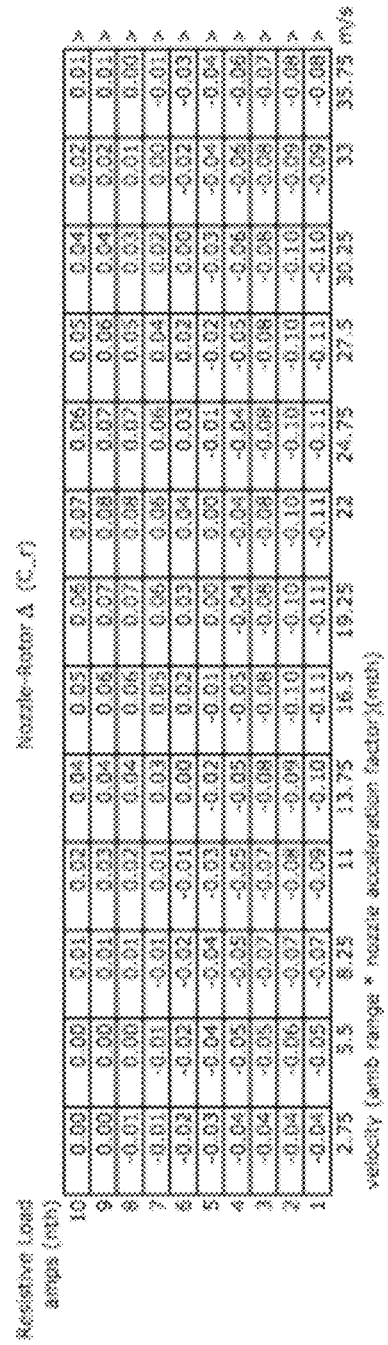
FIG. 66 depicts an embodiment of a rotor efficiency matrix.

From this a delta matrix between the rotor efficiency and the rotor-nozzle pair efficiency may be generated wherein negative values may indicate a reduction in function for the nozzle-rotor pair vs. the rotor alone, such as shown in FIG. 66.

A negative value in the delta matrix may indicate that the flow disturbance of the rotor at the nth and mth condition is inhibiting the function of the nozzle by reducing the mass throughput in the nozzle. This may be used to identify and address design optimization parameters either for the rotor or the nozzle.

This information may be used to identify the most optimal nozzle-rotor pairings and operating ranges from the initial nozzle and rotor sets. This information may additionally be used recursively at a given step limit to adjust the design of the selected rotors and nozzles to achieve a maximum output level for a nozzle-rotor pair. It may be a particular object of this recursive process to match higher conversion under larger load for the rotor to this nth and mth boundary conditions of the iterative delta matrices. The recursive process may include partial or complete redesigns of the rotors or nozzles to maximize a particular property as it pertains to matching the negative boundary to the maxima of the power conversion profile for a given rotor. It may be expected that through recursive steps of redesign the negative boundary will change.

The resultant negative boundary of the delta matrix derived from recursive testing and design may indicate the optimum balance of load and inflow velocity and thereby the optimized output torque to rpm for a nozzle-rotor pair.

For these purposes the applied load on the nozzle-rotor pair may be characterized as the internal resistance of the module generator and the external resistance (load) applied to the generator. Additionally in the case where a transmission is used in the module the conversion of torque to rpm and the inverse may constitute a portion of the load applied to the rotor. In the case of storage the means of storage may be managed modularly to allow the charging load applied to the module to be adjusted to the optimal loading parameter at the mth velocity condition.

Figure 67:
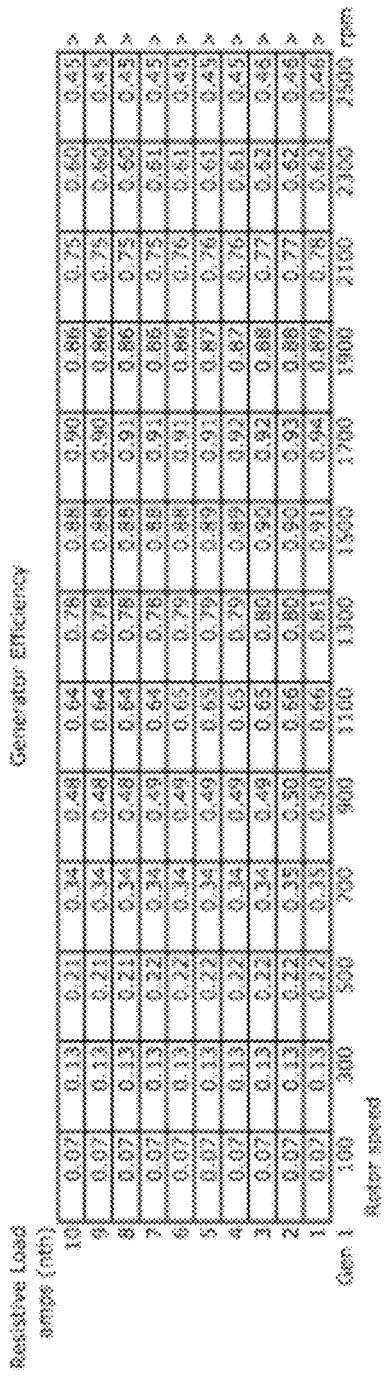
FIG. 67 depicts an embodiment of an RPM-load parameters matrix for a generator.

As is known in the art generators have optimal efficiencies at a designed generator rotor rpm range. It may be desirable to match the optimal rpm of the generator to the optimum rpm of the nozzle-rotor pair. Insofar as this can be designed into the generator itself the rpm-torque balance may be used to optimize the initial design of the generator. In instances, closely matching the nozzle-rotor pair rpm-torque characteristics to the generator rpm characteristics may not be possible. In this case the rpm-load parameters of the generator may be mapped into a matrix as shown in FIG. 67.

Figure 68:
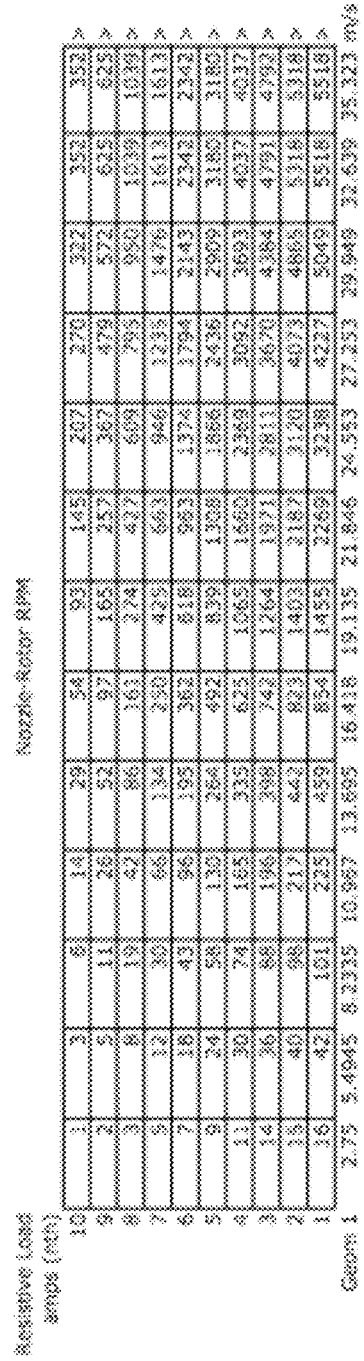
FIG. 68 depicts an embodiment of a nozzle-rotor pair matrix.

The rpm component of the nozzle-rotor pair matrix may be mapped for purposes of comparison, such as shown in FIG. 68.

Each matrix may be filtered for a local conversion or efficiency maxima. It may be desirable in this case where generator characteristics cannot be closely matched to the nozzle-rotor optimal torque:rpm ratio, to include a variable transmission in the module power assembly. Depending on the preferred method of operation for the module, e.g. fixed speed or variable speed or a combination thereof, the differential in the torque:rpm ratio which may be indicated by the maxima in the respective matrices can be used to determine the best conversion ratio of torque:rpm between the nozzle-rotor pair and the generator.

In the case of most generators the maximum efficiency may be expected to be at the design rpm under no load condition with a decrease in efficiency as it approaches the fully loaded condition or shifts off design rpm. In the nozzle-rotor pair the maximum efficiency may be variable as the aerodynamics of the rotor, the nozzle, and the applied load combinatively define an optimal torque:rpm ratio for each velocity range.

In this regard it may be optimal to have the module power assembly include both a variable transmission and power electronics for variable speed and/or fixed operation. In this case the electrical system may be such that the load imparted to the machine by demand from the grid is parsed into separate loads applied to individual rows of an array. In this case the machine may be allowed to run at variable speed up to the optimal rpm efficiency range of the generator with imposed load closely matched to the optimum rpm:torque ratio in the given velocity range. Once the optimum rpm range is reached by the rotor-nozzle pair the variable transmission may then be used to optimize output from the generator by balancing the optimum rpm:torque ratio with the generators optimum range. The control mechanism for this may be where the optimum range between generator optimum condition and the rpm:torque optimum condition is subject to output optimization wherein a column matrix of the nozzle-rotor pair output for a given velocity range under a range of loading conditions is subjected to an analysis where the column matrix is clipped at a boundary of the optimal conversion value and the optimum generator efficiency rpm value. This data would simultaneously be analyzed from a nozzle-rotor conversion matrix and the component nozzle-rotor rpm matrix. This clipped column matrix would then be converted to an output matrix and applied to the generator rpm efficiency values appropriate to each values' rpm and loading conditions, $$P\_t,m = RPM\_rotor,m * t\_rotor,m * C\_gen,n \times m$$

Where P_t, RPM_rotor, t_rotor may be defined by a fixed mth matrix condition (same velocity) and the nth condition (loading) may be variable, and the C_gen variable may be defined by the rpm (mth) and loading (nth) value within its own matrix, such that the matrix may be constituted of power output within the velocity range at the defined loading:rpm level and the generator efficiency at the given rpm:loading level as shown below.
Where

| Resistive Load amps (nth) | Nozzle-Rotor RPM | C_r |
|---|---|---|
| 10 | 144.7384296 | 0.171894299 |
| 9 | 257.1278202 | 0.233045696 |
| 8 | 427.0963804 | 0.295414841 |
| 7 | 663.3066088 | 0.350134693 |
| 6 | 963.1953312 | 0.388015961 |
| 5 | 1307.753901 | 0.402045909 |
| 4 | 1660.157495 | 0.389505249 |
| 3 | 1970.535065 | 0.352827634 |
| 2 | 2186.908715 | 0.29882951 |
| 1 | 2269.283493 | 0.236644264 |
| Velocity | 21.84646123 | 21.84646123 |

In this case only 2 values were within the boundary.

| Resistive Load amps (nth) | Nozzle-Rotor RPM |
|---|---|
| 5 | 1307.753901 |
| 4 | 1660.157495 |

And by matching the respective matrix values and calculating the power output at each condition,

| 21.85 m/s | | | | |
|---|---|---|---|---|
| C_rn | P_t,m | C_gen | Gen_rpm | Load |
| 0.40 | 2028 | 0.79 | 1300 | 5 |
| 0.39 | 2286 | 0.92 | 1700 | 4 |

It may be seen the optimum output may be found in this case at a lower nozzle:rotor conversion at a loading level of 4 due to the generator performance within that range. In this case the higher rpm may provide the optimal solution. In other cases the optimal performance may be found at the lower rpm range. The deciding factor of the controller to run in variable speed or fixed state may be the maximum output.

It may useful to then utilize the variable transmission as a load adjustment factor that allows the nozzle:rotor:generator system to optimize output dynamically in response to specific conditions. In this regard it may also be beneficial to have a dual operation system wherein the variable transmission may add load from some base level greater than 0 to optimize the system dynamically but if the demand on the module exceeds the base loading level to be dynamically able to adjust the applied mechanical load to the reduced requirement. In cases it may be useful to have a system that after the condition for fixed operation is met still has the capability to switch to variable operation if the nozzle:rotor pair loading that met the generators optimal conditions did not produce the maximum power output from the generator. This may occur with generators with wide and relatively flat peak efficiency ranges. In embodiments, a transmission may be applied that has dual function allowing increase from an under optimal rotor rpm to generator rpm condition and decrease from an over optimal rotor rpm and generator rpm controller and may be dynamically managed by an rpm: torque controller and a variable speed controller that may allow operation in either a variable speed or fixed speed state based on the maximal output relative to operating conditions, rotor, transmission, and generator characteristics.

Power produced in either mode may then be converted and conditioned by the power electronics (PE) components for delivery to the grid. It may be advantageous to have the PE housed with the modules or at a hub that collects the energy from multiple modules.

The process described above may be performed with multiple rotor designs, nozzles design and constriction rates, component configurations, and generator designs and then integrated into an annual energy production model to recursively determine an optimal yield design configuration. Methods of matrix optimization analysis may be utilized to reduce the number of test variations run to recursively determine design that will yield the maximum output. The optimum design may additionally vary with the height at which a given module configuration is operated.

With regard to cost to yield optimization of the module, the cost of each configuration on an all-in component cost basis inclusive of cost of materials, cost of manufacture, cost of assembly, LRC cost, cost of operations and maintenance, ancillary cost or derivative costs, and cost of installation may be calculated with the yield optimization to determine the design configuration that results in the lowest cost and highest yield combination. In cases, it may be that a particular application places a higher premium on output than cost in some empirically described manner. In these cases the empirical relationship between the importance of yield vs. cost may be applied as a ratio that would weight the results of the optimal design toward a particular combination of cost and yield optimization.

Methods are disclosed by which optimization of a nozzle based on non-linear calculation of LE and intake wall momentum vectors and density-sparsity regions in converging-diverging nozzles in ambient and pressurized conditions may be performed.

In the case of the LE and intake wall momentum vectors initial conditions may be approximated in a two-dimensional model wherein the initial vector paths may be modeled through multiple collision scenarios where the collisions may be calculated at a molecular level or some gross approximation thereof until closely matched non-linear functions are isolated that describe momentum vector paths within the intake and a mean path for a given grouping is derived. Additionally the initial and steady state conditions of an ambient flow using a non-linear momentum transfer model based on slice interaction and density variation may be derived to closely match empirical measurements for a density driven flow for use as the basis environment determining the global parameters of the system under consideration. Other approaches may be used to determine the basis environment such as n-body simulations wherein the macro variables are replaced with molecular variables. Integration of the 2 dimensional model into a 3 dimensional system may be necessary to accurately describe a specific nozzle embodiment's interaction with a flow. This may be inclusive of modeling not only the bulk geometric characteristics of the nozzle but also the more complex topography of the nozzle wall with quadric uniform or non-uniform tessellation. In this model both wake and density flow types may be integrated into the model based on statistical momentum flux within variably populated matrices and collision parameters that may be elastic or non-elastic in nature. Rotor behavior within the system may also be included by either modeling the portion of the bulk momentum properties of the flow that interact or are effected by the motion of the blades, or modeling specific momentum vectors by calculating the blade interaction on a time step basis to determine the effect of the blade's momentum flux on the environment of the intake. Momentum flux within the system may be approximated with a constant or variable steady state variable density system wherein the local and global density effects the flow parameters through system and is a constant acting on the vectors of momentum flux deriving from wall topography and rotor interaction. This model may also be used to optimize rotor blade # and profile to reduce oppositional momentum vectors' effect within the intake region.

A machine for radial velocity energy extraction, an Angular Horizontal Axis—Circumferential WAM Turbine, is now described.

Figure 69B:
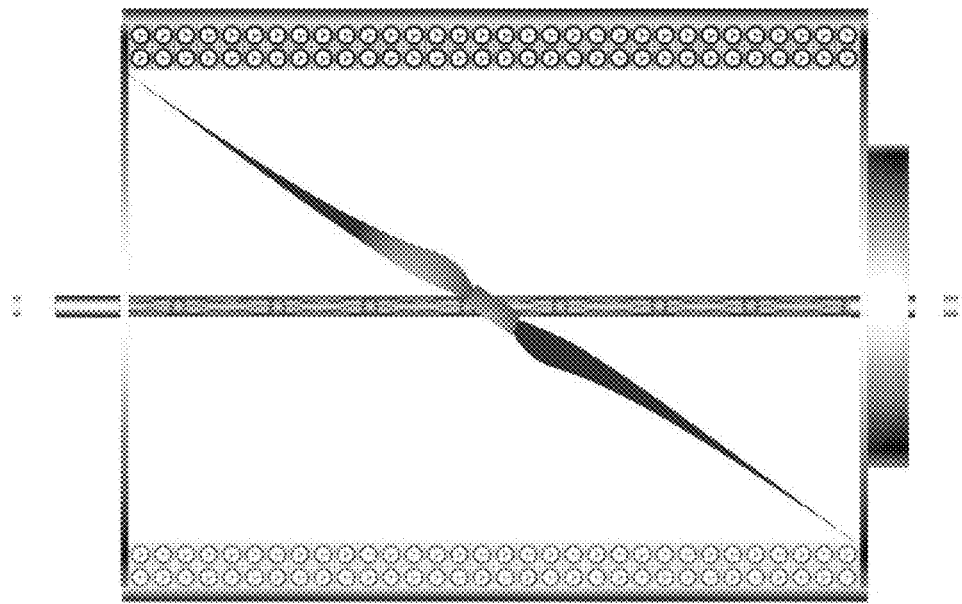
FIGS. 69A and 69B depict an embodiment of a radial velocity machine.
Figure 69A:
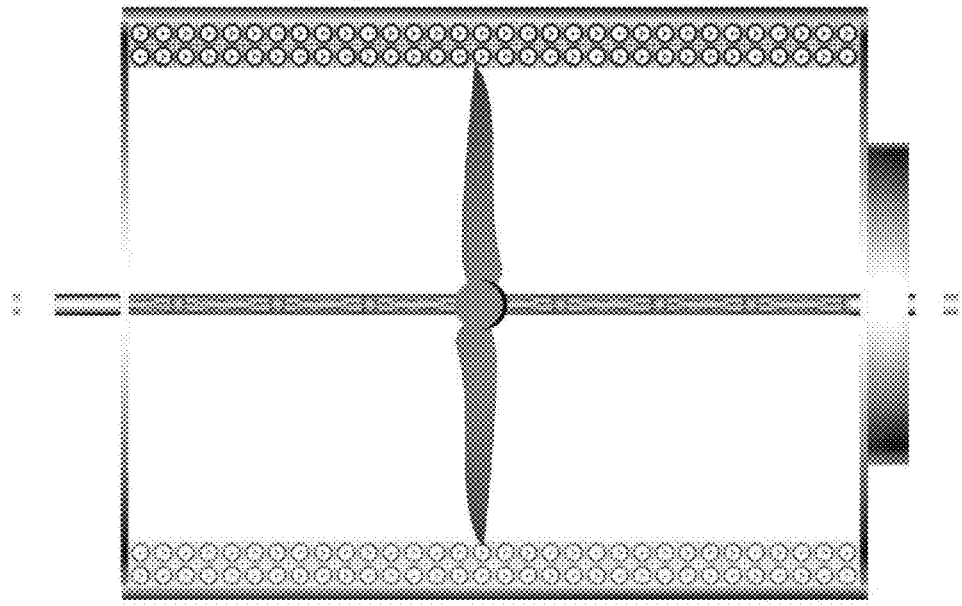

Referring to FIGS. 69A and 69B, the concept of a radial velocity machine may be to use the properties of an angular HAWT structure and a nozzle structure in combination, such as shown in the two positions FIG. 69A and FIG. 69B. While an angular HAWT may not be as efficient as HAWT's in normal structures, it may be particularly suited for this type of application.

The advantage of a combined structure is the circumferential speed of the structure when in motion and power production in the columnar arrays at the radial velocity.

For example, a 50 meter angular HAWT (50 m blade width at the narrowest point of the described ellipse under rotation) with an RPM of 15 has a circumferential radial velocity (commonly termed tip speed) of approximately 40 m/s. A 75 m would have a circumferential radial velocity of 59 m/s.

With the a columnar array attached to the outer edge assuming the 50 m case and a nozzle rating of 2.75 and a actual acceleration of 2.2 (accelerated to 86 m/s) with an average of 0.3 conversion of raw power available at the throat, this structure, with 4 columnar arrays, would produce approximately 32 MW of power. For 75 m version with the same conditions (accelerated to 129 m/s) this would produce 110 MW of power.

The angular blade may be of variable length in rotation to maintain a clean radial path at the circumference. Stress on a variable length blade may be alleviated by attachment to a channel in the exterior arrays allowing the blade to extend in the vertical direction while the machine completes its circuit.

Additionally the machine may be executed with non-uniform proportions due to the ellipse formed by the main blades' rotation. The exterior columnar arrays may not need to be limited to the number depicted. In embodiments, optimization of yield cost may balance the tip speed based on inflow KE with the angular conversion and the inertia of the radial mass based on the number of columnar arrays and the cost of the total structure.

In embodiments, the radial motion may also be achieved by mechanical gearing from the main rotor and may be achieved by transfer of electrical power to a secondary machine.

A method for generator/motor thermal recycling is now disclosed. A generator/s or motor/s may be housed in a uniform or variform single wall or dual-wall or n-wall pressure vessel wherein the exit of the pressure vessel may be constituted of a release channel, a fluid turbine section for additional power generation, a recycling loop to return the medium to the pressure vessel, and the like.

The vessel may contain a fluid medium where the medium may be a thermally absorptive gas, a thermally absorptive fluid, and the like, or a combination thereof. In the case of the single wall vessel the generator may rest directly within the vessel the fluid is aerosolized either mechanically or by means of thermal energy absorption. In the case of a dual or n-wall system the generator may be encased in the vessel the inner wall or walls would be comprised of a thermally conductive material and/or structure and the outer wall may include a thermal insulating material and/or structure, and fluid may be housed within the walls and aerosolized by mechanical or thermal means.

Figure 70:
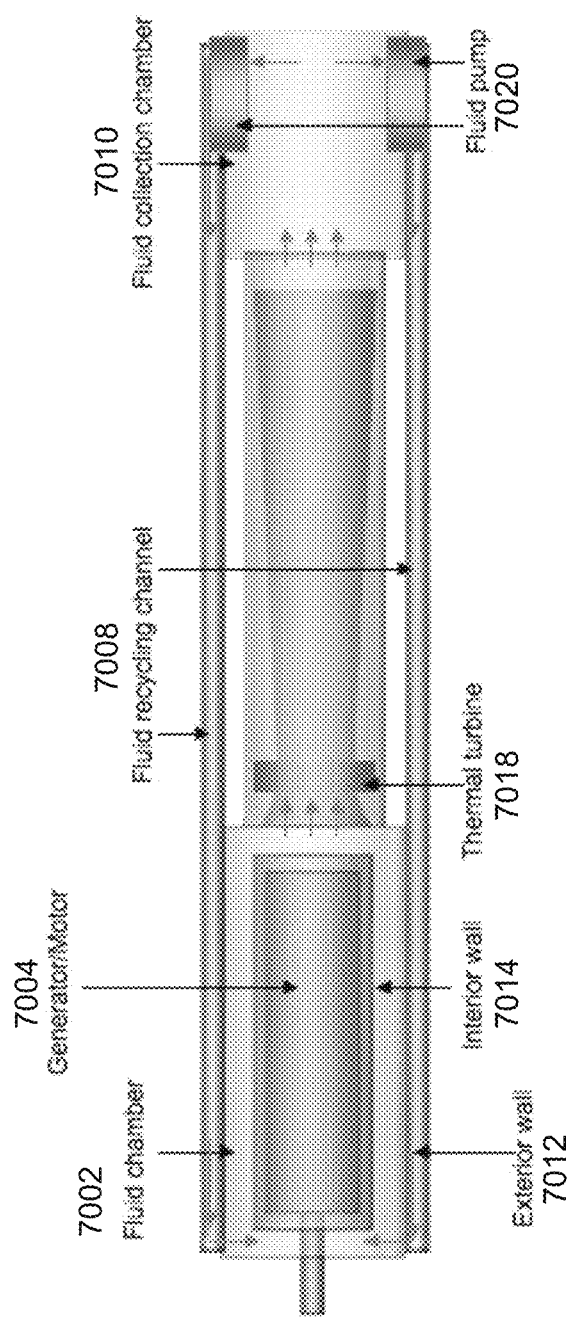
FIG. 70 depicts a fluid cooled generator embodiment.

Referring to FIG. 70, the fluid is intended to cool the generator wherein the fluid may have thermal properties that allow the absorption of waste heat from the generator in such a way that excites and expands the fluid medium increasing the internal pressure of the vessel, shown including a fluid chamber 7002, a generator/motor 7004, a fluid recycling channel 7008, a fluid collection chamber 7010, an external wall 7012, an internal wall 7014, thermal turbine 7018, and a fluid pump 7020. The fluid may be released at a desired rate through a release channel which may include a way to produce medium acceleration to a turbine facility where the thermal energy stored by the medium now in the form of outlet velocity is converted into power. The medium may then be cycled through a cooling chamber that further reduces the medium's temperature and may then be fed back into the pressure vessel by means of a uni-directional valve facility.

In the case of load balancing this may be useful as it may allow generators/motors to be operated at conditions closer to maximum power theory while capturing a high proportion of the power normally wasted as thermal energy by a generator wherein the load on the generator may be matched or closely matched to the internal resistance of the generator. This may also be applied to any system that produced sufficient waste heat to justify the expense of the secondary system.

Figure 71:
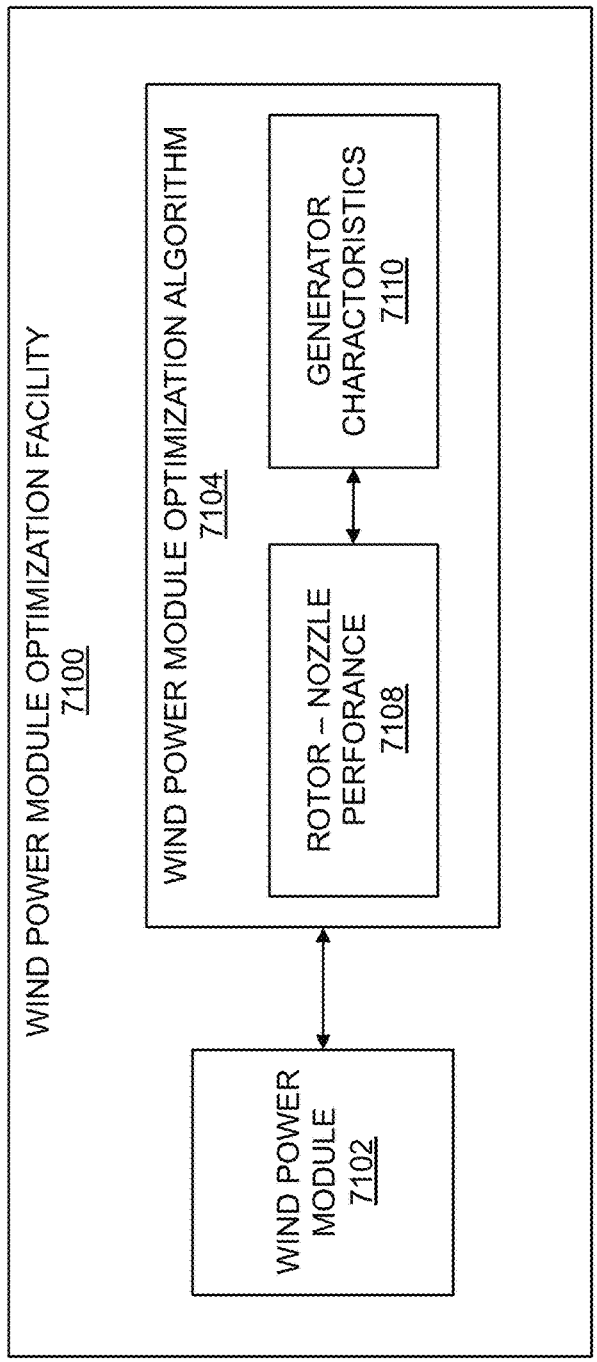
FIG. 71 depicts a wind power module optimization algorithm embodiment of the present invention.

Referring to FIG. 71, in embodiments the present invention may provide for wind power module optimization through matching of rotor aerodynamic performance, nozzle aerodynamic performance, and generator characteristics. A wind power module optimization algorithm 7104 may be used to optimize the yield for a wind power module 7102 by optimizing the integrated function of the acceleration in and power producing components of the wind power module, where the rotor aerodynamic performance to nozzle aerodynamic performance 7108 may be matched to the generator characteristics 7110 such that nozzle acceleration, rotor conversion, and generator efficiency are simultaneously maximized across the operating velocity range and loading conditions of the wind power module. In addition, a wind power module may be provided with a nozzle optimized to provide high efficiency for a selected range of wind conditions, with generator characteristics optimized to provide high efficiency for a selected range of wind condition, and the like. The wind power module optimization may be derived from the testing and comparison of at least two of a rotor, nozzle, transmission, and generator characteristics over a matrix of loading and velocity inflow conditions. The wind power module optimization may optimize the efficiency of component sets over the broadest possible range of values within the parameterized operational conditions for loading and inflow velocity by matching rotor design to nozzle design to generator design. The wind power module output may be optimized by varying the applied load on the rotor and generator to achieve an optimal output. The wind power module output may be optimized by varying the transmission ratio between the rotor and the generator to achieve an optimal output. The wind power module optimization may be performed with multiple rotor designs, nozzle design, constriction rates, component configurations, and generator designs, and then integrated into an annual energy production model to recursively determine an optimal yield design configuration. In embodiments the present invention may provide for a wind power module optimization facility 7100 for optimizing the yield for a wind power module 7102 by optimizing the integrated function of the acceleration in and power producing components of the wind power module, where the rotor aerodynamic performance to nozzle aerodynamic performance 7108 may be matched to the generator characteristics 7110 such that nozzle acceleration, rotor conversion, and generator efficiency are simultaneously maximized across the operating velocity range and loading conditions of the wind power module. In addition, a wind power module may be provided with a nozzle optimized to provide high efficiency for a selected range of wind conditions, with generator characteristics optimized to provide high efficiency for a selected range of wind condition, and the like. The wind power module optimization facility may provide for an algorithm 7104 for performing the optimization.

Figure 72:
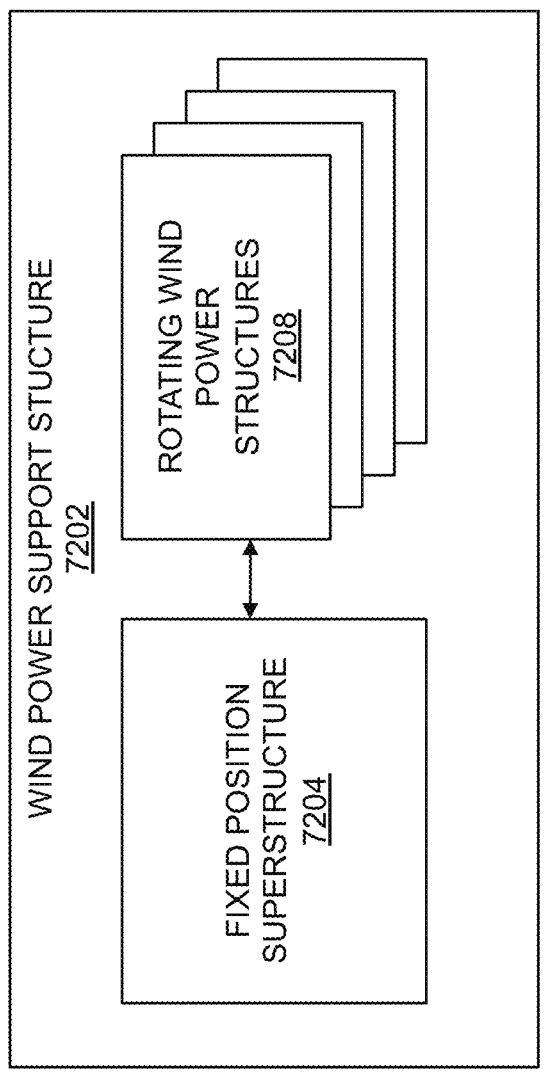
FIG. 72 depicts a wind power support structure embodiment of the present invention.

Referring to FIG. 72, in embodiments the present invention may provide a wind turbine structure consisting of fixed exterior perimeter superstructure and rotating internal array structure. A wind power support structure 7202 may comprise a fixed position superstructure 7204 and a plurality of rotating wind power structures 7208, where the plurality of rotating wind power structures are positioned in the structure of the fixed position superstructure through a bearing facility. The fixed position superstructure may be mounted to the ground. The rotating wind power structure may be a single wind power turbine module, a row of wind power turbine modules, a column of wind power turbine modules, an array of wind power turbine modules, removable from the superstructure, and the like. The wind power support structure may reduce the torque experienced by the superstructure from variation in inflow vectors in the vertical plane, increase safety, decrease loading on individual bearing mechanisms, increase load isolation. The fixed position superstructure may have a cross section, such as a rectangle, a polygon, and the like, where the polygon may be an n-pointed regular polygon, an n-pointed irregular polygon. The cross-section of the shape may be circular. The fixed position superstructure may be a polyhedral, such as a regular polyhedral, a non-regular polyhedral, a prismatic polyhedral, an anti-prismatic polyhedral, and the like. The fixed position superstructure may have a structural variation, such as a geodesic variation, a tensegrity variation. The structural variation may be a height variation that varies the shape of the fixed position superstructure as a function of the height. The height variation may be a change in n of an n-pointed polygon.

Figure 73:
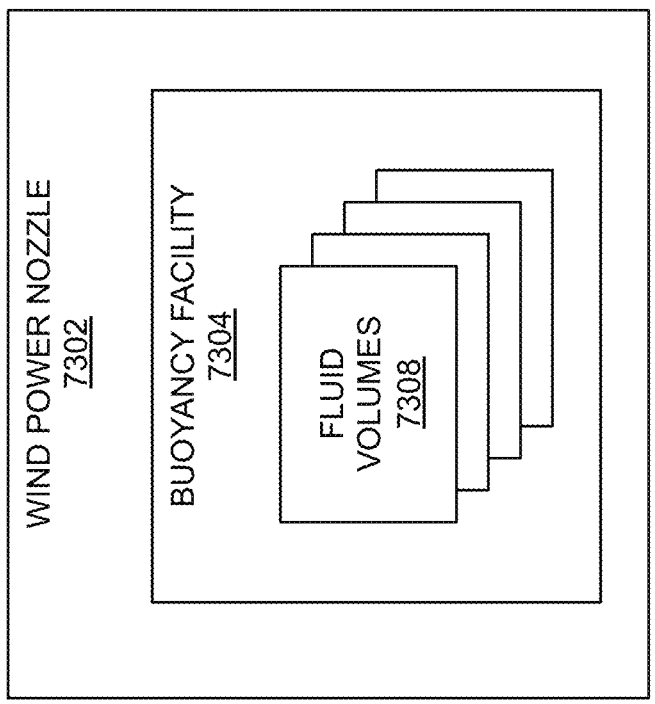
FIG. 73 depicts a wind power nozzle embodiment of the present invention.

Referring to FIG. 73, in embodiments the present invention may provide wind turbine modules with neutral buoyancy structures. A wind power nozzle 7302 may have an integrated buoyancy facility 7304, where the buoyancy facility contains at least one of a plurality of fluid volumes 7308 used to achieve a buoyant condition for the wind power structure. The fluid may be helium, hydrogen, and the like. The fluid may be heated to alter buoyancy. The heating may provide buoyancy to the nozzle such that at least a portion of the dead load of the wind power structure may be neutralized by buoyancy. The fluid may be pumped to alter buoyancy. The pumping may provide buoyancy to the nozzle such that at least a portion of the dead load of the wind power structure may be neutralized by buoyancy. The integrated buoyancy facility may be integrated with the interior surface of the nozzle. In embodiments, a wind power nozzle with an integrated buoyancy facility may be provided, where the buoyancy facility contains a buoyant material used to achieve a buoyant condition for the wind power structure. The buoyant material may be a gas impregnated foam, where the gas may be hydrogen, helium, and the like. In embodiments, a wind power nozzle with an attached buoyancy facility may be provided, where the tethered buoyancy facility contains a buoyant gas used to achieve a buoyant condition for the wind power structure, such as with hydrogen, helium, and the like. The attached may be a tethered attachment.

Figure 74:
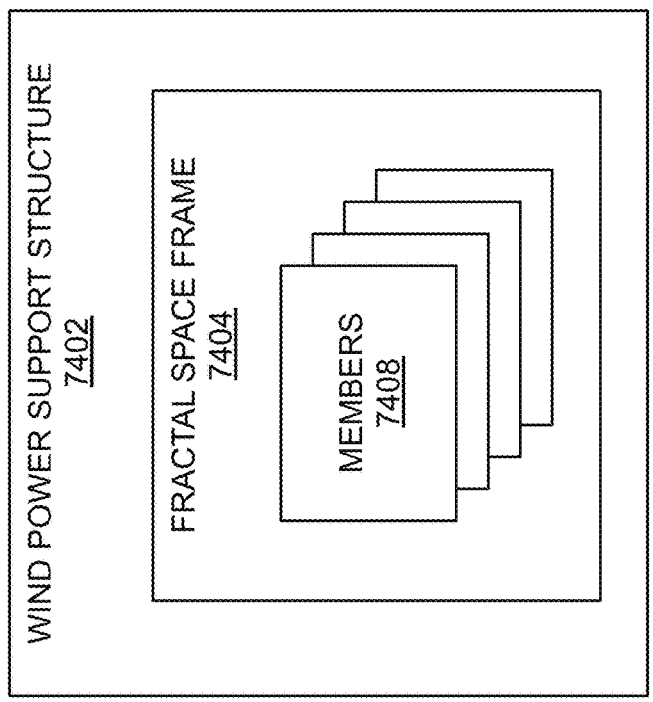
FIG. 74 depicts a wind power structure embodiment of a fractal support structure interconnection of the present invention.

Referring to FIG. 74, in embodiments the present invention may provide for a wind power structure consisting of a fractal support structure interconnection scheme. A wind power support structure 7402 may comprise a fractal space frame 7404, where the geometric structure of the space frame may be repeated in the members 7408 of the space frame to the nth iteration, and where the nth iteration may be the base member and the polyhedron that forms the basis of the nth iteration member may be the basis polyhedron. The fractal space frame may be a 3-dimensional fractal. The fractal space frame may use a regular polyhedral structure, a Reuleaux polyhedral structure, a Kepler-Poinsot polyhedral structure, and the like. The fractal space frame may provide a low solidity relative to structural and loading capacity thereby reducing the weight of the support structure.

Figure 75:
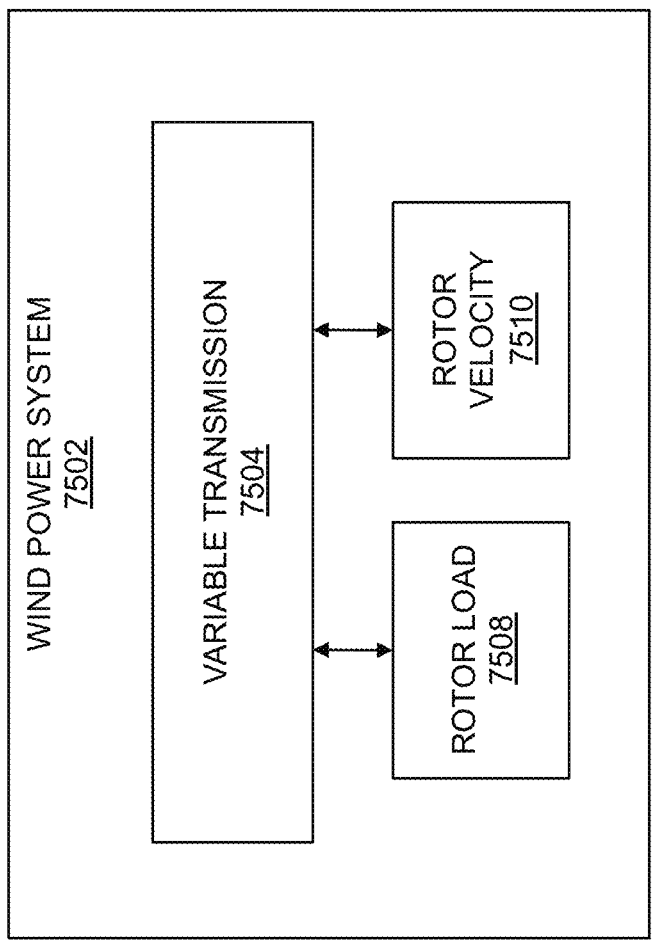
FIG. 75 depicts a wind power support structure embodiment of the present invention.

Referring to FIG. 75, in embodiments the present invention may provide for a wind power system that makes use of a variable transmission and PE to balance loading and run at variable speed at the same time. A wind power system 7502 may comprise a variable transmission 7504 in the wind power system that may be in part used to increase the load on a rotor 7508 of the wind power system in order to slow the rotor's angular velocity 7510 in high wind conditions in order to optimize performance of the wind power system, where the transmission provides for continuously variable speed of the rotor. The variable transmission may be a continuously variable transmission. The optimized performance may be achieved through a reduction of aerodynamic losses during the extraction of energy from the wind flow through the wind power system. The optimized performance may be achieved through a increased power conversion by the wind power system. The high wind conditions may be a condition that creates high circumferential speed of the rotor. The circumferential speed of the rotor may be decreased to below a low sonic speed by the increase in load on the rotor. The load may be mechanical, electrical, or a combination of electrical and mechanical loading. The load on the rotor may be altered through an optimization of a power transfer network by use of an algorithm that changes a network condition. The network condition may be a connection within the network topology, a resistance through a connection type within the network topology, and the like. The algorithm may utilize a combinatorial technique, a dynamic programming technique, an evolutionary approach, and the like. The performance may be optimized through dynamically calculating an increased torque from a baseline load. The variable transmission may operate bi-directionally with regard to increasing or decreasing RPM of the rotors. The variable transmission may be a geared transmission, a continuous variable transmission, and the like. The rotor may be a wind rotor, a generator rotor, and the like. In embodiments, a wind power system may comprise a variable transmission to balance rpm:torque characteristics of the wind power system and a power electronics facility, where the variable transmission and power electronics facility enable variable or fixed speed operation based on a maximum output algorithm. In embodiments, a wind power system may comprise a variable transmission to balance rpm and torque characteristics of the wind power system and a power electronics facility, where the variable transmission and power electronics facility enable at least one of variable and fixed speed operation based on a maximum output algorithm, and where the maximum output algorithm yields maximum combinative efficiency of applied conditions and system operation state.

Figure 76:
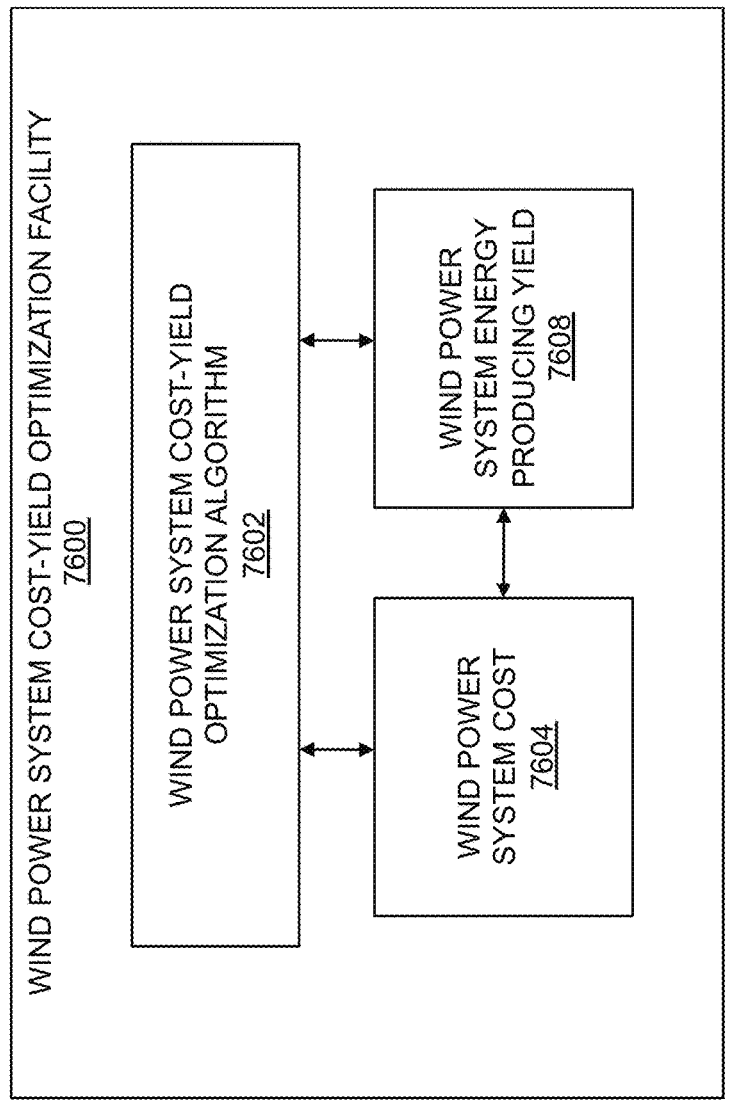
FIG. 76 depicts a wind power embodiment of the present invention.

Referring to FIG. 76, in embodiments the present invention may provide for a wind power system cost-yield optimization facility. A wind power system cost-yield optimization algorithm 7602 may optimize the cost of the wind power system 7604 with respect to the energy producing yield 7608 for the wind power system by employing permutations of possible design solutions identified in an n dimensional optimization matrix, where the dimensional number of the matrix may be determined by the number of optimization parameters under consideration. In addition, building a wind power system may be optimized for a selected range of wind conditions based on the cost-yield optimization algorithm. Each matrix value may represent a weighted cost per unit of power produced for a given design implementation that captures a system parameter. The system parameter may be a cost parameter, such as a basic cost parameter, a derivative cost parameter, a yield parameter, and the like. The permutations may be recursive loops in the cost-yield optimization algorithm, where the recursive loops may optimize a plurality of sub-systems of the wind power system. A wind power system cost-yield optimization facility 7600 may optimize the cost of the wind power system 7604 with respect to the energy producing yield 7608 for the wind power system by employing permutations of possible design solutions identified in an n dimensional optimization matrix, where the dimensional number of the matrix may be determined by the number of optimization parameters under consideration. In addition, building a wind power system may be optimized for a selected range of wind conditions based on a cost-yield optimization algorithm 7602.

In embodiments, the present invention may relate to a portable or mobile wind power platform with a plurality of accelerating nozzles in arrays wherein the nozzle array system is portable, requires minimal site preparation, deployable in temporary and/or permanent sites, and may include energy storage capability to reduce the effect of resource variability. In many situations it is a desirable goal that clean energy be as inexpensive and flexible as possible, overcoming the drawbacks of large, complex systems that have high site preparation and installation costs.

In embodiments, a mobile or portable wind power platform may be comprised of an array (e.g., an N×M array) of one or more collapsible or non-collapsible nozzles wherein the nozzles may collapse in any or all of three dimensions (e.g. vertically, horizontally along length or width) for transport, repositioning or storage. Nozzles may be fabricated from fabrics, plastics, metals, and the like, or combinations thereof. Nozzles may have structural elements that are substantially flexible and other elements that are substantially rigid, such as to allow a skeletal frame of elements that provide the basic shape of the nozzle, with sheets of flexible material between the skeletal elements providing the overall nozzle shape. Elements may be constructed to collapse or shrink in dimension by various mechanisms, such as telescoping, fanning in, deflating, rolling/twisting, compressing, folding, or the like. In embodiments the system may have an internal support structure; an external support structure; be inflatable, pressurized, and/or lighter than air; be made of hardened or environmentally resistant materials; be made of recyclable or re-conditionable materials with low environmental impact; designed for easy replacement, reconditioning, recycling; and the like. The arrays may convert energy through mechanical, fluid seeding, piezo-electric, and the like mechanisms. An energy transport or storage system may collect energy from the array(s), such as including a networked system, a non-networked system, a central system, a distributed collection system, and the like. The system may include a non-twisting central transfer cable where the cable is separated and enclosed in a coupling mechanism that allows energy transfer between the portions of cable and allows said portions to rotate independently.

In embodiments, nozzles may be camouflaged, such as for use in military situations or to provide improved aesthetic characteristics when deployed in urban or suburban environments.

In embodiments, the mobile wind power platform may manage energy from the array(s) utilizing a network or non-networked system, a neural network or other learning system, and the like. The system may include an orientation mechanism, such as with a mechanical bearing, electronic bearing, slide bearing, rail bearing, or other bearing or orientation mechanisms known in the art.

In embodiments, the mobile wind power platform may include a support structure, such as a superstructure, which may be a partially or wholly collapsible superstructure that may collapse in any or all of three dimensions to allow portability but may be fixed in place to support the array. The system may include automatic or manual mechanisms by which to erect or collapse the system, such as with gearing and cranks or other similar mechanisms, hydraulics, pneumatics, motor actuated, and the like, or any combination of systems thereof. The system may include a solid or partially solid container or containing structure which may add structure integrity or system functionality, protect the system during storage or extreme events, be hardened to mechanical or electronic (such EMP) interference, provide camouflage for the system, and the like. The system may include a mechanism for automatic, manual, or otherwise to elevate the array structure; to collapse and un-collapse the array, and the like.

In embodiments, the mobile wind power platform may include a leveling system, such as to level the array in two or more dimensions. The leveling system may, for example, include one or more legs that is extendable and fixable at different lengths, so that legs can be disposed on a variable surface but provide a stable, flat surface for the array(s). One or more structural support systems may be provided to support and/or elevate or otherwise provide benefit to the array in a local or global load positioning or reduction manner. For instance, the system may include legs which telescope, are n-poded (e.g. tripod, quadpod, . . . n-pod), are angled, straight, curved, and the like, or some combination thereof, such as a combination of straight, angled, and curved. The structural support system may be comprised of solid structures, a curtain wall, partially solid structures, and the like. The system may be comprised of a collapsible system; hyperboloid or tensegrity structures; a partially or completely separate assembled system, a lighter than air system, and the like. The system may enable attaching the array to a pre-existing structure such as but not limited to a roof, wall, tower, and the like. Attachment may be made by fasteners, such as tying mechanisms (ropes, zip-ties, flexible cords, or the like), bolts, screws, latches, or the like. The structural support may be provided with mechanisms for attaching to the ground, such as stakes or pins, and mechanisms, such as anchors, for attachment in sand, soft ground, or the like.

In embodiments there may be structure interior or exterior to the array such as lift systems, drag systems, and the like, to redirect the dynamic wind pressure force to either reduce overall or partial loading or apply loading in a specifically beneficial location which may be but is not limited to a shield that translates force from wind's dynamic pressure into a lower center of gravity reducing the systems sensitivity to weather extremes.

In embodiments, the mobile wind power platform may be coupled with a single or plurality of storage systems, such as a chemical storage system (e.g. a battery), fuel cell, an osmosis system, a fluid based storage system (e.g. compressed air, stored hydro), flywheel, piezoelectric, cogeneration fuel (e.g. hydrogen, Hydro-Oxy, SynGas, natural gas, algae bio-fuels, and the like, or any combination thereof. In embodiments, the mobile wind power platform may include a load balancing, storage, load, and the like, output management system. The system may include a lighter than air elevation mechanism, such as integrated into the array, forming the array, supporting the array, and the like. The system may also provide for additional methods of energy production or co-generation mechanisms.

In embodiments, the mobile wind power platform may include a storage system based on vacuum-pressurized gradients such that energy from the prime mover is used to totally or partially evacuate at least one of a plurality of "blow-down" chambers. The blow-down chamber may be coupled to at least one of a plurality of supply chambers, such as open to atmospheric pressure, supplied at atmospheric pressure, pressurized, and the like. The volume of the coupling may have an accelerating nozzle such as those described herein. The coupling may have an energy conversion mechanism optimally positioned in the connection. Chambers may operate singly or in sequential firing mode to duplicate the frequency characteristics of the local supply system.

Figure 77:
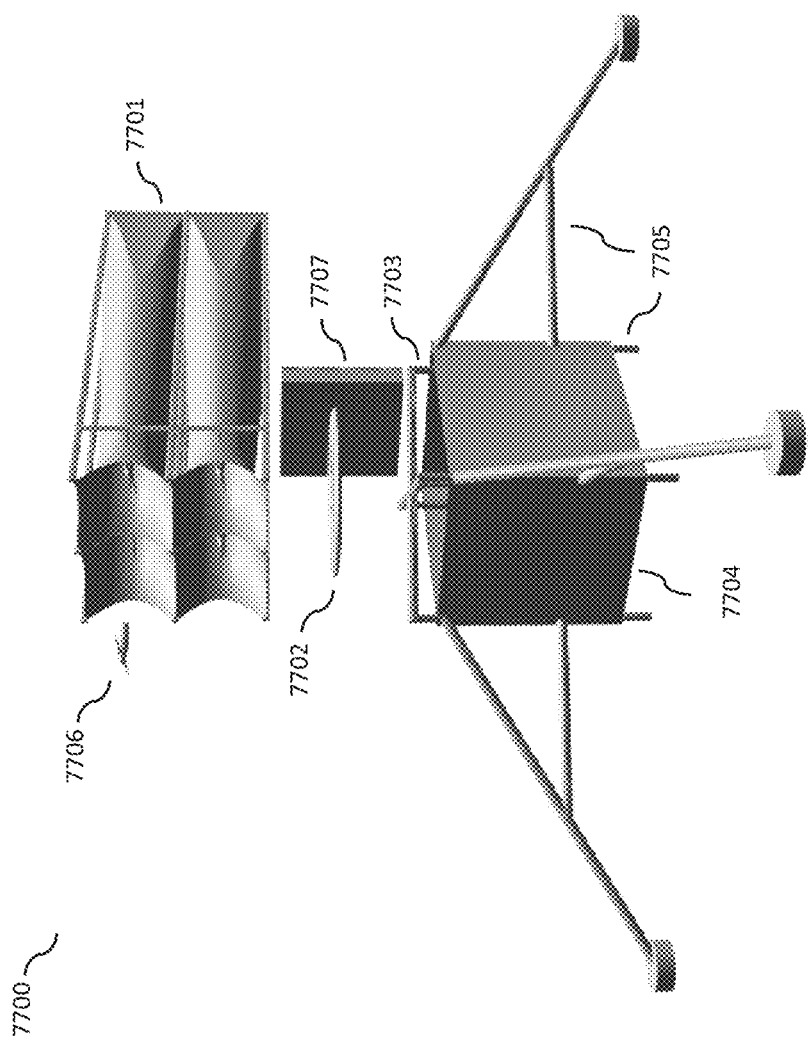
FIG. 77 depicts a fully deployed mobile wind platform of the present invention.
Figure 78B:
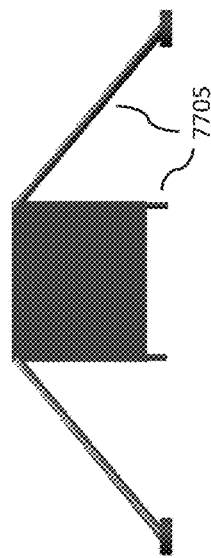
FIGS. 78A-78D illustrate steps in the deployment of a mobile wind platform of the present invention.
Figure 78D:
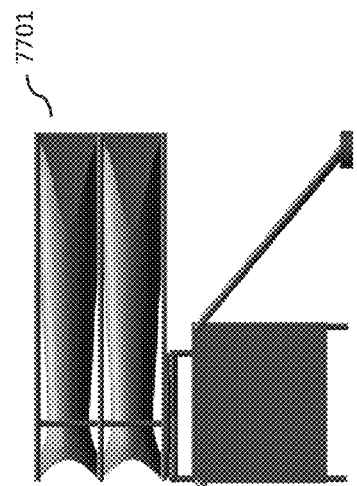
Figure 78A:
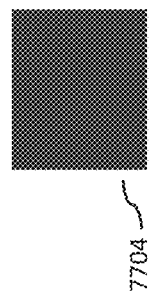
Figure 78C:
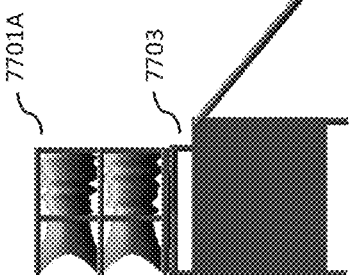
Figure 79C:
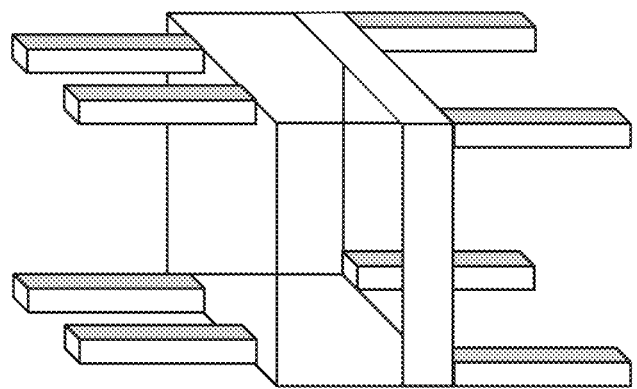
FIGS. 79A-79C illustrate steps in the deployment of structural elements of the mobile wind platform of the present invention.
Figure 79B:
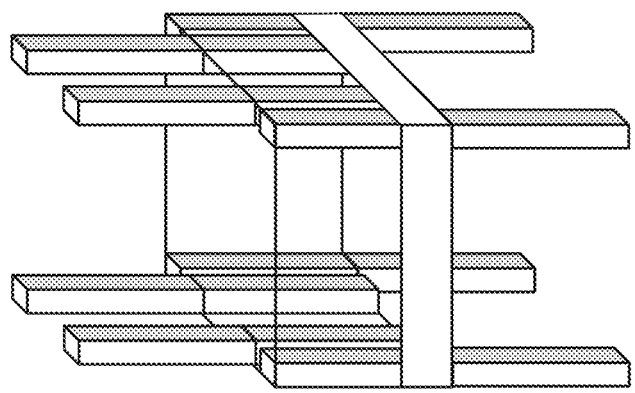
Figure 79A:
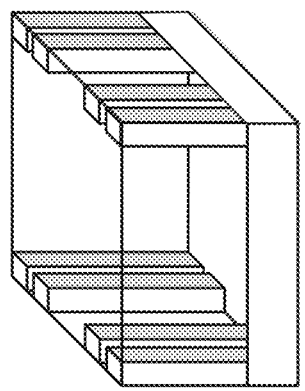

FIGS. 77-79 provide images showing an embodiment of the mobile wind power system 7700. FIG. 77 shows an embodiment of a basic component configuration, showing a modular array 7701, a yaw bearing 7702, a mounting platform and platform elevation system 7703, a 'standard' TRICON container 7704, a ground leveling and support system 7705, one of a plurality of turbines as part of the array 7706, and an AGM lead acid battery pack 7707 for energy storage. FIGS. 78A-78D show an example of the mobile wind power system 7700 being deployed from a container, where FIG. 78A shows the system collapsed into the container 7704, FIG. 78B shows the deployment of the ground leveling and support system 7705, FIG. 78C shows the deployment of a compressed array 7701A on the mounting platform and platform elevation system 7703, and FIG. 79D shows the fully deployed array 7701. FIGS. 79A-79C show a container with elevation mechanisms for leveling and erecting-elevating the array, where FIG. 79A shows the elevation mechanisms stored inside the container, and FIGS. 79B and 79C show the elevation mechanisms extended.

In embodiments, the system may be provided in a portable kit, the portable kit including an adaptor for allowing an electrical interface with another device that is powered by the system and another device, such as a weapon, a sensor system, a medical device, a robotic device, a defense system, a camera, a rechargeable military device, and the like.

In embodiments, the mobile wind power platform may incorporate features that result from the mobile wind power platform being potentially at a lower elevation above the ground as compared with non-portable wind power machines, such as to abate wildlife encroachment, reduce noise and vibrations, and the like. For instance, screens may be utilized, such as for keeping aviary wildlife out of an operating nozzle, keeping wildlife from nesting, sleeping, and the like, in a non-operating nozzle; preventing people from throwing objects into the nozzle; for human safety (e.g. to help prevent someone from sticking a limb into an operating nozzle); and the like. In another instance, noise cancellation devices may be utilized, such in the case where the mobile wind power platform is operating in close proximity (e.g. distance and elevation) to where people work and live, and the like. In addition, vibration absorption facilities may be employed, such as when the mobile wind power platform is sited on a building (e.g. on the rooftop of an occupied building).

In embodiments, it may be important for cost effective accelerating wind machines to reduce the cost of the superstructure and substructure necessary to support and orient the accelerating and conversion mechanisms. One of the determining conditions for cost is the structural strength required to resist extreme wind events. An additional large cost load is the orientation system generally comprised of a bearing and yaw system. Expanding or collapsing the nozzle structure may mitigate the wind cost loading provided the orientation of the structure to the direction of the inflow can be maintained. In this respect, a self-orienting structure may be desired as it may mitigate both the need to consider non-oriented extreme wind conditions and concurrently reduce the cost of the yaw system. In our research it has been found that the nozzle array structures, as described herein, orient to the direction of the inflow, provided that the array is mounted forward of the geometric center of the array. This alone may not remove the necessity of the yaw system, as cable twisting in the main transmission cable is a well-known problem with wind turbines that necessitates a yaw system. It therefore may be desirable to mount arrays forward of the center of geometry to enhance the self-orienting properties of the machines. It may also be desirable to have a means whereby the center of mass of what it a substantially square or rectangular array may be forward of the center of geometry. It may also be desirable to mitigate the effect of wind pressure on cost as it pertains to the stress and strain experience by the array structure in an extreme wind event thereby reducing the weight of the structure and enhancing orientation.

In embodiments, it may be desirable to have a transmission cable that does not require untwisting. These may apply to all types of accelerators that utilize a structure to accelerate the ambient wind including nozzles, duct, shrouds or any type of constriction that has drag properties or uses aerodynamic properties to accelerate a flow, such as in the examples that follow.

In an example, a transmission facility wherein two cables, an input cable from a power source and a output cable to a power consuming, storage, or transmission facility, are joined by a sealed or open bearing that allows either cable to rotate independently of the other without twisting. In the open case the bearing or some low friction central element may have conductive properties and used to transfer power from one cable to the next. In the sealed case contained within the bearing a conductive fluid or media may be used to transfer power from one cable to the next. Additionally a magnetic bearing or fluid may be used to transfer power from one cable to the next. This facility may avoid the need to untwist transmission cables and thereby the costs of untwisting systems in self-orienting wind machines or in any other application wherein cable twisting is a potential problem.

In another example, a lifting facility wherein a wing or some other lifting mechanism or a plurality of such is a attached to a single or multiple fascia of a structure wherein the lift/drag properties of the mechanism are such that the lift from the mechanism offsets in whole or in part the drag/wind loading (C p) on the structure and the stress/strain forces to the instantaneous windward and leeward fascia of the structure. The lifting facility may orient either with the structure or if the structure is fixed to the prevailing wind direction. If the structure is orienting as in the wind machine case the wing may include both vertical and horizontal components or any combination thereof that may assist the structure in various ways, such as relieving live loading on the structural members; keeping the structure oriented to the wind; or anchoring the structure to the supporting ground or structure on which it rests. The lifting facility may be rigid or flexible, such as a wing or parafoil and the like, and may be uniform in plan and elevation dimensions or variable in plan and elevation dimensions, such as a delta wing, and may be optimized based on lift to airfoil material to structural offset cost by one knowledgeable in the art.

In another example, a superstructure for an array wind machine wherein the superstructure is exterior to the array and the array is offset with the circumference of the structure moving the center of rotation to the forward portion of the array thereby allowing the array to self-orient.

In another example, a superstructure that has a central column mounted into a base that allows self and/or inter supporting rows to be mounted vertically and allows all rows to orient together or independently.

In another example, a superstructure that is mounted to a bearing or orienting facility wherein the bearing is mounted forward of the center of geometry to allow self-orientation.

In an example, a trapezoidal or triangular superstructure or similar polygonal structure that allows the center of mass of the superstructure to be forward of the geometric centroid of the machine perimeter thereby enhancing the self-orienting properties.

In another example, a structure that is counterweighted to allow the center of mass and mounting of the bearing to placed forward of the center of geometry. The structure may be counterweighted additionally by dynamic means wherein a load, fluid or solid, may be dynamically introduced to the forward portion of the machine to counterbalance the cantilever load imposed on the structure by increased directional fluid pressure.

In another example, a closing or "fanning" shroud wherein the shroud closes either passively or actively based on increased wind pressure on the fluid facing surface. This may be greaved or hinged, in the same way a fan would open, and may close uni-directionally or bi-directionally wherein the structure would close to the width of a single greave or "closed fan" structure in the case of extreme events, or be slotted wherein the local structure would turn a lower drag fascia to the flow in the case of extreme events and close the structure in normal operation. This structure would have the advantage in asymmetric nozzles, e.g. nozzle wherein the bounding entrance area and the bounding exit area are not geometrically the same.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system comprising:
   a plurality of wind energy conversion modules, each one of the plurality of wind energy conversion modules comprising a nozzle that includes an intake, a diffuser, and a throat between the intake and the diffuser, wherein a rotor is positioned within the throat to convert a flow of air into a rotational energy;
   a support structure supporting the plurality of nozzles in the plurality of wind energy conversion modules; and
   a non-mechanized element that uses an airflow to orient the plurality of nozzles in the support structure in a direction of the airflow,
   wherein one or more of the plurality of wind energy conversion modules and the support structure include a material for filling with a gas used to achieve a predetermined buoyancy for the system.

2. The system of claim 1 wherein the non-mechanized element includes a tail on at least one of the plurality of nozzles.

3. The system of claim 1 wherein the plurality of nozzles include a plurality of self-orientating nozzles each with an independent orientation within the support structure.

4. The system of claim 1 wherein the plurality of nozzles include one or more nozzles configured to orient toward a vertical component of the direction of the airflow.

5. The system of claim 1 wherein the non-mechanized element includes a bearing coupling the plurality of wind energy conversion modules to the support structure, wherein the bearing is mounted forward of a center of geometry of the plurality of wind energy conversion modules.

6. The system of claim 1 wherein the support structure includes a superstructure with a center of mass forward of a geometric centroid of the system.

7. The system of claim 1 wherein the support structure includes one or more vertically mounted rows of nozzles, each row configured to independently orient toward the airflow.

8. The system of claim 1 further comprising an interface for electrical connection to at least one of another energy producing facility, a power grid, and an energy-using device.

9. The system of claim 1 wherein the support structure includes a collapsible support structure.

10. The system of claim 9 wherein the plurality of wind energy conversion modules include a fabric material to facilitate collapsibility.

11. The system of claim 9 wherein the collapsible support structure is inflatable with the gas.

12. The system of claim 9 further comprising a collapsible interconnection support structure to interconnect the plurality of wind energy conversion modules, wherein the collapsible interconnection support structure is inflatable with the gas.

13. The system of claim 9 further comprising a leveling system to level the plurality of wind energy conversion modules.

14. The system of claim 1 wherein the diffuser of each one of the plurality of nozzles is collapsible.

15. The system of claim 1 wherein a ratio of the diffuser length to the nozzle intake length is greater than 5 to 1.

16. The system of claim 1, wherein the ratio of an area of an entrance of the nozzle intake to an area of the throat is greater than 2 to 1.

17. The system of claim 1 wherein at least one of the plurality of wind energy conversion modules includes a vortex-forming aerodynamic shape on the intake, the throat, and the diffuser to impart a swirling motion on the flow of air.

18. The system of claim 1 further comprising a heating element in the wind energy conversion module that heats the air in the flow of air to create a pressure differential to increase a throughput of air through the wind energy conversion module.

19. The system of claim 1 wherein at least a portion of one of the plurality of wind energy conversion modules is constructed of a flexible fabric and wherein at least a portion of the support structure is inflatable with the gas.

20. The system of claim 1 wherein the material for filling with the gas includes one or more of an impregnatable foam, a syntactic foam, and a foaming agent.

* * * * *